(12) United States Patent
Veit et al.

(10) Patent No.: US 11,691,652 B2
(45) Date of Patent: Jul. 4, 2023

(54) RAILROAD HOPPER CAR WITH FLOW THROUGH STRUCTURE

(71) Applicant: National Steel Car Limited, Hamilton (CA)

(72) Inventors: Oliver M. Veit, Hamilton (CA); Kenneth Wayne Black, Hamilton (CA)

(73) Assignee: National Steel Car Limited, Hamilton (CA)

( * ) Notice: Subject to any disclaimer, the term of this patent is extended or adjusted under 35 U.S.C. 154(b) by 520 days.

(21) Appl. No.: 16/862,285

(22) Filed: Apr. 29, 2020

(65) Prior Publication Data

US 2020/0353954 A1 Nov. 12, 2020

Related U.S. Application Data

(60) Provisional application No. 62/909,298, filed on Oct. 2, 2019, provisional application No. 62/840,166, filed on Apr. 29, 2019.

(51) Int. Cl.
| | | |
|---|---|---|
| *B61D 7/18* | (2006.01) | |
| *B61D 7/02* | (2006.01) | |
| *B61D 7/22* | (2006.01) | |

(52) U.S. Cl.
CPC .............. *B61D 7/18* (2013.01); *B61D 7/02* (2013.01); *B61D 7/22* (2013.01)

(58) Field of Classification Search
CPC .............. B61D 7/00; B61D 7/02; B61D 7/20
See application file for complete search history.

(56) References Cited

U.S. PATENT DOCUMENTS

| | | | | |
|---|---|---|---|---|
| 3,570,592 A | * | 3/1971 | Rollins | .............. B61D 27/0027 219/202 |
| 3,584,564 A | * | 6/1971 | Rollins | .............. B61D 27/0027 219/202 |

(Continued)

FOREIGN PATENT DOCUMENTS

WO WO2013059856 A1 5/2013

OTHER PUBLICATIONS

International Search Report and Written Opinion PCT/CA2020/050569 dated Aug. 10, 2020.

(Continued)

*Primary Examiner* — Robert J McCarry, Jr.
(74) *Attorney, Agent, or Firm* — Hahn Loeser & Parks LLP; Nathan B. Webb

(57) ABSTRACT

A railroad hopper car has a hopper carried between two trucks, and has convergent end and side slope sheets that feed a bottom discharge. The bottom discharge has a rectangular frame. The bottom discharge is lower than the center sill. The car has a flat bottom discharge having multiple arrays of louvers. All of the lading discharges through the flat bottom. The side sheets extend downwardly beyond the side sills, so that the side slope sheets terminate below the side sills. The car has laterally extending shear force transfer members that provide a shear connection between the side walls of the car. The shear force transfer members have openings to permit lading from the main containment volume of the car to pass therethough to the lading discharges. The louvers are joined to move together. Alternatively, the gate may include two opposed sliding doors separated by a beam that runs under the center sill.

50 Claims, 67 Drawing Sheets

(56) References Cited

U.S. PATENT DOCUMENTS

| | | | |
|---|---|---|---|
| 4,368,673 | A | 1/1983 | Dvorscak |
| 4,498,400 | A | 2/1985 | Vorwerk |
| 6,237,505 | B1 | 5/2001 | Sande et al. |
| 7,752,979 | B2 | 7/2010 | Early |
| 7,814,842 | B2 | 10/2010 | Early |
| 7,819,067 | B2 | 10/2010 | Early |
| 10,035,521 | B2 | 7/2018 | Wiliams |
| 10,604,165 | B2 | 3/2020 | Williams |
| 2009/0120323 | A1 | 5/2009 | Forbes |
| 2015/0197257 | A1 | 7/2015 | Williams |
| 2018/0186387 | A1 | 7/2018 | Richmond |
| 2018/0201278 | A1 | 7/2018 | Forbes et al. |
| 2019/0001997 | A1 | 1/2019 | Richmond et al. |
| 2020/0062280 | A1 | 2/2020 | Jones et al. |

OTHER PUBLICATIONS

International Search Report and Written Opinion PCT/CA2020/050568 dated Jul. 6, 2020.

\* cited by examiner

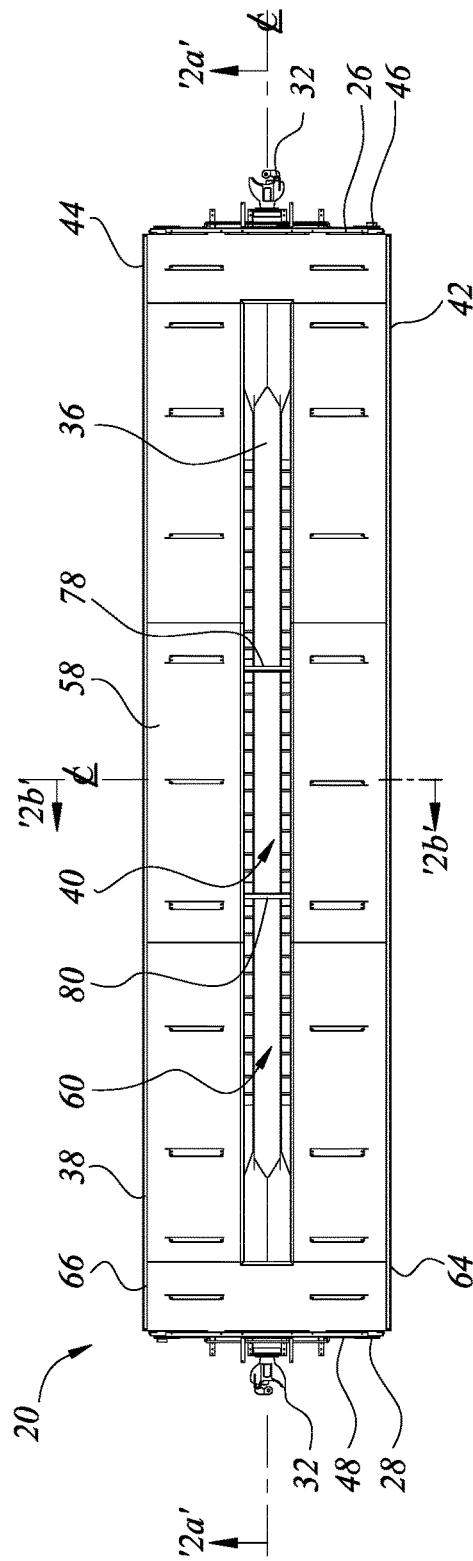

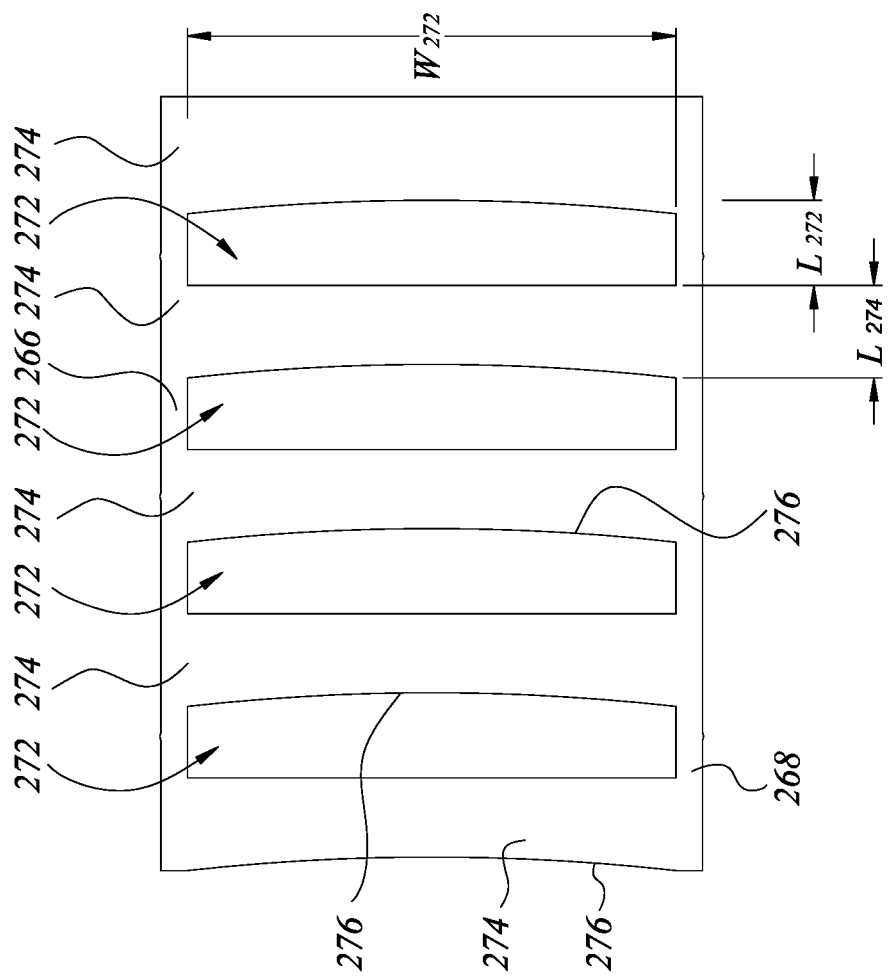

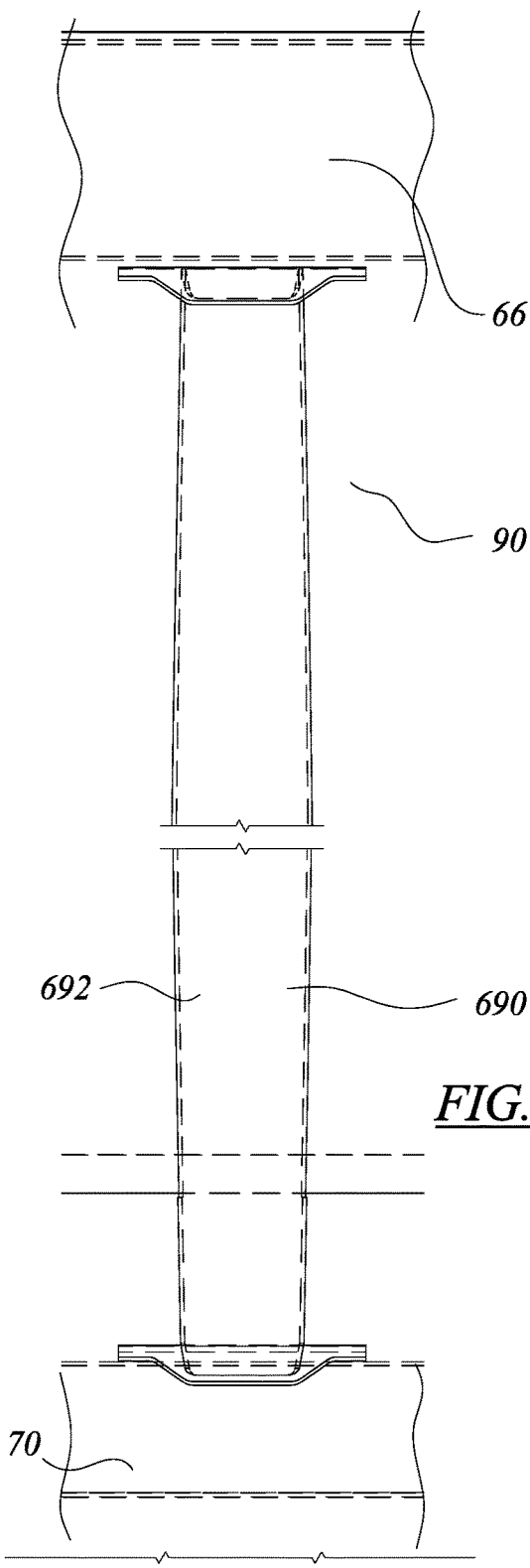
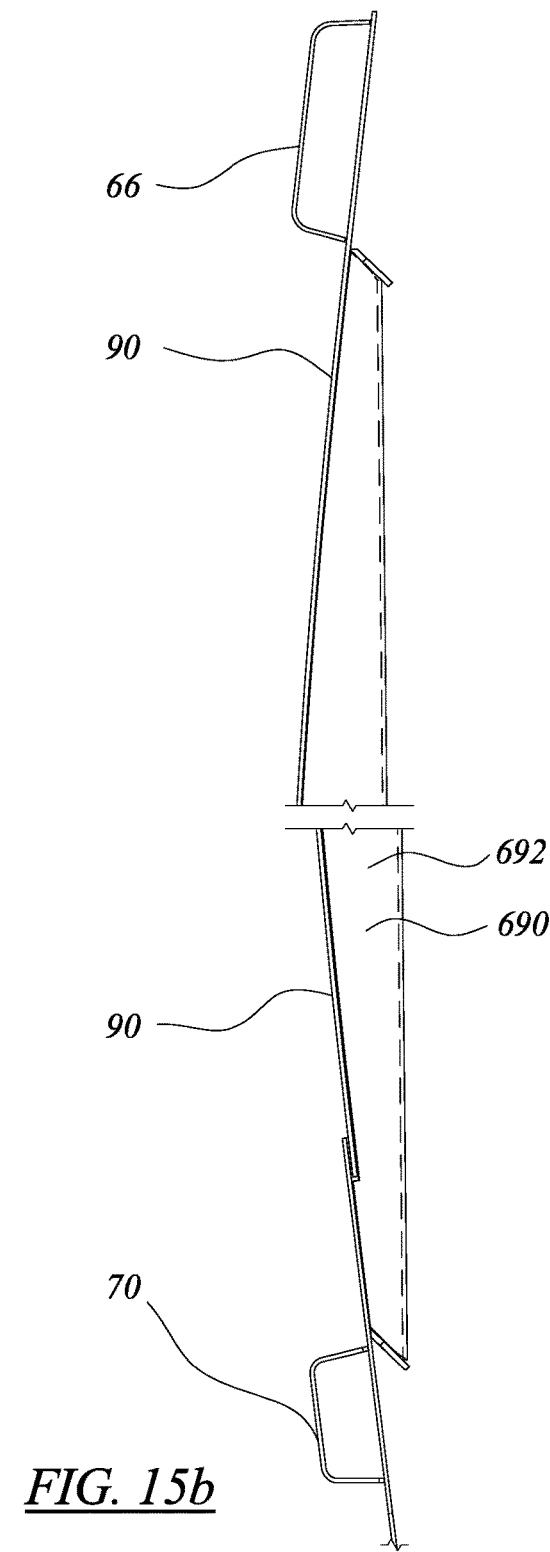
FIG. 15a
FIG. 15b

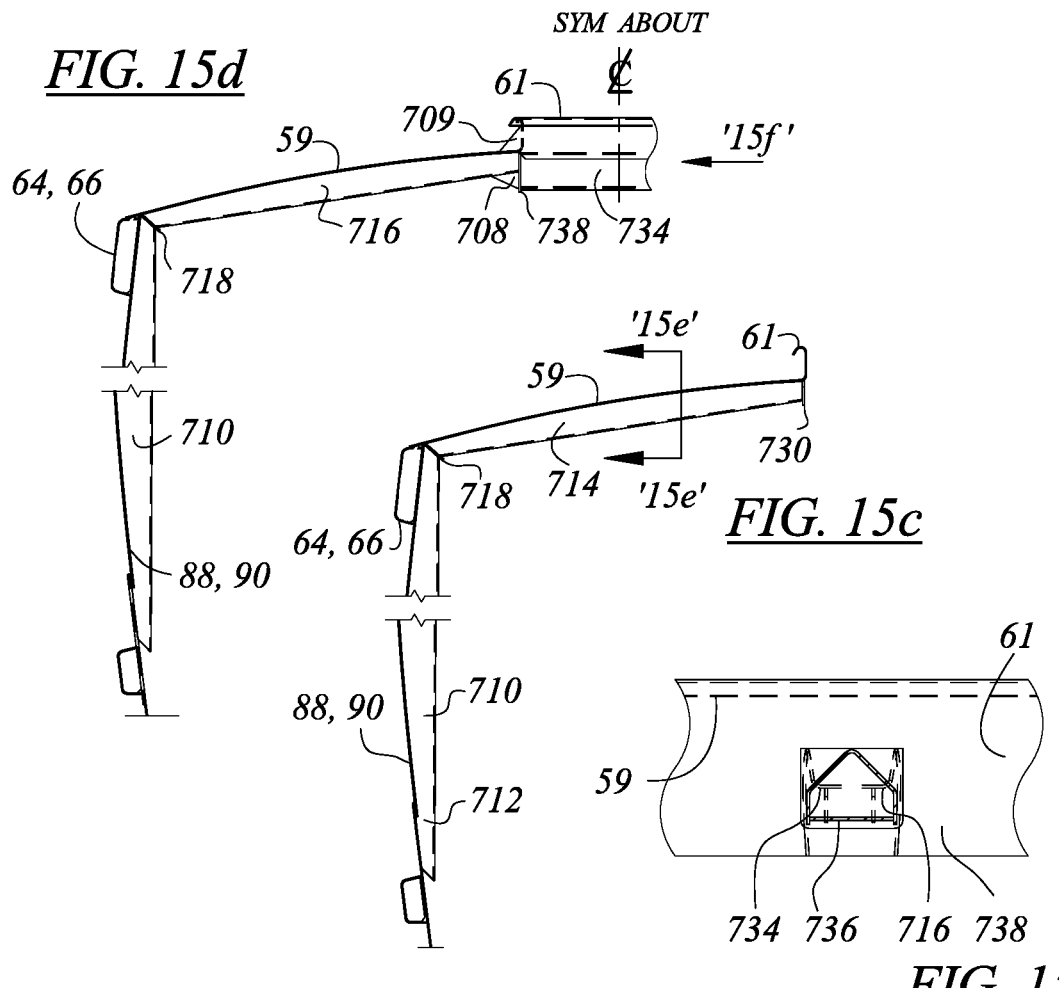
FIG. 15d
FIG. 15c
FIG. 15f
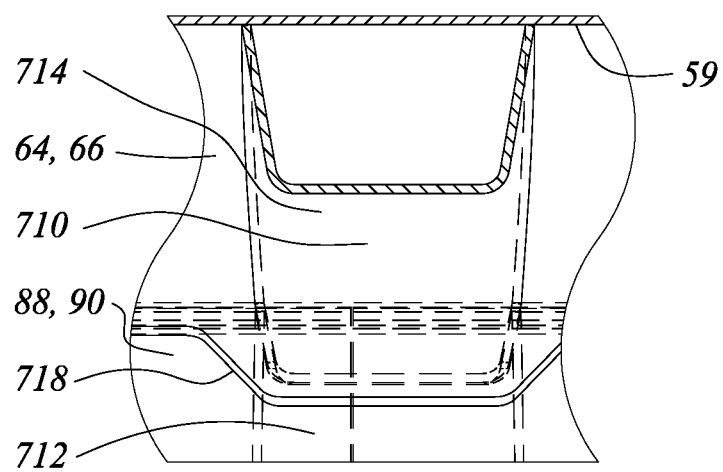
FIG. 15e

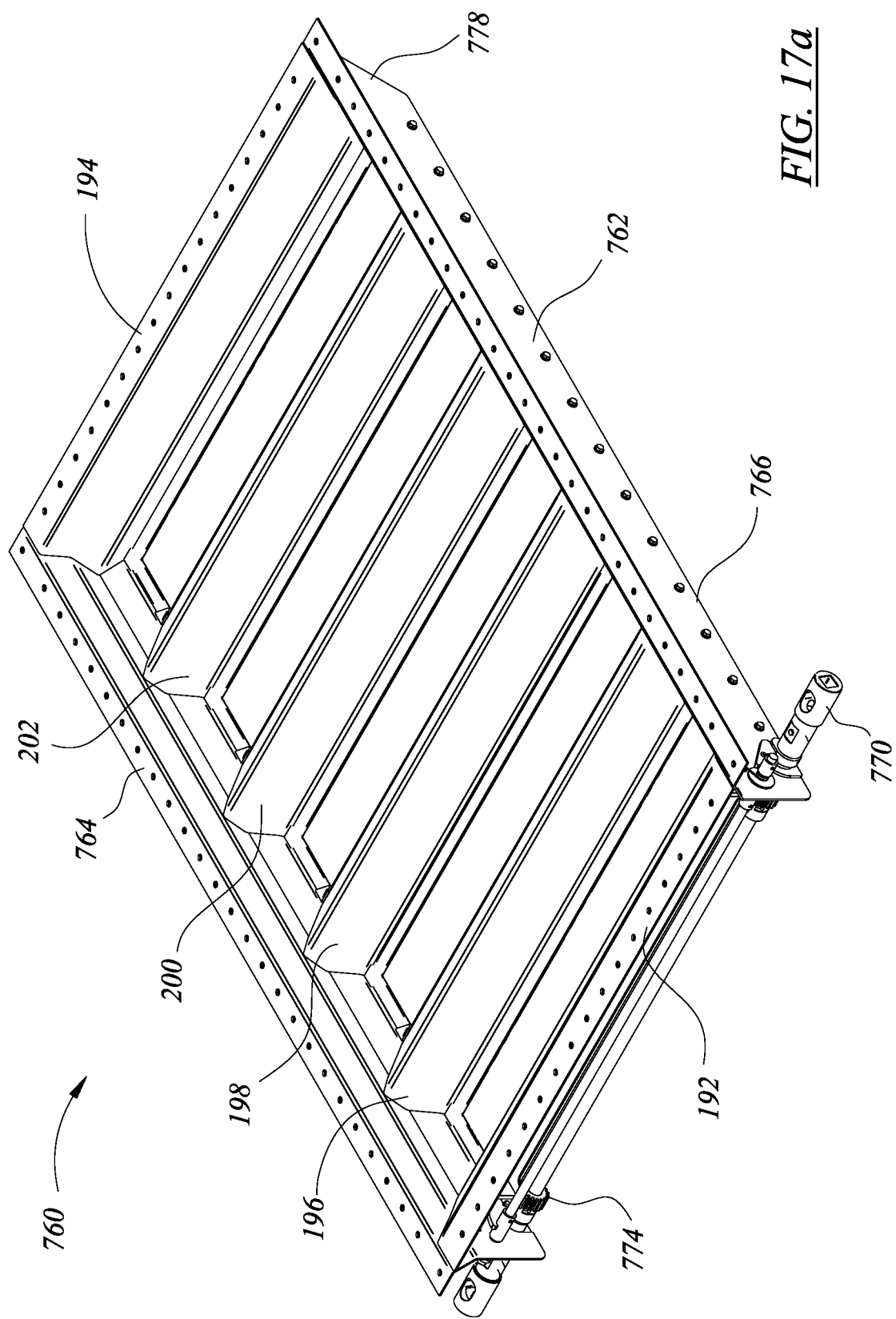

RAILROAD HOPPER CAR WITH FLOW THROUGH STRUCTURE

This application claims the benefit of priority of U.S. Provisional Patent Application Ser. No. 62/840,166 filed Apr. 29, 2019, and the benefit of priority of U.S. Provisional Patent Application Ser. No. 62/909,298 filed Oct. 2, 2019, the specifications and drawings thereof being incorporated in their entirety herein by reference.

FIELD OF THE INVENTION

This invention relates to the field of railroad freight cars, and, in particular to railroad hopper cars such as may employ bottom unloading gates or doors.

BACKGROUND

There are many kinds of railroad cars for carrying particulate material, be it sand or gravel aggregate, plastic pellets, grains, ores, potash, coal or other granular material. The cars often have an upper inlet, or entry, or upper opening, or accessway, by which to introduce lading, and a lower opening, or lower outlet, or discharge, or accessway, or gate, or gate assembly, or door by which lading exits the car under the influence of gravity. Given gravity, while the inlet need not necessarily have a movable gate, the outlet opening has a governor that is movable between a closed position for retaining the lading while the lading is being transported, and an open position for releasing the lading at the destination, and that is operable to move between these positions to govern the egress of lading. The terminology "flow through" or "flow through railroad car" or "center flow" car, or the like, may sometimes be used for cars of this nature where lading, typically particulate lading, is introduced at the top, and flows out at the bottom.

Discharge doors for hopper cars or other bottom dumping cars may tend to have certain properties. First, to the extent possible it is usually helpful for the door opening to be large to hasten unloading; and for the sides of any unloading chute to be relatively steep so that the particulate will tend not to hang up on the slope. Further, to the extent that the door can be large and the slope sheets steep, the interior of the car may tend to have a greater lading volume for a given car length. Further still, any increase in lading achieved will tend to be at a relatively low height relative to Top of Rail (TOR) and so may tend to aid in maintaining a low center of gravity. A low center of gravity tends to yield a better riding car.

For a given length of car, hopper volume, and hence overall car volume, can be maximized by reducing the proportion of the length of the car occupied by the trucks, and occupied by the door opening drive mechanism. Furthermore, where the lading to be carried by the car is of greater than usual density, it may often be helpful for the truck center length to be relatively short such that the length of the span between the trucks is smaller, and the weight of the car body structure may be correspondingly decreased relative to the maximum permissible gross weight on rail (GWR) for the car. In some instances, as with iron ore or other high density lading, that truck center distance may be very short.

Most cars in interchange service are currently limited to the "110 Ton" standard of 286,000 lbs., gross weight on rail (GWR). There are also "125 Ton" cars that have a permissible 315,000 lbs., GWR, typically used in captive service. Cars are also limited in cross-sectional width and height, according to the applicable plate diagram, be it AAR Plate C, AAR Plate F, or some other AAR Plate size; and in length according to swing-out for cars having truck centers spaced more than 46'-3" apart. Whether for Plate C or Plate F, or any other plate, no car in interchange service can be more than 10'-8" wide. When fully laded, the car must not have a center of gravity more than 98" above TOR when operating on standard gauge track, and there must be a clearance of 2¾" above TOR. The main structure of the car is exposed to loads in draft (longitudinal tension) and in buff (longitudinal compression). Those loads may be idealized as being applied at the coupler centerline height. For railroad cars with new wheels and empty of lading, that height is 34½", 32½" at full load. Another datum dimension is that of the top cover of the center sill, which may sometimes be in the range of 41" to 43" depending on the size of draft gear. For many kinds of lading, a hopper car will "weigh out" before it "cubes out". That is, for extremely low density lading, such as wood chips, car volume may be the limiting factor (it "cubes out"). For lading of more customary densities, the GWR limit will be exceeded (it "weighs out") before the volumetric limitations are reached.

For railroad freight cars, it may be helpful to have a lower center of gravity. It may also be helpful to move more cars per unit length, so that a train has more cars, overall, within a given siding length. This may yield a train that is heavier per unit length. The characteristic dimension for this purpose is the length over the pulling faces of the car, namely as measured over the distance between striker plates at the respective first and second ends of the car. Given the fixed maximum width (of 128"), and center of gravity limitation (of 98" above TOR), obtaining the same useful volume (or more) with a shorter car length, (for which the length over the pulling faces is a proxy), can present a challenge to the designer.

Others have sought to address these issues. Some attempts are seen in US Publication US 2014/0 366 770 of Klinkenberg et al.; US Publication US 2018/0 186 387 of Richmond; and US Publication 2020/0 062 280 of Jones et al.

Bottom dumping hopper cars, of which ore cars and coal cars may be examples, may tend to have either longitudinal doors or transverse doors. Longitudinal doors are oriented such that the doors operate on hinges or axes of rotation that are parallel to the direction of travel of the railroad car generally. U.S. Pat. No. 4,250,814 of Stark et al., issued Feb. 17, 1981 and U.S. Pat. No. 3,800,711 of Tuttle, issued Apr. 2, 1974 show cars with longitudinal doors. By contrast, transverse doors are ones in which the axes of rotation of the hinges or other pivots tend to be predominantly cross-wise to the direction of travel, most often perpendicular to it. An example of a transverse door car shown in U.S. Pat. No. 4,843,974 of Ritter et al, issued Jul. 4, 1989.

Hopper cars may have hinged doors, such that the door pivots open, as in the references noted above. Alternatively, some hopper cars have sliding gate doors. There are many examples of sliding gate arrangements. Some examples are shown in U.S. Pat. No. 3,138,116 of Dorey; U.S. Pat. No. 3,348,501 of Stevens; and U.S. Pat. No. 7,814,842 of Early.

SUMMARY OF THE INVENTION

The invention relates to a flat bottomed hopper car, or alternatively expressed, a bottom discharging gondola car. That is, in one aspect there is a railroad freight car, the railroad freight car being one of: (a) a railroad hopper car having a flat bottom and at least a first discharge gate mounted thereto; and (b) a railroad gondola car having a flat bottom and at least a first discharge gate mounted thereto. In one feature of that aspect it is a hopper car having a flat bottom, and at least a first discharge gate mounted thereto. In another feature, it is a railroad freight car is a gondola car having a flat bottom and at least a first discharge gate mounted thereto.

In another aspect, there is a railroad freight car. It is a railroad hopper car has at least a first hopper. The first hopper has a first discharge, and the railroad hopper car has at least a first sliding hopper gate and a second sliding hopper gate mounted to the first discharge of the first hopper. In another aspect there is a railroad freight car. It is a railroad hopper car having a sliding gate. The sliding gate has multiple shutters.

In another aspect there is a railroad hopper car that has perforated internal slope sheets.

In a feature of that aspect, the internal slope sheets extend over a movable outlet gate. In another feature, the main portion of the containment shell of the hopper car lies above the internal slope sheet, there is gating below the internal slope sheets, and said perforated slope sheets have apertures formed therein to permit passage of lading therethrough from the main portion of the containment shell to the outlet gating. In another feature, the perforated internal slope sheet include a first internal slope sheet and a second internal slope sheet that extend upwardly and longitudinally toward a common, or shared, apex. In an additional feature, the railroad hopper car has a structural shell reinforcement frame extending upwardly away from the apex. In another additional feature, the structural shell reinforcement frame is an open frame allowing passage of lading longitudinally within the containment shell. In still another feature the railroad hopper car has a straight-through center sill and a lading containment shell. The perforated internal slope sheets define a shear connection between the center sill and the lading containment shell. In another feature, the railroad hopper car includes longitudinally extending, downwardly convergent side slope sheets, the perforated internal slope sheets extend across the car linking the side slope sheets and forming an obliquely inclined shear force connection therebetween. In still another feature, the railroad hopper car includes longitudinally extending, downwardly convergent side slope sheets, and a straight-through center sill; the perforated internal slope sheets extend across the car linking the side slope sheets and the straight-through center sill; and the perforated internal slope sheets forming an obliquely inclined shear force connection between the side slope sheets and the center sill. In a further feature, the hopper car has multiple discharge gates.

In another aspect, there is a railroad hopper car that has at least a first fore-and-aft-inclined, internal, cross-wise extending, perforated shear force transfer members.

In a feature of that aspect, the shear force transfer members extend over an associated movable outlet gate. In another feature, the shear force transfer members are a first internal slope sheet and a second internal slope sheet that extend upwardly and longitudinally toward a common apex. In another feature, the railroad hopper car has a structural shell reinforcement frame extending upwardly away from the apex. In still another feature, the structural shell reinforcement frame is an open frame. In another feature, the railroad hopper car has a straight-through center sill and a lading containment shell, and the shear force transfer members define a shear connection between the center sill and the lading containment shell. In a further feature, the railroad hopper car includes longitudinally extending, downwardly convergent side slope sheets, the shear force transfer members extend across the car linking the side slope sheets and forming an obliquely inclined shear force connection therebetween. In a still further feature, the railroad hopper car includes longitudinally extending, downwardly convergent side slope sheets, and a straight-through center sill; the shear force transfer members extend across the car linking the side slope sheets and the straight-through center sill; and the shear force transfer members form an obliquely inclined shear force connection between the side slope sheets and the center sill. In another feature, the hopper car has multiple discharge gates.

In another aspect of the invention there is a railroad hopper car having a body shell in which to contain lading. The body shell has a discharge section through which lading exits the body shell under the influence of gravity. The body shell has respective first and second end slope sheets inclined fore-and-aft downwardly inclined toward the discharge section. The body has at least respective first and second cross-wise extending, fore-and-aft inclined internal slope sheets located intermediate the first and second end slope sheets. The internal slope sheets are perforated to permit lading to flow therethrough.

In another feature, the discharge section includes a first portion, a second portion and a third portion. The first portion is bounded by the first end slope sheet and the first internal slope sheet. The third portion is bounded by the second end slope sheet and the second internal slope sheet. The second portion lies beneath the first and second internal slope sheets. An egress flow path for lading is defined through perforations of the internal slope sheets through the second portion of the discharge section. In another feature, the body shell has a first, a second end distant from the first end, and a former located intermediate the first and second ends, the former defining a cross-sectional profile of the body shell. The first and second internal slope sheets slope upwardly toward each other. The first and second internal slope sheets mate with the former. In another feature, the internal slope sheets define internal shear webs extending laterally within the body shell. In still another feature, the hopper car has a straight-through center sill and the internal slope sheets mate with the straight through center sill. In an additional feature, the discharge section includes gating movable between open and closed positions to govern egress of lading; the straight-through center sill passes over the gating and clear thereof. In another additional feature, the gating mates with framing of the discharge section, and the internal slope sheet extend from the framing of the discharge section to mate with the center sill. In still another feature, the discharge section includes side slope sheets sloped transversely inwardly and downwardly to terminate at the gating.

In another aspect, a railroad hopper car has a lading containment shell carried on railroad car trucks for rolling motion along railroad tracks. The lading containment shell includes side walls having first and second side sheets. At least a first upwardly extending tie is mounted to the first side sheet. The upwardly extending tie has a profile to which the first side sheet conforms. In a feature of that aspect, the railroad hopper car has a side sill and a top chord. The first side sheet extends between the side sill and the top chord. The upwardly extending tie has a laterally outwardly bulging profile. The tie is located inside of the lading containment shell. The tie is free of moment connections to the side sill and the top chord.

In still another aspect, there is a railroad hopper car having a lading containment shell carried by railroad car trucks along railroad tracks. The lading containment shell includes a side wall and a stiffener. The stiffener has an outwardly bulging profile. The stiffener is mounted to the side wall within the lading containment shell. The side wall has a side sheet that conforms to the outwardly bulging profile. The side sheet self-supports the stiffener to which the it conforms.

In a feature of that aspect, the lading containment shell includes a top chord and a side sill. The stiffener extends upwardly intermediate the top chord and the side sill. In another feature, the stiffener has a first end and a second end. The first end has a structural pin joint relationship to the top chord and the second end has a structural pin joint relationship to the side sill. In another feature, the stiffener includes a web having the bulging profile extending away from the side sheet, and a flange connected by the web to the side sheet, the flange being spaced away from the side sheet. In a further feature, the stiffener includes a channel section mounted toes-in to the side sheet. In another feature the hopper car has a bending-moment transmitting transverse frame. The stiffener is located along the lading containing shell distant from the bending-moment transmitting transverse frame, and distant from an end wall of the lading containing shell. In another feature, the hopper car has a discharge gate. The stiffener is an upwardly extending stiffener located at a longitudinal station of the hopper car midway along the discharge gate. In still another feature, the side sheet of the car is cylindrical in the longitudinal direction. In a further feature, the hopper car has a center sill and internal shear force transfer members that provide a shear connection between the center sill and the side sheet of the side wall. The internal shear force transfer members are perforated to permit passage of lading therethrough. In an additional feature, the railroad hopper car includes a frame extending upwardly from the shear force transfer members. The frame and the shear force transfer members are connected to transfer a bending moment transversely across the railroad hopper car. The reinforcement is spaced longitudinally along the lading containment shell from the frame.

In another aspect of the invention there is a railroad hopper car having a lading containment body having a roof opening through which to introduce lading and a bottom discharge. The bottom discharge has a gate mounted thereto to govern egress of lading from the containment body. The bottom discharge has a length along the lading containment body and a width across the lading containment body. The length is greater than the width. The containment body has downwardly open body reinforcement. That reinforcement, or reinforcement assembly, has a first portion mounted to a side wall of the lading containment body and a second portion mounted to a roof sheet of the lading containment portion.

In a feature of that aspect, there is a moment connection between the first portion and the second portion of the reinforcement. In another feature, a portion of the reinforcement has a channel section mounted toes-in to form a closed section with the lading containment body. In another feature, there is a moment connection between the first portion and the second portion. In a further feature, the hopper car includes a coaming defining a periphery of the roof opening, and the second portion includes a cross-member that extends across the coaming. In still another feature, the reinforcement has the form of a downwardly opening U-shaped assembly. In another feature, the U-shaped assembly defines a spring. In still another feature the cross-member has a pair of spaced apart vertical legs having web continuity with adjacent members of the reinforcement fully across the car from top chord to top chord. In another feature, the reinforcement is between spaced apart frames of the lading containment body of the hopper car. In a further feature, the hopper car has a flat bottom discharge.

These and other aspects and features of the invention may be understood with reference to the description that follows, and with the aid of the illustrations.

BRIEF DESCRIPTION OF THE FIGURES

In the Figures:

FIG. 1*d* is a top view of the railroad freight car of FIG. 1*a*;

FIG. 1*e* is a bottom view of the railroad freight car of FIG. 1*a*;

FIG. 4g is a bottom view of the stationary member of FIG. 4a;

FIG. 5a is a perspective view of the movable shutter of the assembly of FIG. 4a;

FIG. 5b is a top view of the movable shutter of FIG. 5a;

FIG. 6b is an enlarged detail of a drive pinion of the gate assembly of FIG. 3a;

FIG. 7a is an alternate version of the enlarged detail of FIG. 6a;

FIG. 7b is a perspective view of a door operating mechanism of the detail of FIG. 7a;

FIG. 8a is an alternate enlarged detail to that of FIG. 6a;

FIG. 9c is an enlarged detail of the drive mechanism of the gate assembly of FIG. 9a;

FIG. 9e shows a detail of an input shaft of the drive mechanism of FIG. 9a;

FIG. 10a shows a general arrangement perspective view from above of an alternate embodiment of gate assembly to that of FIG. 3a;

FIG. 10c is a side view of the gate assembly of FIG. 10a;

FIG. 10d is an end view of the gate assembly of FIG. 10a;

FIG. 10e is a view similar to FIG. 6a for the embodiment of FIG. 10a;

FIG. 11a is a perspective view from above of a moving member of the gate assembly of FIG. 10a;

FIG. 11b is a perspective view from below of the moving member of FIG. 11a;

FIG. 11c is a top view of the moving member of FIG. 11a; and

FIG. 11d is an end view of the moving member of FIG. 11a;

FIG. 13c is a top view of the railroad hopper car of FIG. 13a;

FIG. 14b is a further enlarged detail of the structural reinforcement of FIG. 14a;

FIG. 15a is a profile view looking outboard on arrow 15a of FIG. 13e of a wall reinforcement of the railroad hopper car of FIG. 13a, in foreshortened section;

FIG. 15b is a cross-section of the reinforcement of FIG. 15a;

FIG. 15c is a side view of an alternate arrangement of reinforcement structure to that of FIG. 15a;

FIG. 15d is a side view of a further alternate arrangement of reinforcement structure to that of FIG. 15a;

FIG. 15e is a view on section '15e-15e' of FIG. 15c showing the section of the roof reinforcement;

FIG. 15f is a view on section '15f-15f' of FIG. 15d showing the cross-section of a coaming reinforcement cross-member;

FIG. 17a is an isometric view of a discharge gate of the railroad hopper car of FIG. 13a, being an alternate embodiment to the hopper discharge gate of FIG. 3a;

FIG. 17b is another isometric view, from below, of the discharge gate of FIG. 17a;

FIG. 17c is an end view of the discharge gate of FIG. 17a;

FIG. 17d is a side view of three gates as in FIG. 17a arranged on the hopper discharge section of the railroad hopper car of FIG. 13a;

FIG. 18 is an isometric view of a frame of the discharge gate of FIG. 17a;

FIG. 19b is a plan view of the sliding gate panel of FIG. 19a; and

DETAILED DESCRIPTION

Figure 1A:
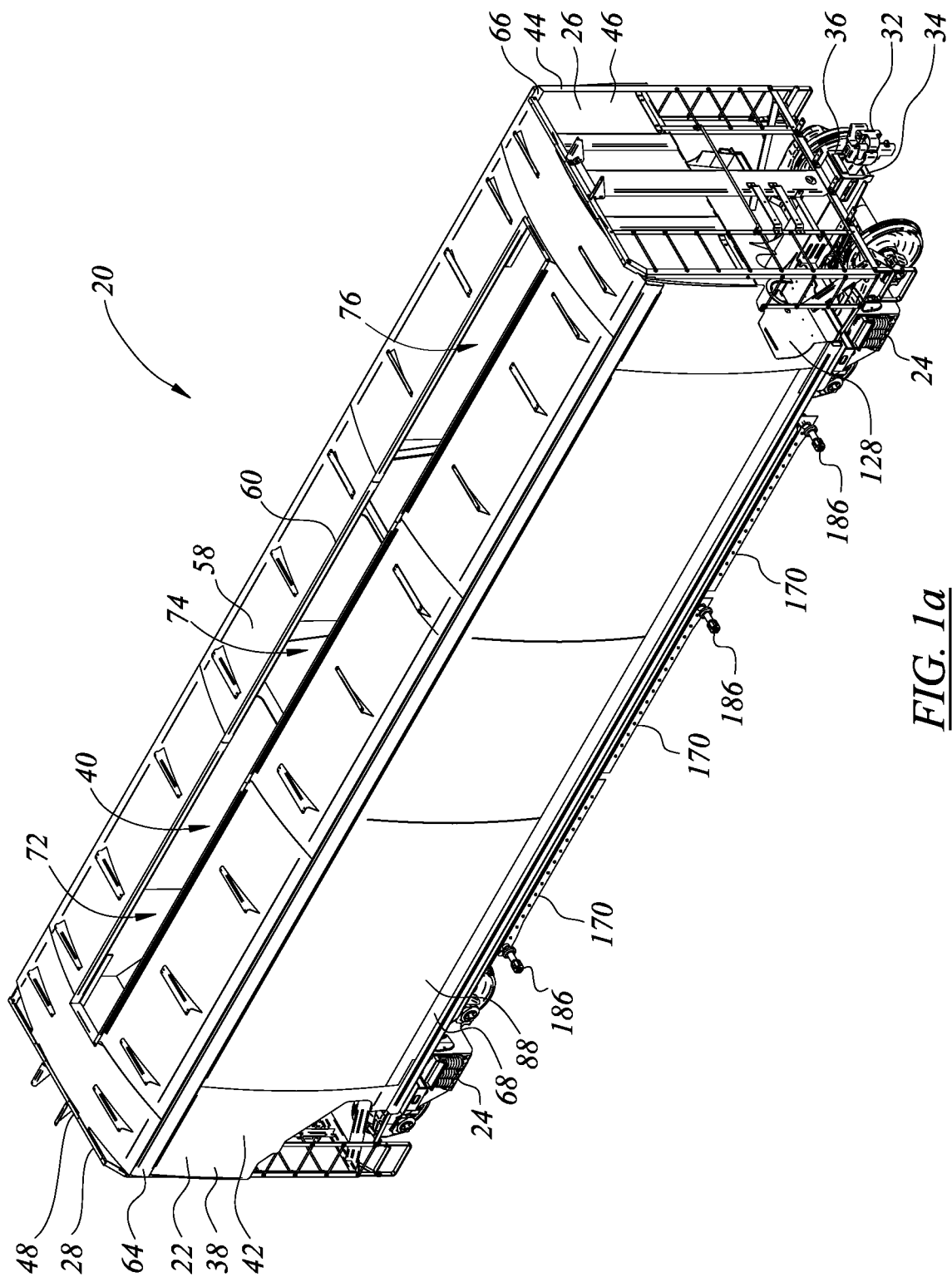
FIG. 1*a* is an isometric general arrangement view of a railroad freight car, from above, to the right, and to one end.

The description that follows, and the embodiments described therein, are provided by way of illustration of an example, or examples, of particular embodiments of the principles, aspects or features of the present invention.

These examples are provided for the purposes of explanation, and not of limitation, of those principles and of the invention. In the description, like parts are marked throughout the specification and the drawings with the same respective reference numerals. The drawings may be taken as being to scale unless noted otherwise.

The terminology used in this specification is thought to be consistent with the customary and ordinary meanings as understood by a person of ordinary skill in the railroad industry in North America. The Applicant incorporates by reference the Rules and Standards of the Association of American Railroads, a private body that establishes rules for interchange operation of railroad rolling stock in North America. To the extent that this specification or the accompanying illustrations may refer to standards of the Association of American Railroads (AAR), such as to AAR plate sizes, those references are to be understood as at the earliest date of priority to which this application is entitled. In particular, the Applicant incorporates AAR Plates C and F, and the Double-Stack Container Plate. The Applicant notes the datum truck center distance of 46'-3" and the datum car width of 10'-8" established by the AAR. The datum truck center distance is the maximum truck center length permitted without requiring allowance for swing-out. 10'-8" is the maximum car with allowed for cars having truck center distances up to the datum length of 46'-3". Longer cars must be narrowed to account for swing-out.

Furthermore, this specification frequently recites multiple synonyms for a single object. The recitation of multiple synonyms is intended to convey that any synonym may be used for a given part, whether or not that synonym is used in the disclosure as filed, provided that it conforms to the meaning of the concept, function, or object conveyed on a fair reading of the disclosure, or that is fairly shown in the illustrative figures, or both.

In general orientation and direction, for railroad cars herein the longitudinal direction is defined as being coincident with the rolling direction of the railroad car, or railroad car unit, when located on tangent (that is, straight) track. In a Cartesian frame of reference, this may be the x-axis, or x-direction. In a railroad car having a center sill, be it a stub sill or a straight-through center sill, the longitudinal direction is parallel to the center sill, and to the top chords and side sills. Unless otherwise noted, vertical, or upward and downward, are terms that use top of rail, TOR, as a datum. In a Cartesian frame of reference, this may be defined as the z-axis, or z-direction. In the context of the car as a whole, the term lateral, or laterally outboard, or transverse, or transversely outboard refer to a distance or orientation relative to the longitudinal centerline of the railroad car, or car unit, or of the centerline of a centerplate at a truck center. In a Cartesian frame of reference this may be referred to as the y-axis or y-direction. Given that the railroad car may tend to have both longitudinal and transverse axes of symmetry, a description of one half of the car may generally also be intended to describe the other half as well, allowing for differences between right hand and left hand parts. Accordingly, the term "longitudinally inboard", or "longitudinally outboard" is a distance taken relative to a mid-span lateral section of the car, or car unit. Pitching motion is angular motion of a railcar unit about a horizontal axis perpendicular to the longitudinal direction (i.e., rotation about an axis extending in the y-direction). Yawing is angular motion about a vertical or z-axis. Roll is angular motion about the longitudinal, or x-axis. In this description, the abbreviation kpsi, if used, stands for thousand of pounds per square inch.

Unless otherwise noted, it may be understood that the railroad cars described herein are of welded steel construction.

FIG. 1a shows an isometric view of an example of a railroad freight car 20 intended to be representative of a range of railroad cars in which one or more of the various aspects or features of the present invention may be incorporated. Railroad freight car 20 may be, and in the example embodiment illustrated is, a hopper car. It may be an open topped hopper car or, as illustrated, a covered hopper car. In either case, railroad freight car 20 is a gravity discharge car. Such a car may also be termed a "flow through" car in which lading is loaded through the top of the car, and discharged through the bottom. That is, generally speaking, the lading is introduced from above, while the hopper gates are closed, and is discharged under the influence of gravity by opening gates in the bottom of the car. The terms "bottom opening", "bottom dumping", or "bottom discharging", and the like, amount to the same thing, however termed.

Hopper car 20 has a body 22 that is carried on trucks 24 for rolling motion along railroad tracks in the longitudinal or x-direction. Body 22 is a lading containment body. Each of trucks 24 has a Truck Center (CL-Truck). Car 20 has first and second ends 26, 28, at which there are couplers 32 for connection to adjacent railroad cars. Couplers 32 are mounted to draft gear, which is mounted in draft sills at the ends of the center sill 36 of car 20, longitudinally outboard of the respective Truck Centers. The outboard end of the draft sill is the "striker plate" or "striker" 34. The inboard end of the draft sill terminates at main bolster 30. The centerlines of main bolster 30 and the draft sill (i.e., center sill 36) intersect, typically at the respective Truck Center. Center sill 36 may have the form of stub sills mounted at the respective end sections of car 20, or it may be a straight-through center sill, as illustrated.

As a matter of definition, the end sections of car 20 may tend to be thought of as those portions, or sections, of car 20 that extend above respective trucks 24. The end section typically includes the main bolster, the shear plate or stub wall mounted over the bolster, and the structure of the car lying longitudinally outboard of the main bolster to the corners, or "points" of car 20. It also typically includes the structure of the car extending longitudinally inboard of the truck centers over the inboard wheelsets of trucks 24, and such fenders, or shields, or slope sheets or portions of slope sheets as may extend over the trucks to prevent lading from falling on the trucks, to the transitional structure at which the car body deepens downwardly of the bottom flange or bottom cover plate of the draft sill at the truck center. There may also be a center portion or center section of the car locates between the end portions or end sections, the center portion generally running from one end slope sheet to the other end slope sheet, and including the discharge section of car 20. In terms of car 20, the center section or center portion of car 20 includes a drop-center region in which the lading containment shell extends downwardly below the center sill, and is deeper than the lading containment shell over the end sections.

Figure 1B:
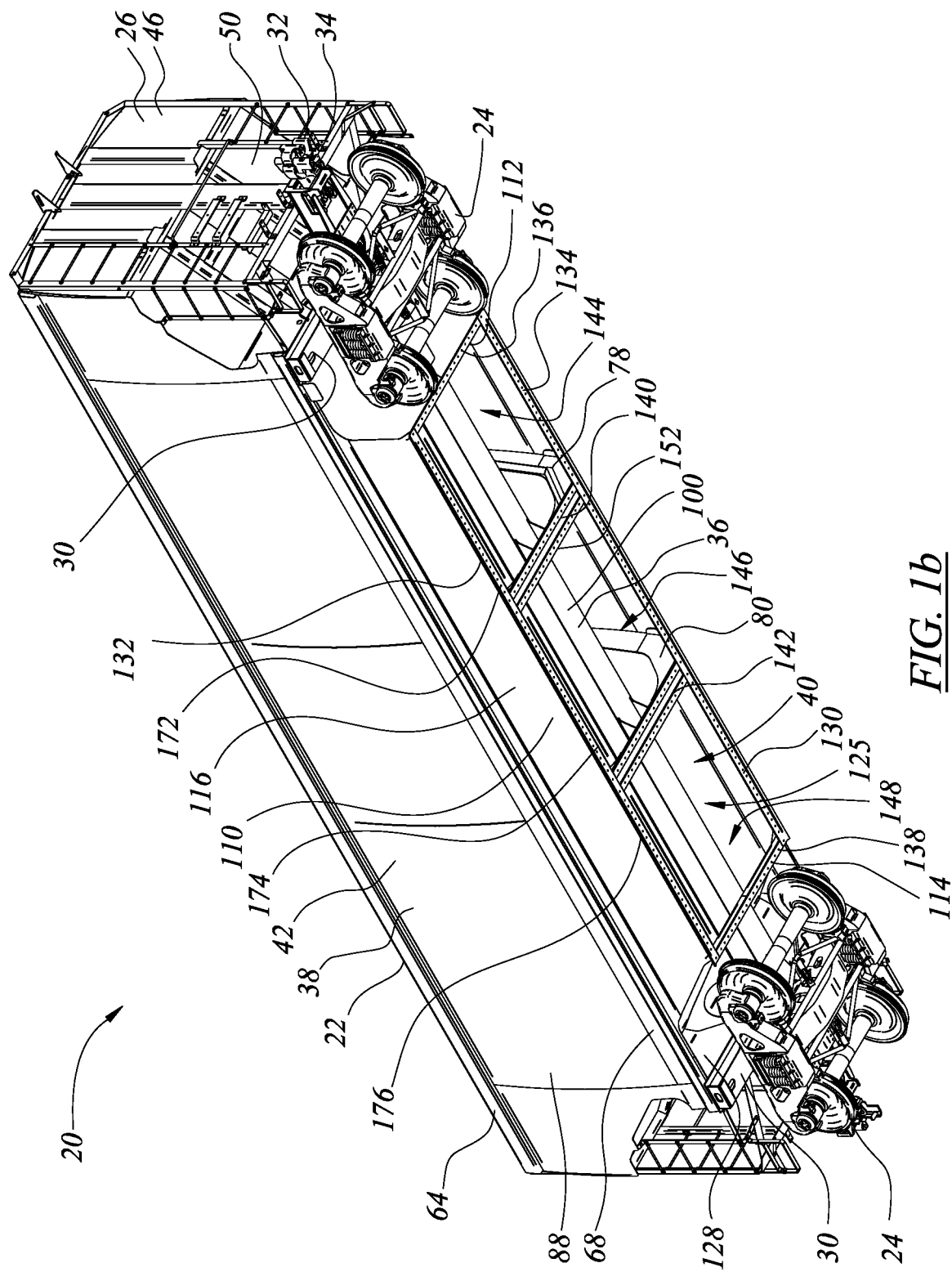
FIG. 1*b* is a an isometric general arrangement view of the railroad freight car of FIG. 1*a* from below to the right and to one end.
Figure 1C:
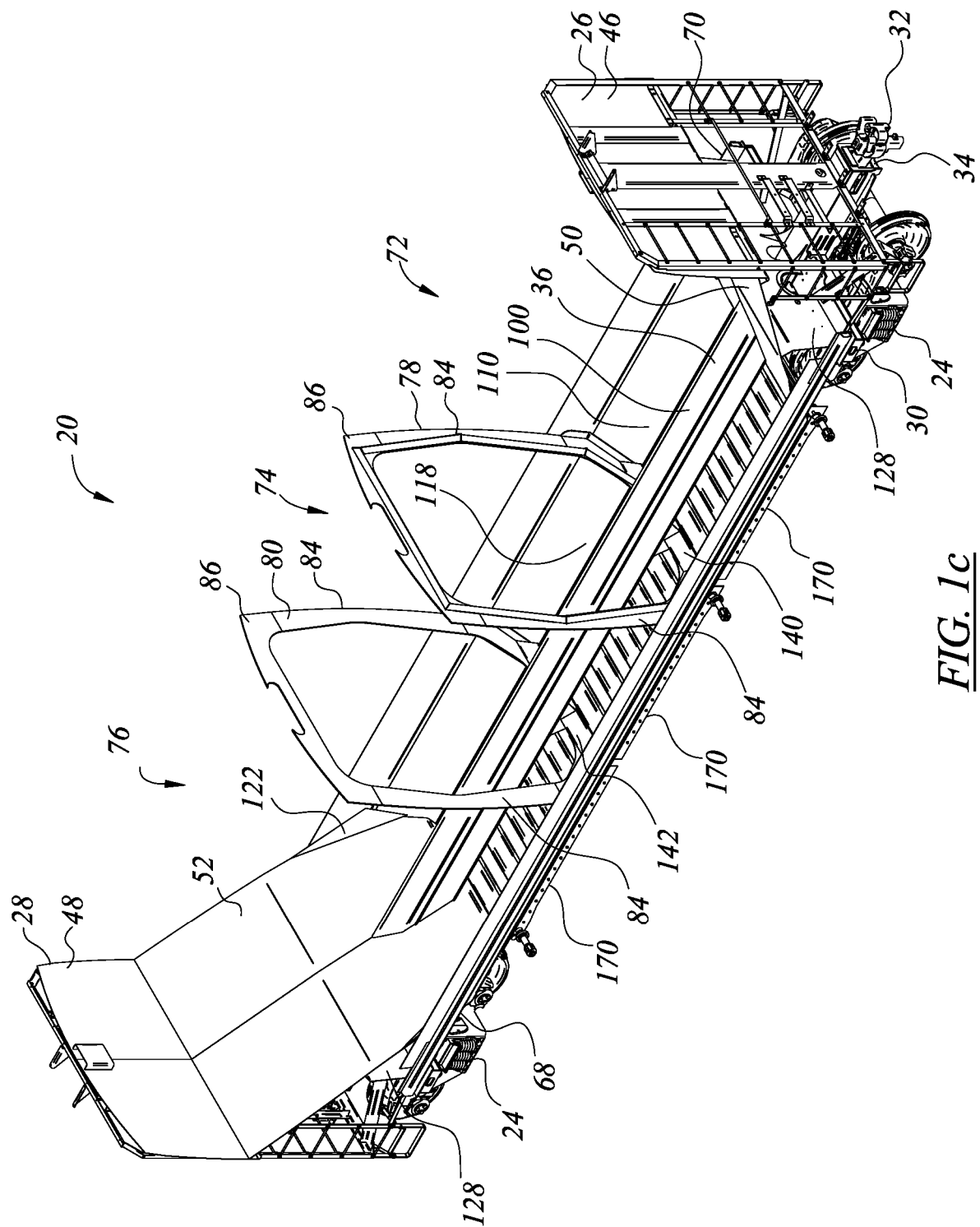
FIG. 1*c* is a view of the railroad freight car of FIG. 1*a* with the roof and side walls removed to reveal interior frames and other details.

As a further matter of definition, as noted, this specification concerns hopper cars. More particularly, it is the nature of hopper cars that they are bottom dumping, or bottom discharging, and have hopper discharge sections constructed toward that end. In this context, hopper cars have been historically distinguished as being distinct from gondola cars. Gondola cars have a lading containment body, but may be emptied by removing lading from the top or by tipping the car body, e.g., as by rotary dumping. A gondola car may be a plain gondola with a flat deck, as in a mill gondola, with a straight through center sill. The center sill may be a fishbelly center sill (i.e., the central portion of the center sill has greater depth between the trucks than at the truck centers over the trucks. Alternatively, gondola cars may have depressed centers, as in a tub gondola car, or bath tub gondola car, such as seen for transporting coal. As indicated on Wikipedia at https://en.wikipedia.org/wiki/Hopper_car, "A rotary car dumper permits the use of simpler and more compact (because sloping ends are not required) gondola cars instead of hoppers." Further, drop center, or depressed center, gondola cars are seen in U.S. Pat. No. 4,331,083 of Landregan et al., and, in a taller version, in U.S. Pat. No. 9,346,472 of Black et al. As can be seen, Landregan FIG. 1 shows a gondola car with shallow end portions or end sections over the trucks, and a deep central portion or central region between the trucks. The "flat bottom" of Landregan is seen in sheets 106 of Landregan FIG. 1 in side view, and in cross-wise section in FIG. 4. Landregan has a straight-through center sill. Black shows the flat bottom floor of central portion 72 in FIGS. 1f and 2b. Black has stub center sills, and U-shaped cross-bearers (102) that extend between the vertical load-bearing side walls (40, 42). While Landregan and Black have the increased volume of dropped-center gondola cars, they are not hopper cars, and so are not bottom opening, bottom dumping, or bottom discharging, however it may be termed. They must either be emptied from above, e.g., by a shovel system, or the car itself must be tipped as in a rotary dumper.

Figure 1F:
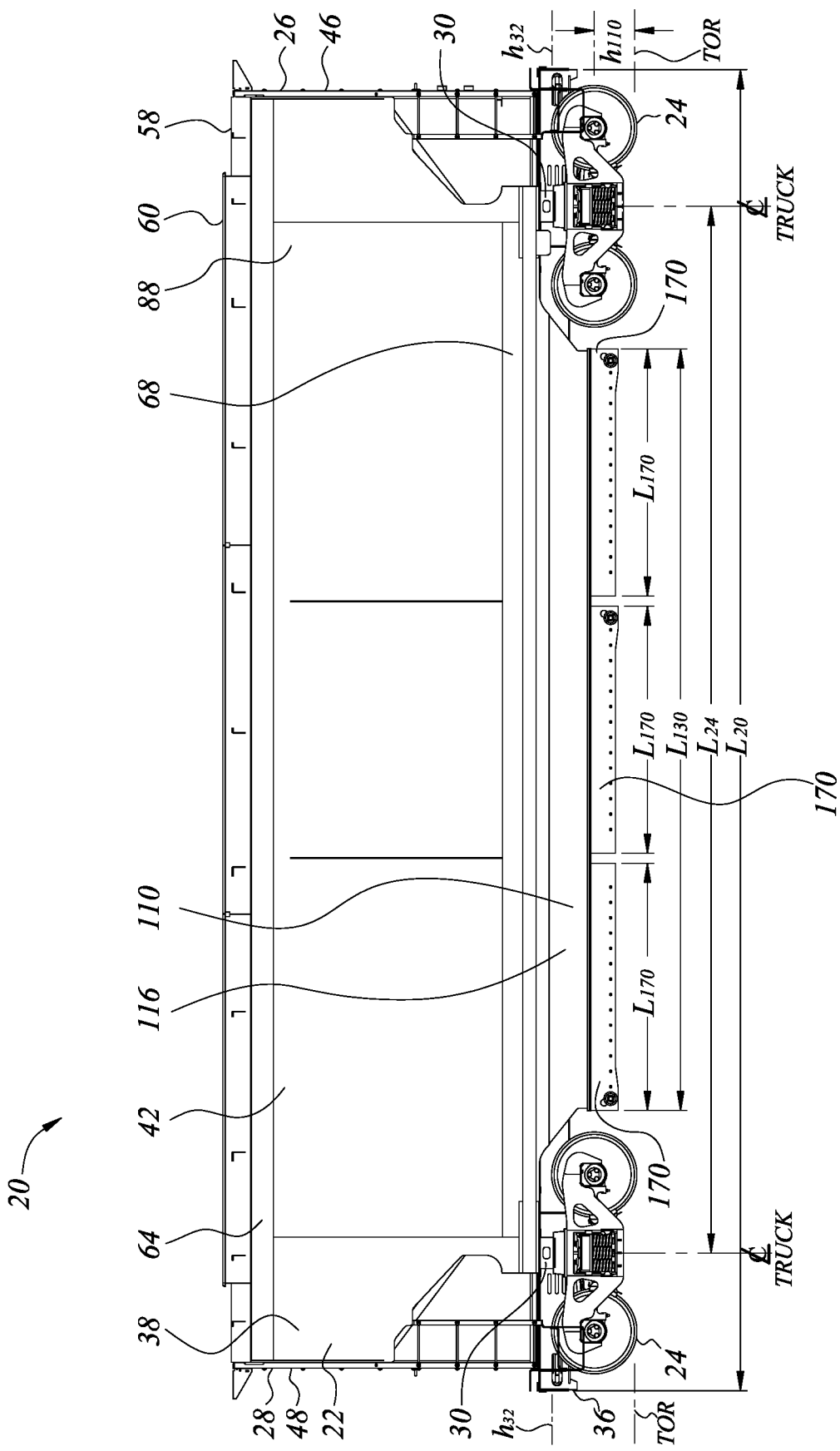
FIG. 1*f* is a side view of the railroad freight car of FIG. 1*a*, the opposite side view being substantially the same, but of opposite hand.
Figure 1G:
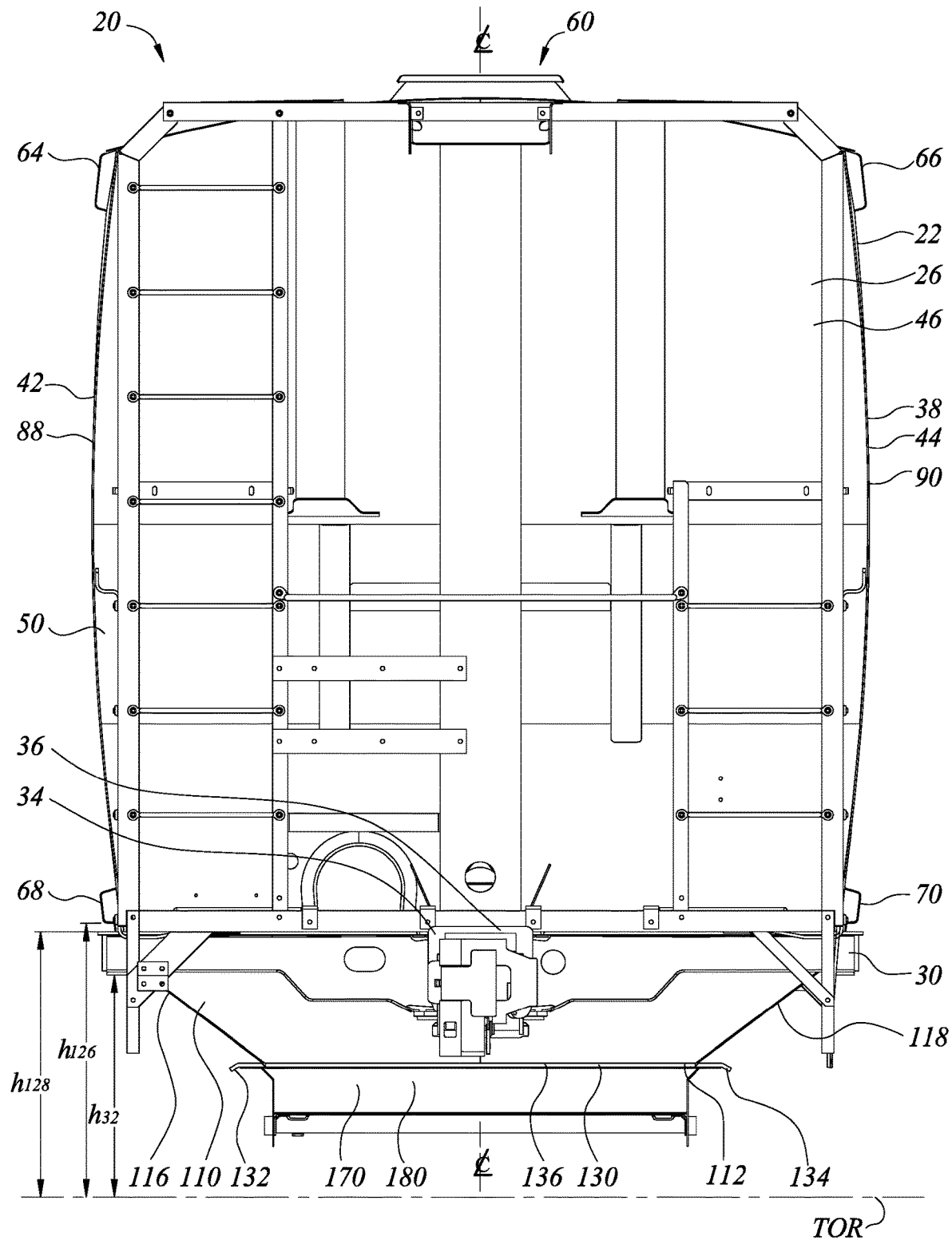
FIG. 1*g* is an end view of the railroad freight car of FIG. 1*a*.
Figure 2A:
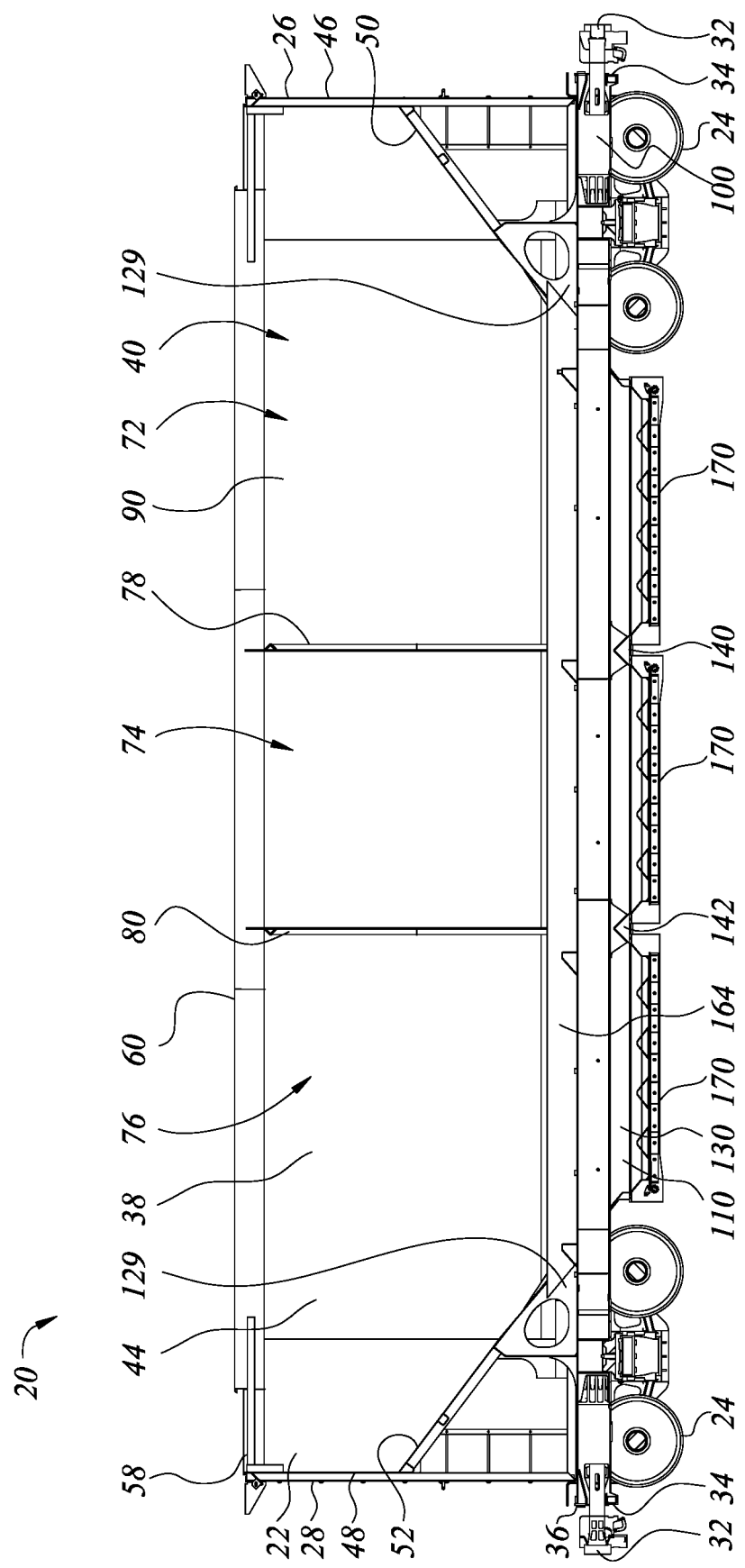
FIG. 2*a* is a sectional view of the railroad freight car of FIG. 1*a* taken on a vertical plane on the longitudinal car centerline at section '2*a*-2*a*' of FIG. 1*d*.
Figure 2B:
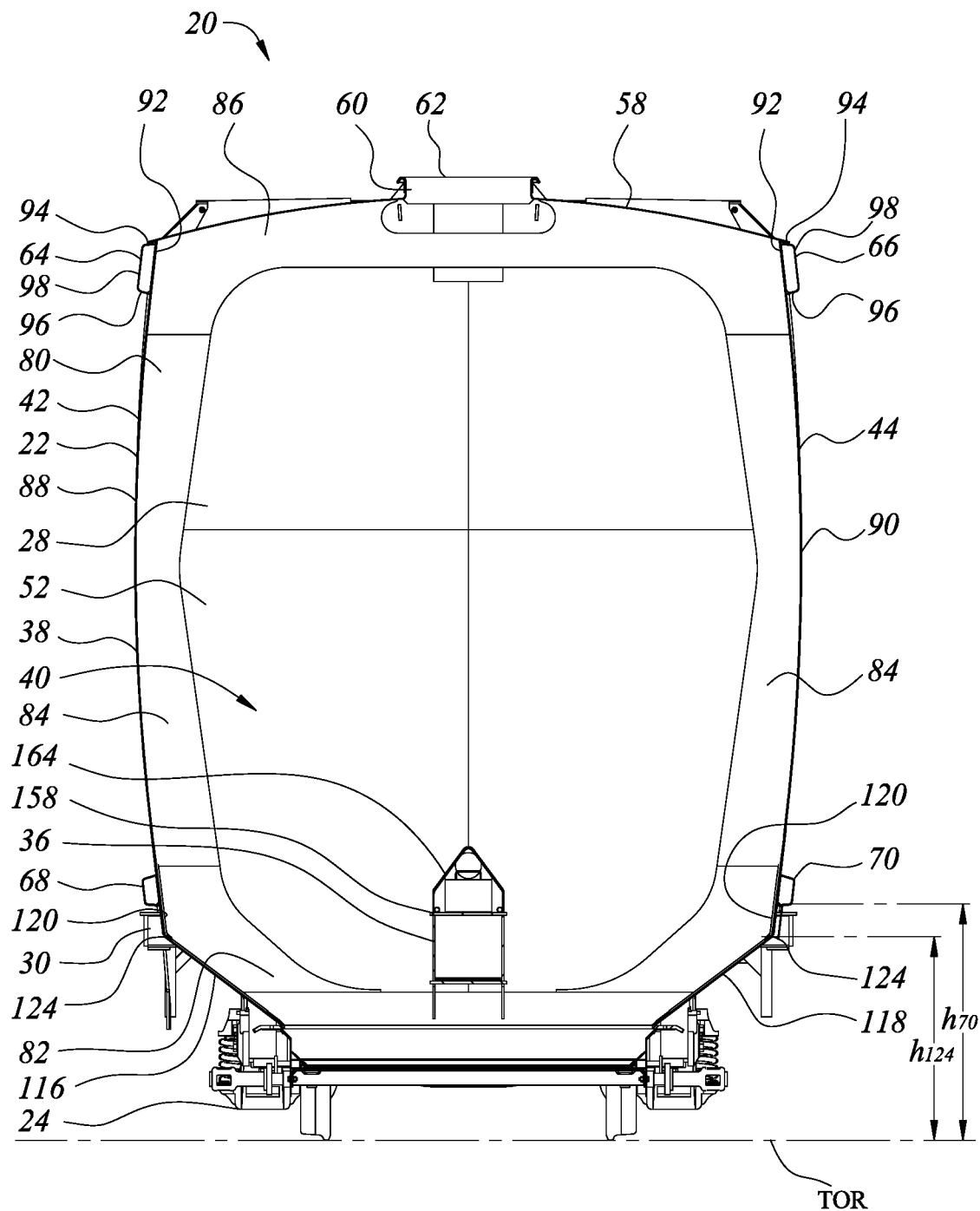
FIG. 2*b* is a cross-sectional view of the railroad freight car of FIG. 1*f* on a plane transverse to the longitudinal centerline taken on section '2*b*-2*b*'.

In car 20 as illustrated, in side view as seen in FIG. 1f, the center portion of the hopper car between trucks 24 approximates the appearance and form of a drop-center portion of a drop-center gondola car. However, unlike a drop center gondola car, car 20 is bottom discharging. In that sense, car 20 could be termed, or thought of as, a bottom discharge gondola car, or, alternatively, a flat bottom hopper car.

As illustrated, in car 20 center sill 36 is a through-center, or straight-through, center sill that runs the length of the car from truck center to truck center, and includes draft sill portions that extend longitudinally outboard of the truck centers. In some embodiment herein, the truck center distance is less than or equal to 46 ft.-3 in. In some embodiments, the truck center distance is less than 40 ft., and in the embodiment illustrated the truck center distance is 39 ft.

Body 22 also includes a lading container, or wall structure, or containment shell, 38. The space within containment shell 38 defines the chamber, or accommodation, or enclosed space, or internal volume 40 that can be filled with lading. In that sense, enclosed space 40 defines the useful volume of the car that can be filled with lading to be transported. In some embodiments, the car has a volumetric capacity of greater than 5000 cu. ft. In these embodiments, the truck center distance is less than or equal to 46'-3". In the particular embodiment shown and described herein the car has a capacity of over 5400 cu. ft., and a truck center distance of less than 40'-0", the truck length shown being about, or up to, 39 ft.

Containment shell 38 includes upstanding side walls 42, 44; upstanding end walls 46, 48; and slope sheets such as end slope sheets 50, 52. In the past, a car having two or more hoppers also may be expected to have intermediate slope sheets. If it is a covered hopper car, containment shell 38 also includes a roof structure 58 having roof sheets 59 and an input opening such as a hatch, or trough, 60. As shown, the opening of trough 60 has a peripheral coaming 61. The trough opening is, in essence, a long slot formed in the center of the roof structure through which to admit lading.

The trough may have a lid or cover, 62, that seats over the coaming to exclude rain, snow, and other contaminants. Car 20 has top chords 64, 66 that run along car 20 from end to end, and that are located at, and may define, the junction at which roof structure 58 meets, and mates with, the upper margins of upstanding side walls 42, 44. Car 20 may also have side sills 68, 70 that run from end to end of the side walls between main bolsters 30.

By definition, a hopper car must have at least one hopper. It can also have more than one hopper. Cars with two, three, four or more hoppers are known. As shown, railroad freight car 20 has zones that could correspond to three such hoppers, namely a first hopper or first region 72 of internal volume 40 (being a first end hopper), a second hopper or second region 74 of internal volume 40 (being in internal, mid, or central hopper), and third hopper or third region 76 of internal volume 40 (being a second end hopper). In a two-hopper car there would only be two end hoppers, 72 and 76, joined together. In a more-than-three hopper car there would be more than one internal or mid hopper 74 mounted between end hoppers 72 and 76.

In the structure illustrated there are two, (i.e., first and second), intermediate frames 78, 80. Frame 78 is intermediate hopper or region 72 and hopper or region 74; and frame 80 is intermediate hopper or region 74 and hopper or region 76. Were there more than three regions of internal volume 40, there could be correspondingly more frames, there being a frame between each two regions. Frames 78, 80 may not necessarily block communication between adjacent hoppers or regions of internal volume 40. That is, frames 78, 80 may be (and in the embodiment illustrated are), partially open to form an open internal rib, as shown. Frames 78, 80 may have a lower transverse portion or region 82, which extends cross-wise (i.e., across the car, transverse to the center sill in the y-direction) and act as a cross-bearer or cross-tie between the center sill and the two sides of the car body. Frames 78, 80 may also have side portions 84 that extend upwardly and that form internal reinforcements of the first and second side wall sheets 88, 90. Portions 82 and 84 may be joined at, or by, moment connections, or may merge to form a continuous moment-transferring web or stem relative to each other and to the side wall sheets that form flanges relative to those stems. As such, a U-shaped rib is formed. Additionally, there may be, and in the embodiment shown there is, an upper transverse region or portion 86 of ribs or frames 78, 80 that completes, or closes, the space between the mutually opposed upward ends or toes of portions or regions 84 to form a continuous or closed periphery so that the rib forms a continuous ring or O-shape within the car body. Frames 78, 80 may be referred to as ring frames. Frames 78, 80 may be connected to, and may having internal web continuity across body 22 of car 20 through, or below, center sill 36, and may form (and in the embodiment shown, do form) part of the internal skeleton of car 20. Frames 78, 80 arer internal frames. Alternatively, or additionally, in other embodiments, external reinforcements may be added to side walls 42, 44 on the outside of first and second side wall sheets 88, 90.

The hoppers, or hopper regions 72, 74, 76 (and so on), may be generally open as between each other, as in the embodiment shown in FIG. 1c. Alternatively they may have continuous, laterally extending bulkheads or partitions or webs that segregate the content of one hopper portion or region from the next-adjacent one. Such partitions may also function as lateral reinforcements, or shear plates, or frames, such as may tend to encourage containment shell 38 to maintain its shape. The presence of such partitions would divide internal volume 40 of car 20 into distinct and separate hoppers. However, where there is no such bulkhead or partition, car 20 as shown has, in effect, a single continuous hopper or lading containment space or volume.

As noted, top chords 64, 66 run along the respective upper margins of side walls 42, 44. That is, each side wall 42, 44 may be considered to be a deep section beam that includes the respective side sill 68, 70, the side sheet 88, 90, and the top chord 64, 66. In such a structure the side sill functions as, or defines, the bottom flange of the deep beam, the top chord functions as, or defines, the top chord of the deep beam; and the side sheet functions as, or defines, the upstanding shear web that provides a shear connection between the top and bottom chords of the beam. End walls 46, 48, slope sheets 50, 52 and intermediate frames 78, 80 impose a curved profile on side sheets 88, 90, and discourage buckling in the arcuate surface profile of the shear web. Top chord 64, 66 may itself be a hollow structural section having a leg 92 that mates with the upper margin of side wall sheet 88 or 90, as may be, and a lateral flange 94 the forms the upper margin, or upper flange of the section. It may also include a lower flange 96 and a second leg 98. The legs and flanges 92, 94, 96 and 98 co-operate to form a closed periphery hollow section. Lower flange 96 may be formed on a diagonal, or oblique angle, the better to merge less abruptly with the side wall sheet 88, 90, at a chamfer or radius, rather than at a square edge. Where hopper car 20 includes a roof structure 58, as when hopper car 20 is a covered hopper car, sheets 59 of the roof section may meet the upper margin of the respective side wall 46, 48 at top chord 64, 66, such that roof sheet 59, being mounted to the top chord, and therefore in structural co-operation with sheet 88 or 90, may function as an extended, predominantly lateral, out-of-plane section that also functions as a flange relative to side wall sheet 88, 90 as may be.

Figure 2C:
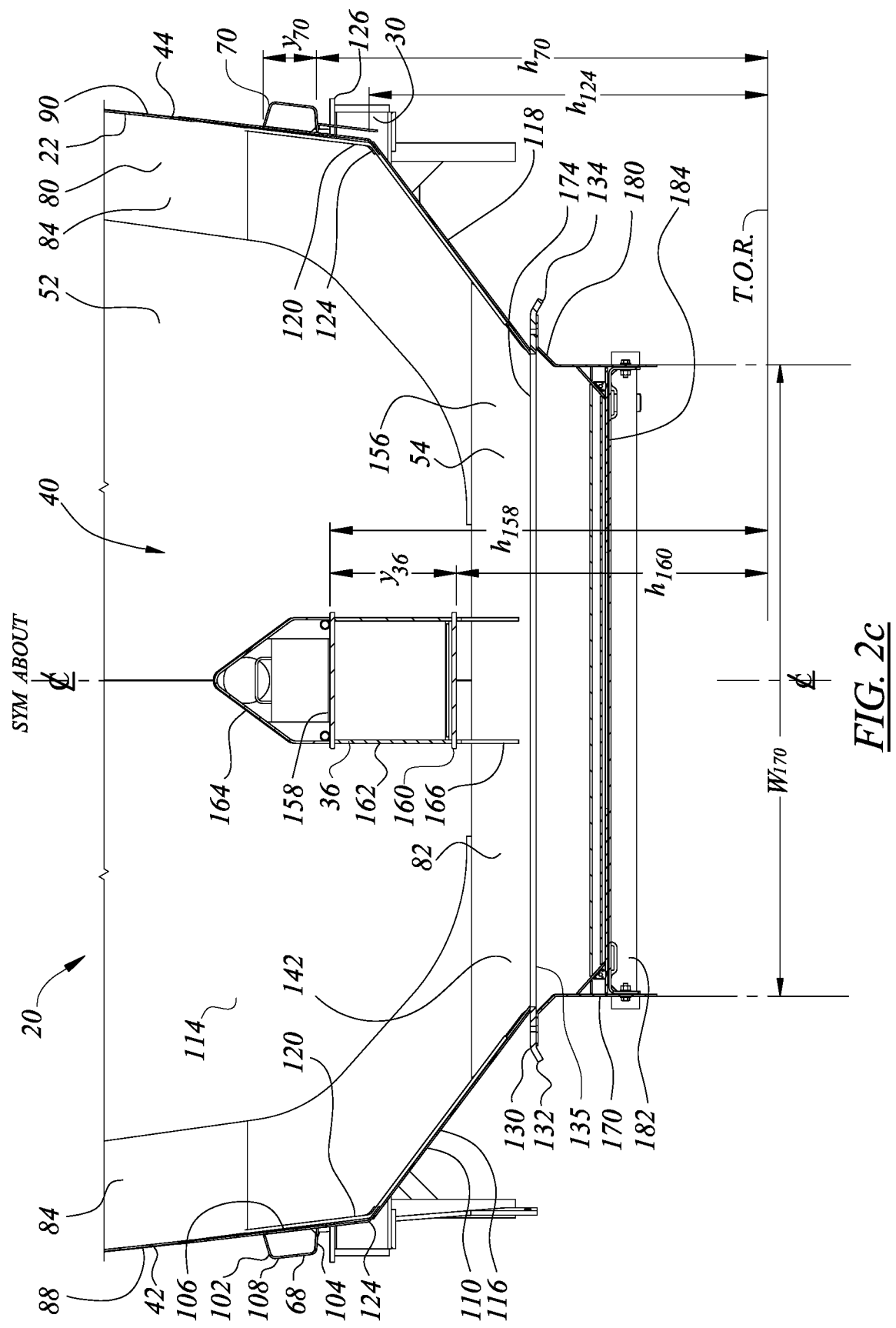
FIG. 2*c* shows an enlarged detail of the cross-section of FIG. 2*b*.
Figure 2D:
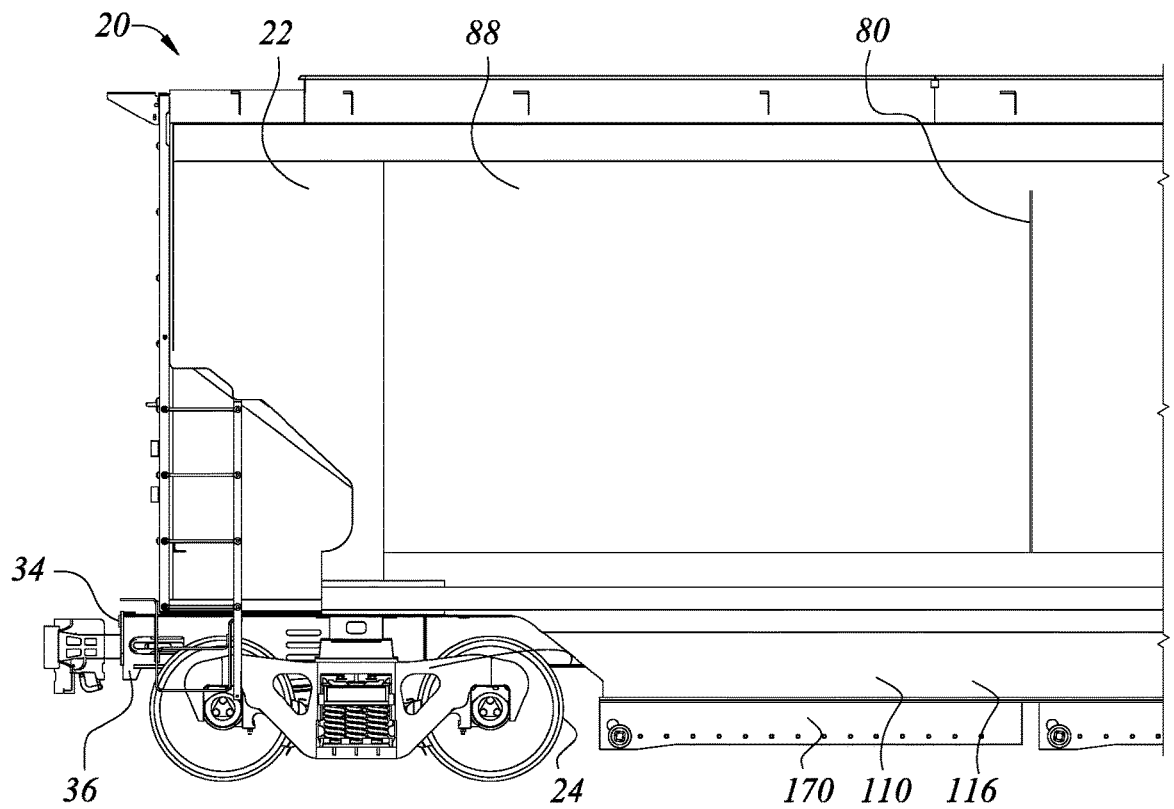
FIG. 2*d* shows an enlarged detail of the side view of FIG. 1*f*.

In the lower portions of car 20, there may be, and in the embodiment illustrated there is, primary structure termed the underframe 100 of car 20. Underframe 100 may include center sill 36, which includes draft sills longitudinally outboard of the truck centers. It may also include, and in the embodiment illustrated does include, side sills 68, 70 running lengthwise along either side of the car; and main bolsters 30. Main bolsters 30 are mounted transversely to center sill 36 at the truck centers. The laterally outboard ends of main bolsters 30 are structurally interconnected with the end regions of side sills 68, 70. The end sections of car 20 include a stub wall 128 that extends in a vertical plane upwardly from main bolster 30. The upper margin of stub wall 128 is bent, or flanged, to intersect perpendicularly with the respective end slope sheet 50, 52. Top cover plate 158 of center sill 36 is coincident with, and may in this region of the car be either defined by, or may be flush with, the top flange 126 of bolster 30, there being web continuity with the upper flange (i.e., top cover plate 158) of center sill 36, and of main bolster 30. Side sills 68, 70 are mounted to the outboard ends of main bolster 30. Each side sill 68, 70 may have a top flange 102, a bottom flange 104, an inside web 106 and an outside web 108 that co-operate to form a closed periphery hollow section. In this case, bottom flange 104 of side sill 68, 70 mounts above top flange 126 of bolster 30. The height of bottom flange 104 is identified in FIG. 2c as $h_{70}$. The overall depth of side sill 68, 70 is identified as $y_{70}$.

Thus far, the description has merely described the layout of hopper car 20 to establish context. The lower portion of body 22 of car 20 includes at least one hopper discharge section 110. Hopper discharge section 110 may have, and as illustrated does have, a downwardly convergent set of walls, which may have a truncated upside-down pyramid shape. That shape is achieved with the respective lower margins of 112, 114 of first and second front and rear slope sheets 50, 52, which are extensions thereof; and the lower margins of side slope sheets 116, 118, which extend downwardly and transversely inwardly from side wall sheets 88, 90. Rounded, or radiused, conical section corner inserts or plates 122, may be installed to maintain a constant slope in the corners of discharge section 110. As may be seen in FIG. 2b, the lower skirt or lower margin 120 of side wall sheets 88, 90 extends below the level of the bottom flange of side sill 68, 70, such that the angular transition 124 (i.e., effectively, the bottom edge of the side sheet extension defined by skirt 120, and therefore also the bottom edge or bottom margin of sheets 88, 90) from the profile of the upstanding side wall sheet 88, 90 (seen as a continuous arc in the cross-sectional views of FIGS. 2b and 2c) to the slope of side slope sheets 116, 118 occurs lower than the level of the side sills, and, as illustrated, and below the level of upper flange, i.e., top cover plate 126, of main bolster 30, or, equivalently in car 20, below the level $h_{158}$ of top cover plate 158 of center sill 36. That is to say, side walls 46, 48 have a profile. That profile may be planar in some hopper cars, or it may be arcuate as shown in the illustrations. Side wall sheets 88, 90 follow that profile. Side slope sheets 116, 118 are inclined planes. They do not follow the side wall profile. Rather, there is a slope dis-continuity at transition 124, which may be defined as the locus of intersection of the plane of the mid-thickness of side slope sheet 116, 118 and the arcuate profile of the mid-thickness of sheet 88, 90. Inasmuch as this feature may be formed as a pressing, it may be a radiused curve bending inboard of the defined locus. Unlike customary hopper cars, in car 20 side slope sheets 116, 118 are trapezoids that run the full length of the mid-section, or drop-center, portion of car 20 between trucks 24. The upper edge of the trapezoid is at transition 124. The lower edge is formed into the bottom flange of discharge section 110. The oblique, equal and oppositely angled short sides of the trapezoid conform to the slope of end slope sheets 50, 52. The upper and lower edges are parallel, and are longer than the perpendicular true length on the inclined slope seen in FIGS. 2b and 2c. In the case of car 20, the length of the lower margin is more than double the true inclined slope length, such that the trapezoid can be thought of a being a long, thin trapezoid, with the length running along the car. Notably, although there is more than one hopper region, and more than one hopper discharge gate, the bottom edge of the trapezoid of the slope sheet runs in a continuous straight line from end to end. That is, it does not zig-zag up and down.

This feature relates to the lading capacity of the car. The slope angle of the side slope sheet is often determined by the natural angle of repose, or talus angle, of the types lading car 20 is built to transport, or by the AAR underframe envelope on the various Plate diagrams, e.g., Plate C, Plate F, and so on. To the extent that a wider door (i.e., larger in the y-direction) is used, transition 124 may be lower. That is, the vertical distance of the rise of the sloped surface, delta z, or dz, is smaller than if the door is narrower. This means that the arc length, or slope length, of side slope sheet 116, 118 may tend to be shorter than otherwise. Since the minimum clearance above TOR is fixed, and the vertical thickness of the outlet gate is taken as a constant, then if the side sheet slope length is shorter, because the door is wider, then the vertical rise can be shorter, such that the height of transition 124 can be lower. If transition 124 is lower, then the cross-sectional area at that longitudinal station along center sill 36 in the lower portion of the car is correspondingly larger. The coupler centerline height can be taken as a datum, as can the height of the surface of top cover plate 158 of center sill 36 or the bottom surface of bottom flange 160 of center sill 36 in the middle of any of gate assemblies 170, or as can the 98" maximum C of G height. Measuring from any of these reference heights, the cross-sectional area below that datum, is increased relative to a car with a narrower gate. For any length of opening in the x-direction, this would apply. However, lengthening the gate in the x-direction similarly increases the portion of the lading containing volume of the car that is at a lower height relative to any of those reference heights.

This can be expressed in several ways. For example, the "discharge section" of a hopper car can be defined as that portion of the particular hopper in which the lower sheets converge on the angle of repose (or steeper) for the intended lading. In the car shown, the upper end of the "discharge section" terminates at the slope discontinuity between the smooth arc of side sheets 88, 90 and the side slope sheets 116, 118, respectively, at the height of transition 124. The lower end of the discharge section of the hopper ends at gate assemblies 170. As illustrated, gate assemblies 170 are sliding gate assemblies in which opening and closing involves the translational displacement of a door panel along a path or range of travel. That path is typically a linear path, and the door panel usually lies in a plane and travels in a linear path in that plane, although sliding doors of arcuate shape can be made. The plane of travel is generally horizontal, although it is possible to make sliding doors that operate on an incline. The assemblies illustrated are shown as being flat and horizontal.

The transition height in existing cars may be at the level of the side sills. For this purpose the datum side sill height is the height of the lower flange, shown in FIG. 2b as $h_{70}$. However, in car 20, that height is lower than side sills 68, 70, by a distance delta $z=h_{70}-h_{124}$ in FIG. 2b. The effective vertical depth of the main containment shell 38 of body 22 of car 20 above the discharge section has been increased by this distance, and, to the extent that side sheet 88, 90 are predominantly vertical, the height of the centroid of area of the car at any cross-section is reduced by about half that delta z distance, i.e., by vertical depression of the height of transition 124 below the level of side sill 70. In car 20, transition 124 is located more than half the depth $y_{70}$ of side sill 70 below side sill 70. In the embodiment shown it lies more than the full depth $y_{70}$ below. The height of the centroid of cross-sectional area is a proxy for center of gravity when the car is laded. At any given height, the width of the cross-section of the discharge section will be wider than it would otherwise be, again, indicating a greater portion of lading being carried at a lower height. Carrying a larger volume at a lower height tends generally to permit a larger volume of lading to be carried per unit length of the car, and tends to permit a lower center of gravity.

The lowermost portion, or edge, or bottom margin of each discharge section 110 may terminate in a peripheral flange or structure, or framework, or bezel, generally indicated as frame 130. Although, as seen from above (i.e., looking upward or downward along the z-axis at the projected footprint of frame 130), this structure could be round, or oval or elliptical, or such other shape as may be suitable, it may be convenient for that foot-print to be four sided, and for the four sides to form a rectangle. The inside clearance dimensions of the rectangle may be more than 50" wide, and more than 120" long. The clearance rectangle may be 60"-70" wide, and 150-330" long, for example. As shown it is 70"×330". That is, frame 130 may be a unitary hopper discharge outlet frame as shown. As shown, it is the only hopper discharge outlet frame of car 20. Frame 130 may be a rectangular frame having a pair of lengthwise-running frame members, or beams 132, 134, and a pair or cross-wise running members or beams 136, 138 that co-operate to form the rectangle. In car 20, the length of frame 130 (i.e., of members 132, 134) in the x-direction is much longer than the width (i.e., the length of members 136, 138) in the y-direction. In some embodiments, it may be more than double the width. In some embodiments, it may be more than triple the width. As shown it is more than four times the width. Beams 132, 134, may be formed by bending the bottom margins of side slope sheets 116, 118 upwardly and outwardly to lie in a horizontal plane, thereby forming a flange. That flange and the adjacent structurally influenced margin of slope sheet 116, 118 function as an angle iron, i.e., as a formed structural member, or as a reinforcement formed on the lower margin of the respective sheet. Similarly, transverse members or beams 136, 138 are formed by bending the lower margins of end slope sheets 50, 52 upwardly and longitudinally outwardly into a horizontal plane as a flange, whose structural interaction with the adjoining, neighboring portion of slope sheet 50, 52 results in a structure that functions as an angle iron or formed structural member, or as structural reinforcement, however it may be termed. The flanges of side slope sheets 116, 118 and of beams 136, 138 co-operate to form the rectangular form of the engagement interface 135 of frame 130, and lie in datum plane $P_{135}$, lying at a datum height relative to TOR. I.e., they are co-planar. The downwardly facing planar rectangular land of frame 130 defines engagement interface 135 at which the various gate assemblies 170 mate with the car body. Frame 130 (and the edge of the rectangular opening it defines), extends from less than one wheel diameter from the centerline of the axle of the nearest wheelset of truck 24, to the corresponding location at the opposite end of car 20. In car 20, this length extends over the majority of (that is, more than half of) the distance between the truck centers. In another example frame 130 may be more than 3/5 of that length. In still another example it may be more than 2/3 of the truck center length. In the embodiment shown, the length over the frame is more than 70% of the truck center length.

Expressed differently, car 20 has a single discharge catchment, or discharge section that terminates downwardly in a unitary hopper discharge outlet frame 130. Frame 130 is located below the level of the bottom flange 160 of center sill 36. Frame 130 has a length that is greater than 2/5 of the overall length of car 20 measured over striker plates 34. In one embodiment, it may be more than half that length. In the embodiment shown, it is about 58% of the overall length, i.e., greater than 9/16. Looked at in the other direction, frame 130 has an overall width, measured as the inside clearance dimension between beams 132, 134, that is greater than 2/5 of the overall width of car body 22. In one example it may be more than half the width of car body 22. In the embodiment shown it is about 55% of the overall width of car body 22. Expressed in terms of area, a nominal calculated arithmetic area, $A_n$, is obtained by multiplying the car body width (typically 128 inches) by the truck center distance. The overall projected footprint area $A_{130}$ of frame 130, measured over the outsides of beams 132, 134 and 136, 138 may be expressed as a ratio of $A_n$. In some embodiments, that ratio, $A_{130}/A_n$ is greater than 1/5. In another example it is greater than 3/10. In the embodiment shown, it is greater than 35%. In the embodiment shown, it is about 3/8. Another way of expressing this feature is to relate it to the AAR underframe plate diagram. In the AAR Plate diagrams, be it for AAR Plate B, AAR Plate C, AAR Plate E, or AAR Plate F, the lowermost plate boundary has a width of 7 ft-4 in., i.e., 88 inches. For whatever Plate size or standard may govern, car 20 may have a bottom discharge opening envelope area $A_{130}$, as noted above, that has a width that is more than ¾ of the lowermost Plate boundary width, and, as in the embodiment illustrated, is more than ⅘ of the lower Plate boundary width. Similarly, a lower nominal projected area $A_L$ may be defined as the product of the truck center distance multiplied by the Plate lower boundary width. A ratio of the projected opening are $A_{130}/A_L$ may then be greater than ⅖, and in the embodiment illustrated is greater than ½, being about 6/11 or 11/20, i.e., 55%.

Figure 2E:
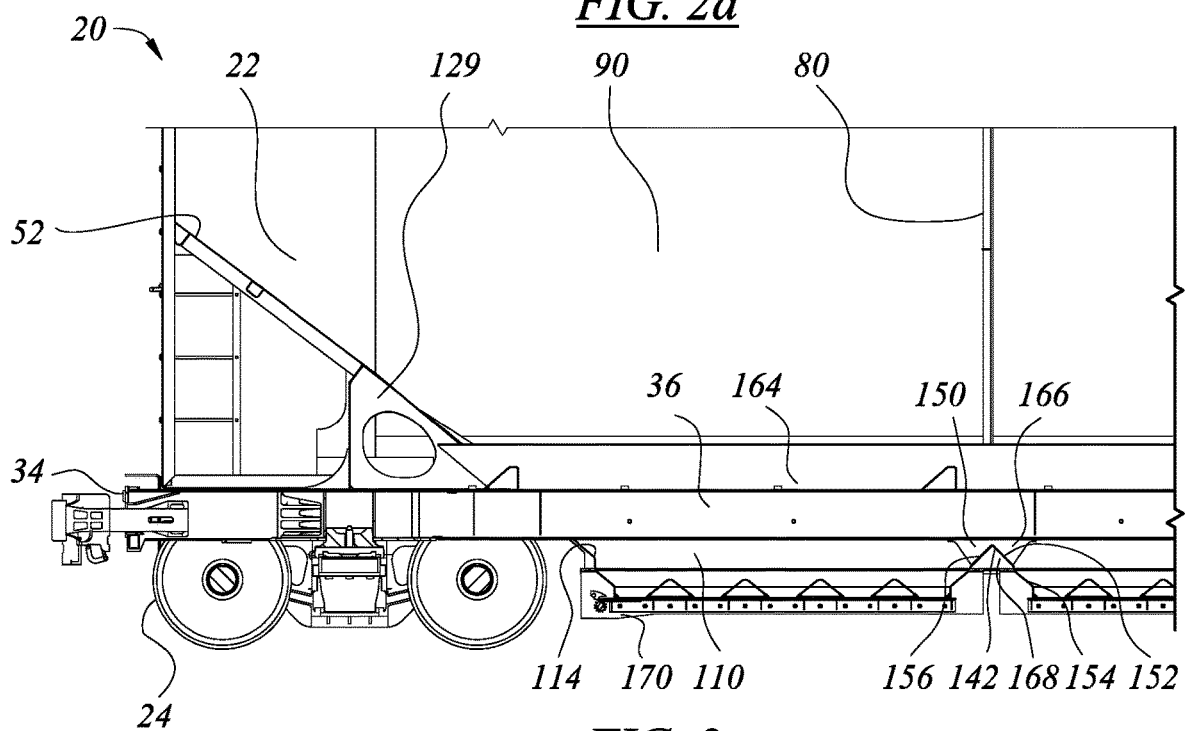
FIG. 2*e* shows an enlarged detail of the cross-sectional view of FIG. 2*a*.
Figure 2F:
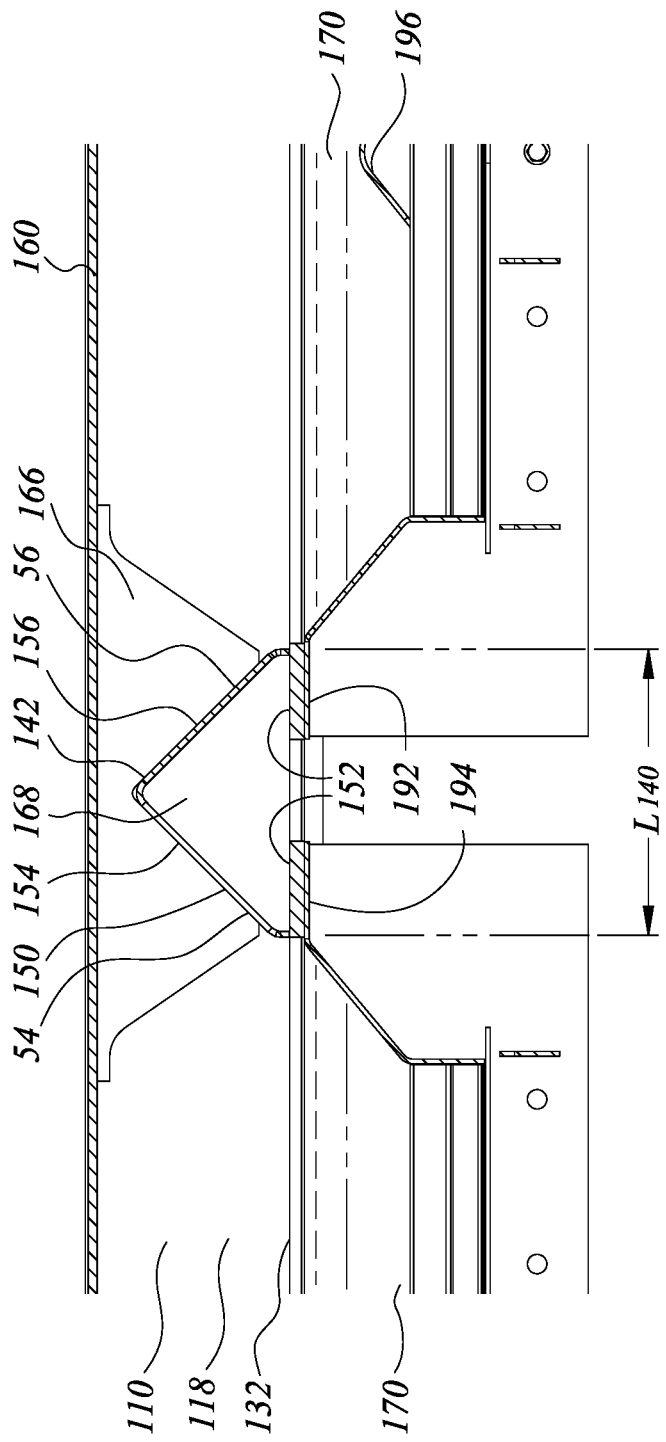
FIG. 2*f* shows a further enlarged detail of the cross-section of FIG. 2*e*.
Figure 3A:
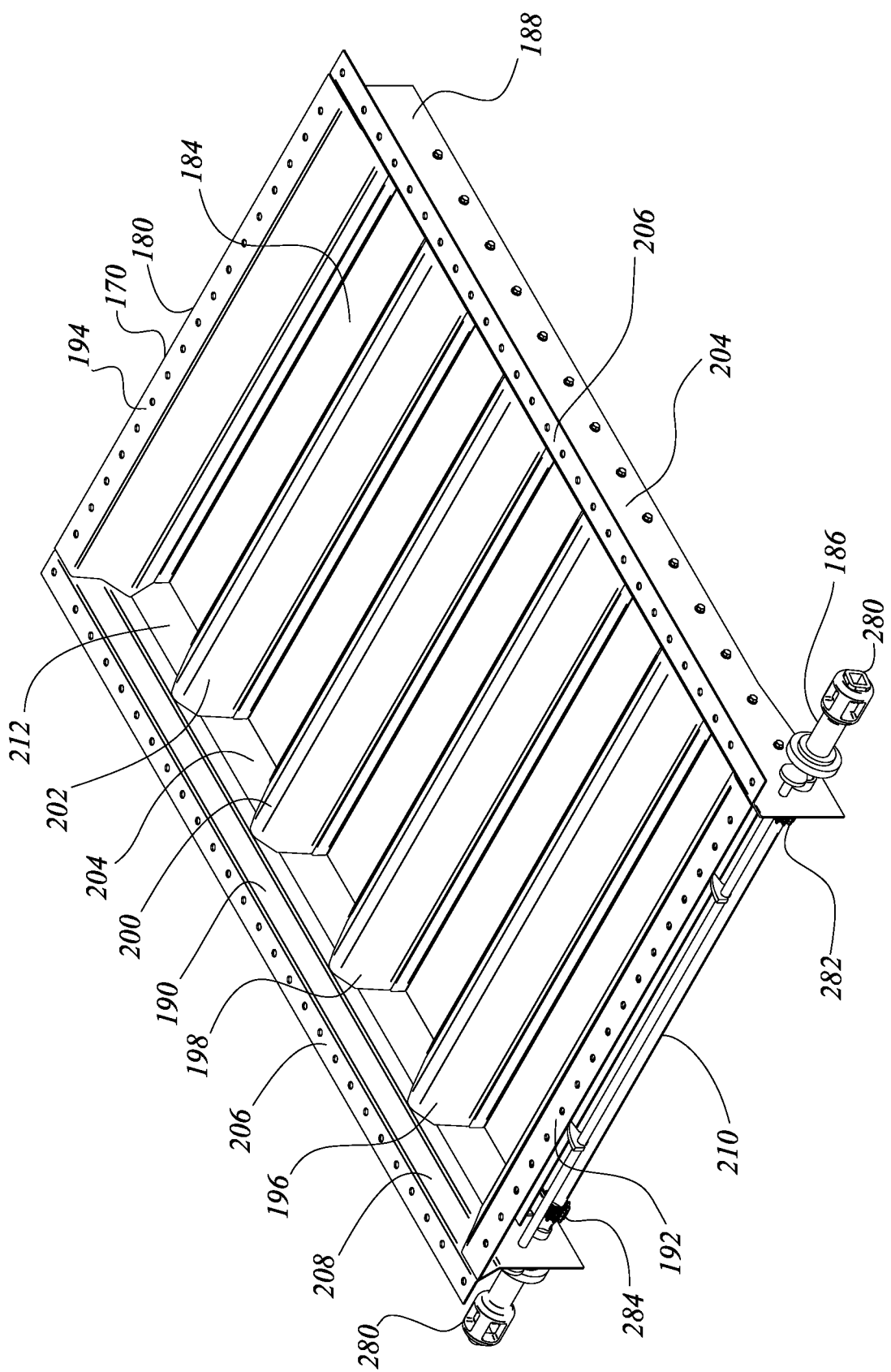
FIG. 3*a* is a perspective view from above and to one side of a gate assembly for the hopper car of FIG. 1*a*.
Figure 3B:
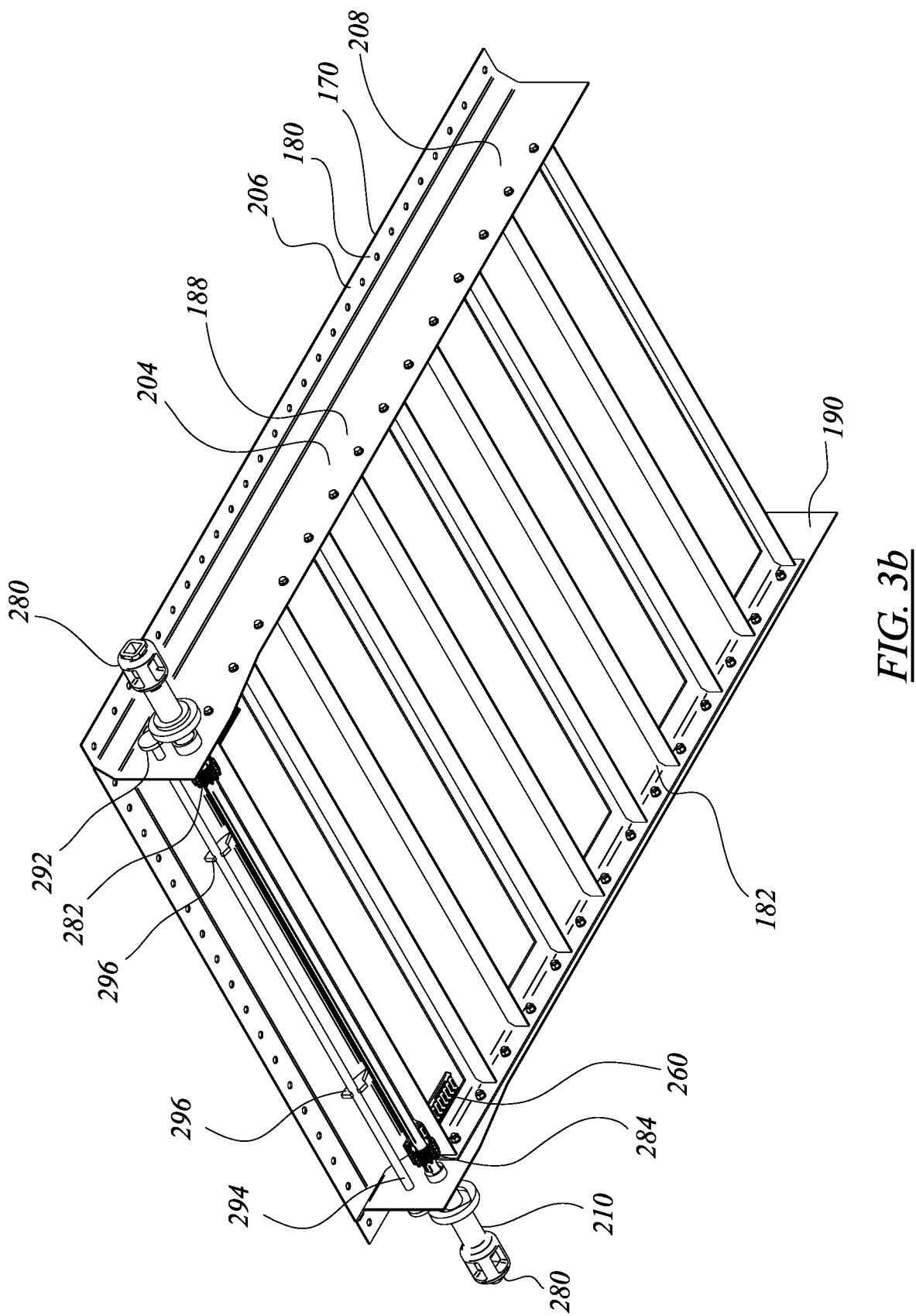
FIG. 3*b* is a perspective view of the gate assembly of FIG. 3*a* from below.
Figure 3C:
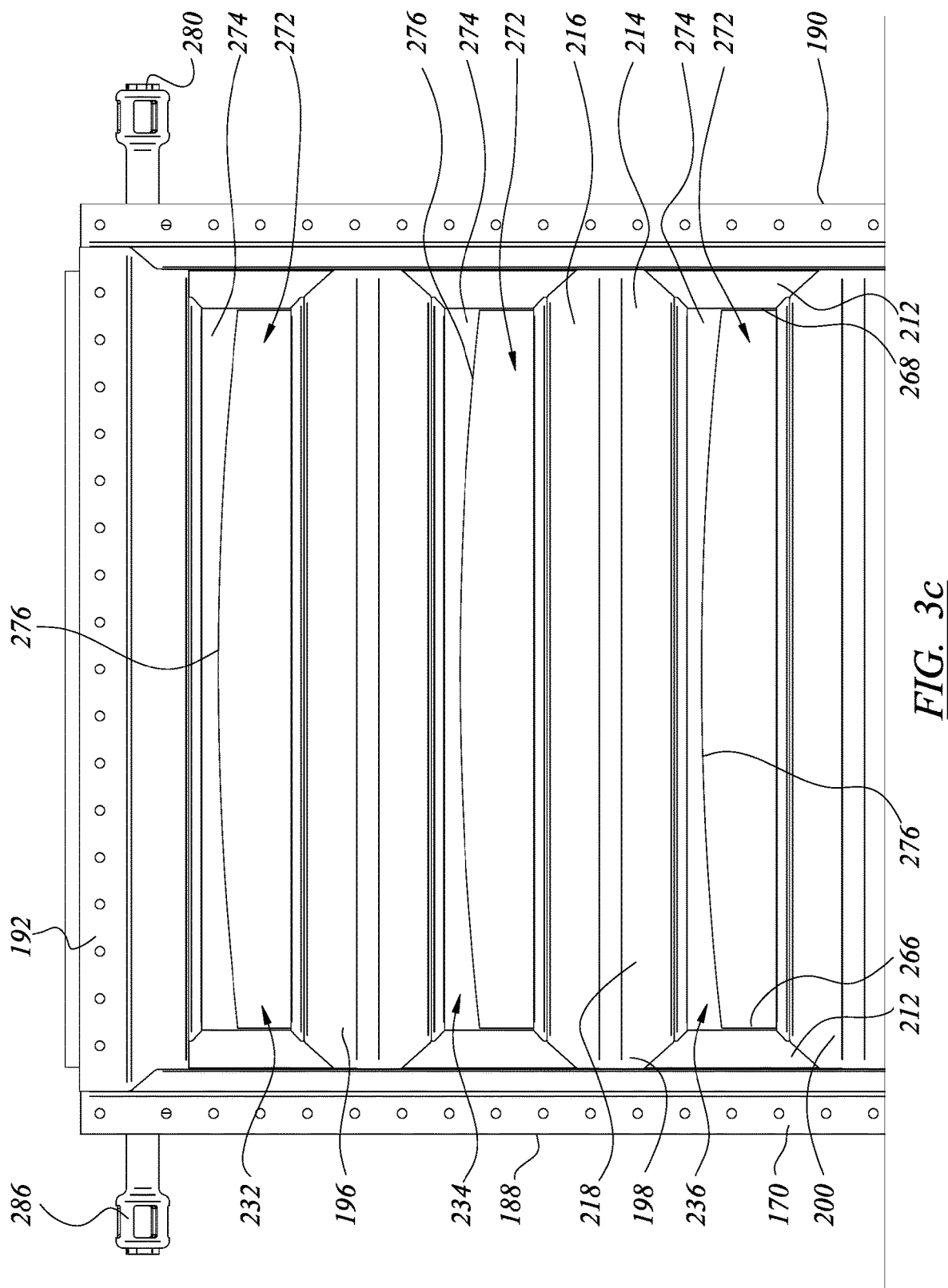
FIG. 3*c* is a top view of half of the gate assembly of FIG. 3*a*.
Figure 3D:
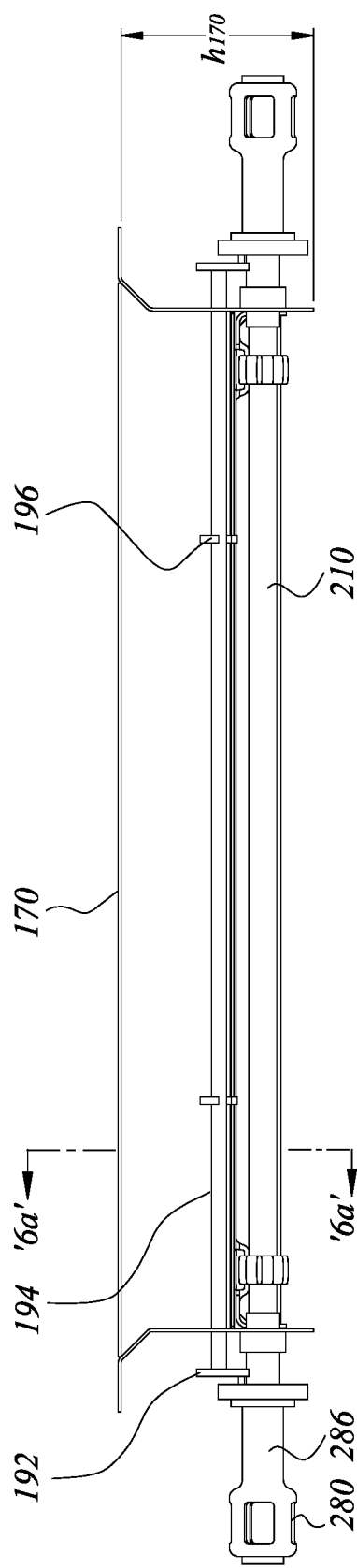
FIG. 3*d* is an end view of the gate assembly of FIG. 3*a*.
Figure 3E:
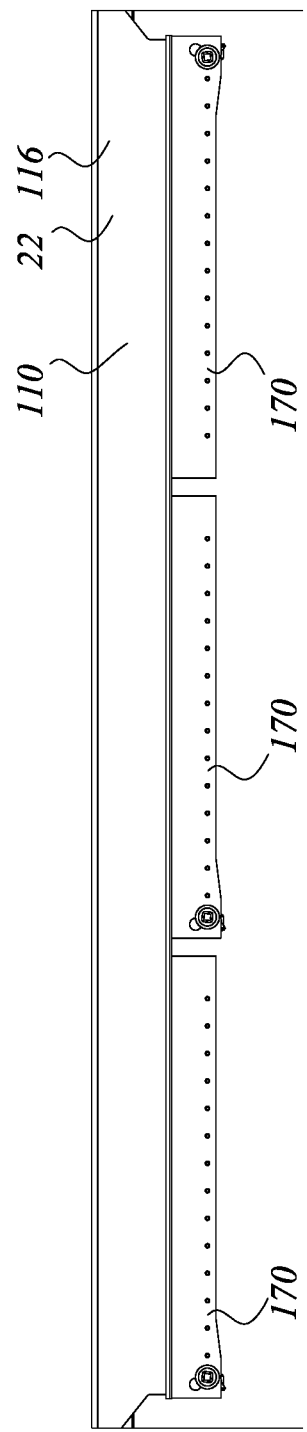
FIG. 3*e* is a side view of the layout of three gate assemblies of FIG. 3*a* as mounted to the body of the railroad freight car of FIG. 1*a*.
Figure 3F:
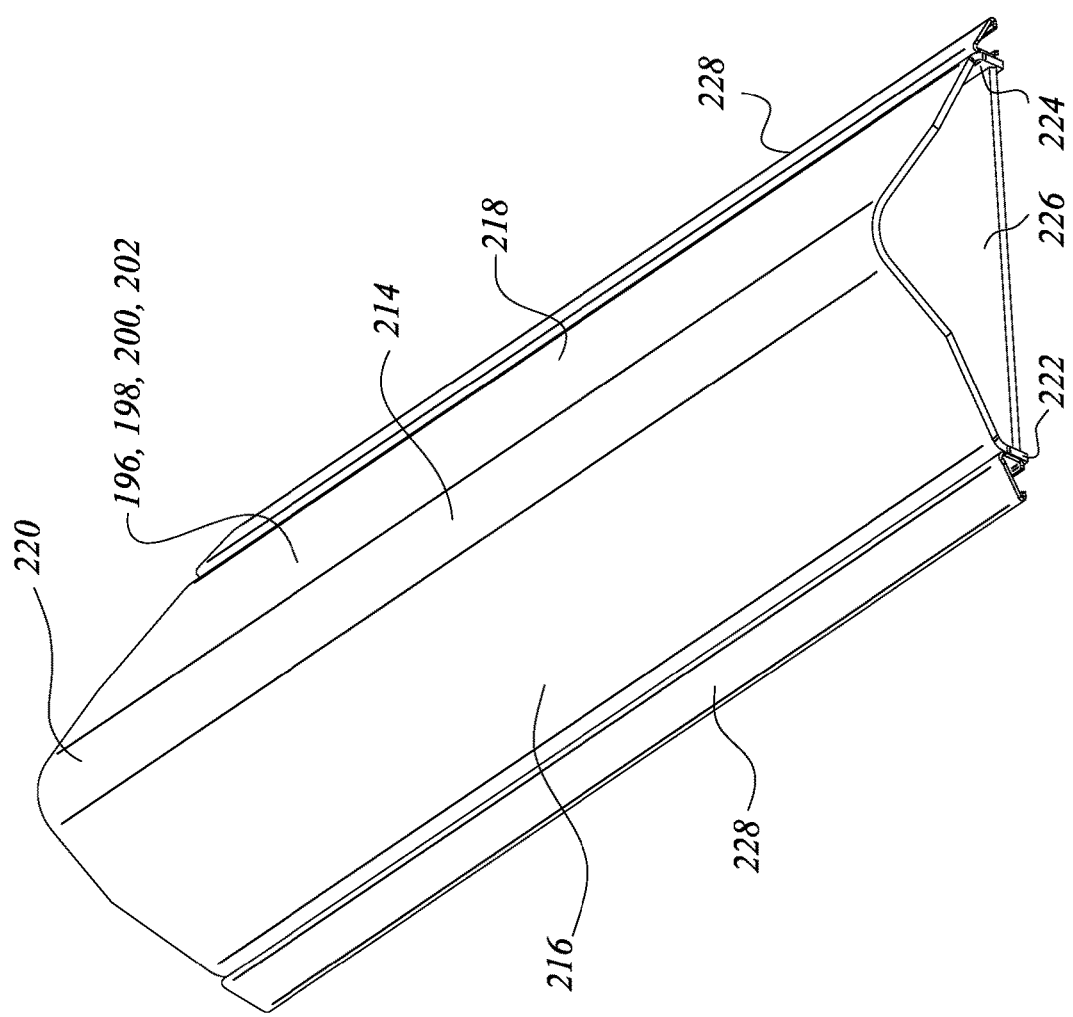
FIG. 3*f* is a perspective view of the cross-member of the gate assembly of FIG. 3*a*.
Figure 3G:
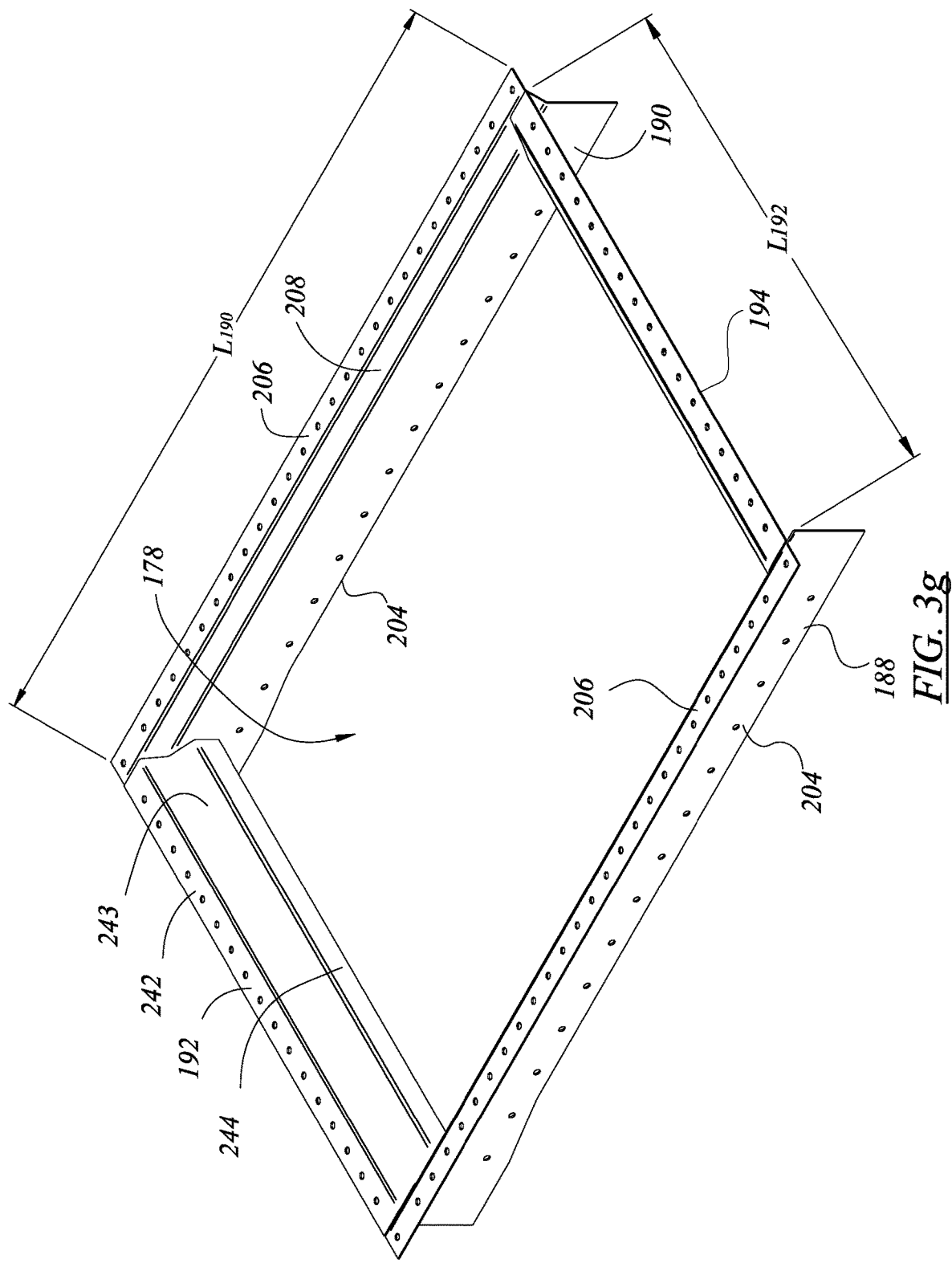
FIG. 3*g* is a perspective view of an external frame of the gate assembly of FIG. 3*a*.
Figure 4A:
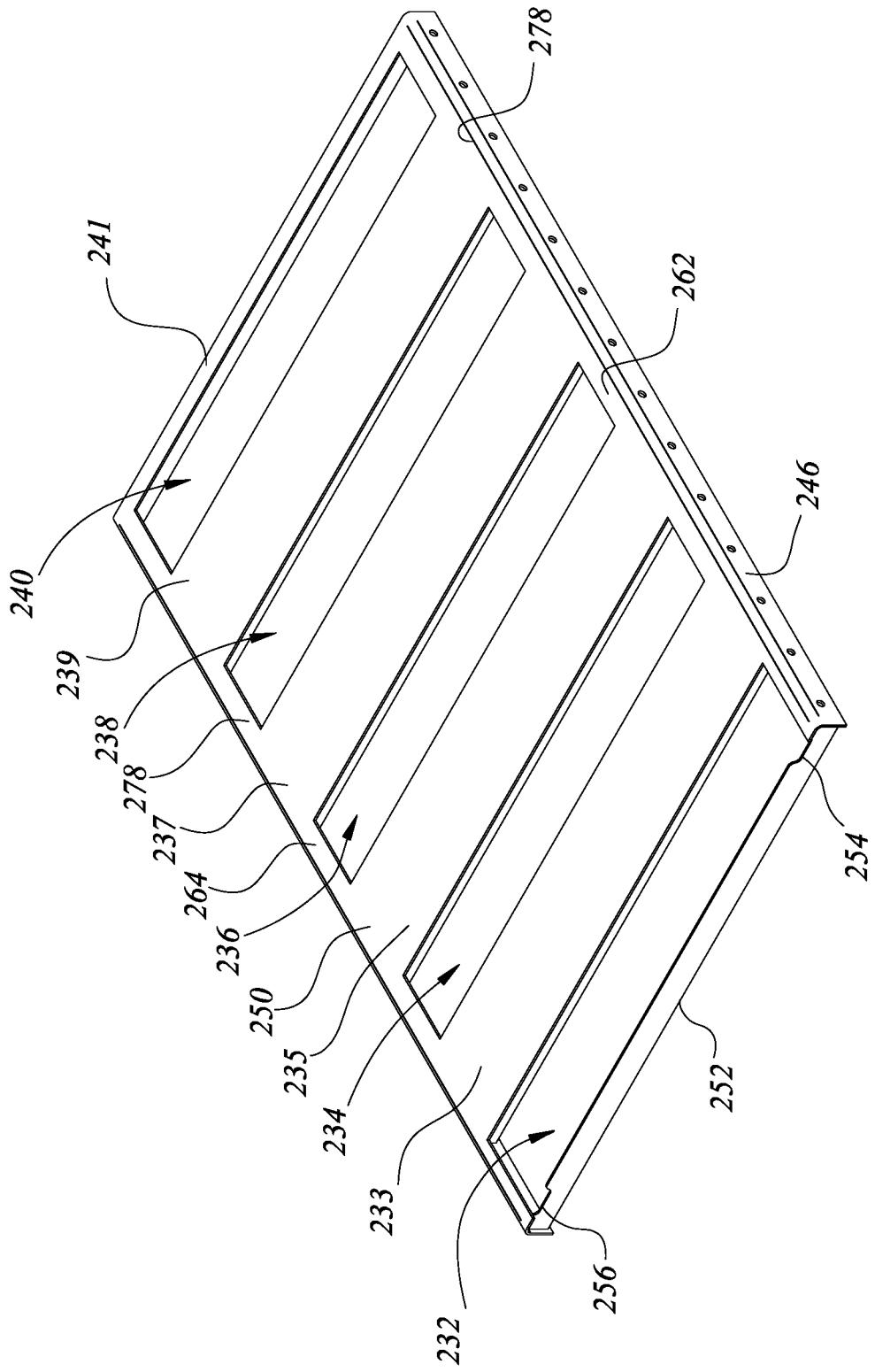
FIG. 4*a* is a top perspective view of the stationary member of the shutter assembly of FIG. 3*a*.
Figure 4B:
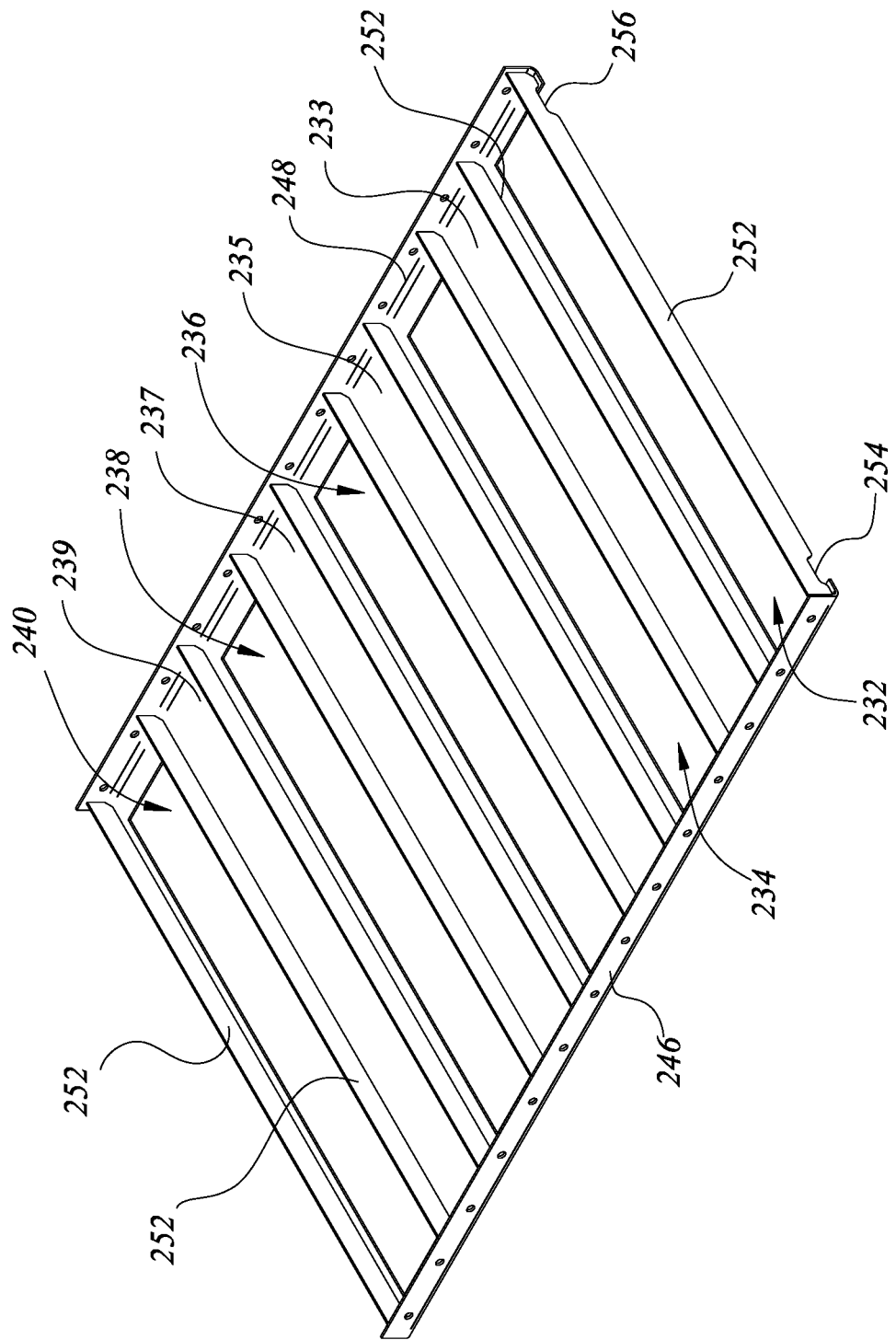
FIG. 4*b* is a bottom perspective view of the stationary member of the shutter assembly of FIG. 4*a*.
Figure 4C:
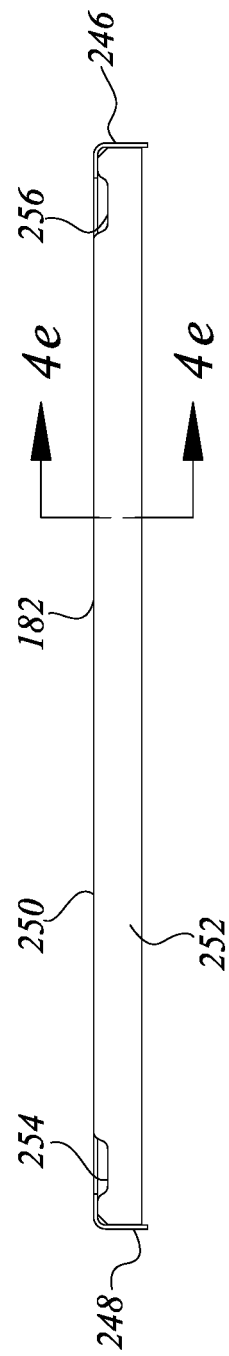
FIG. 4*c* is an end view of the stationary member of the shutter assembly of FIG. 4*a*.
Figure 4D:
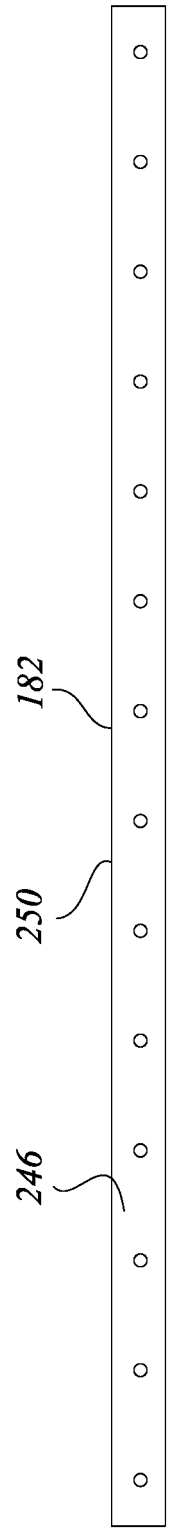
FIG. 4*d* is a side view of the stationary member of the shutter assembly of FIG. 4*a*.
Figure 4E:
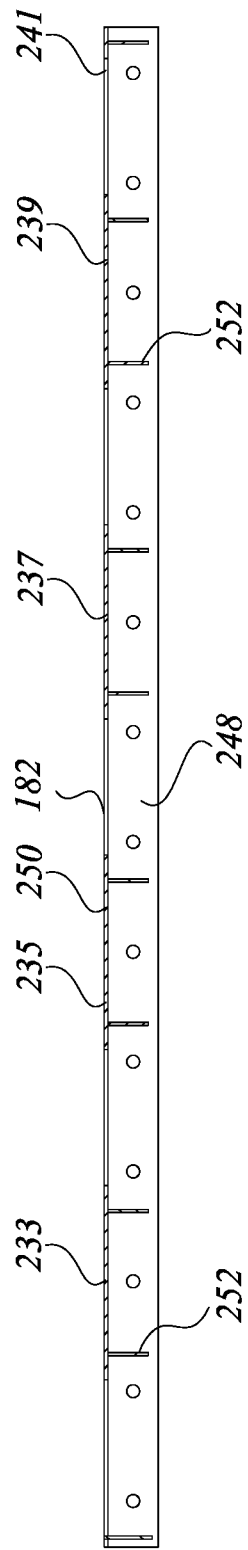
FIG. 4*e* is a cross-sectional view of the stationary member of the shutter assembly of FIG. 4*a* taken on section '4*e*-4*e*' of FIG. 4*c*.
Figure 4F:
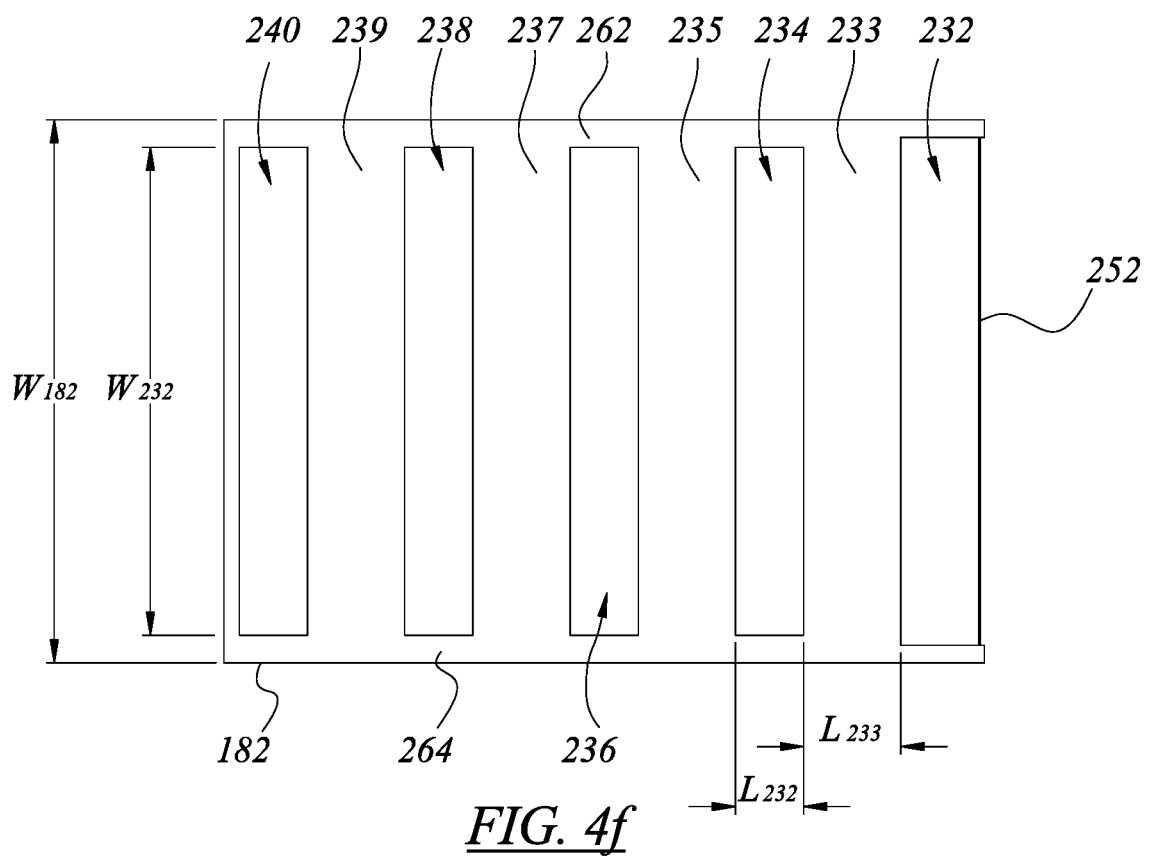
FIG. 4*f* is a top view of the stationary member of FIG. 4*a*.
Figure 4G:
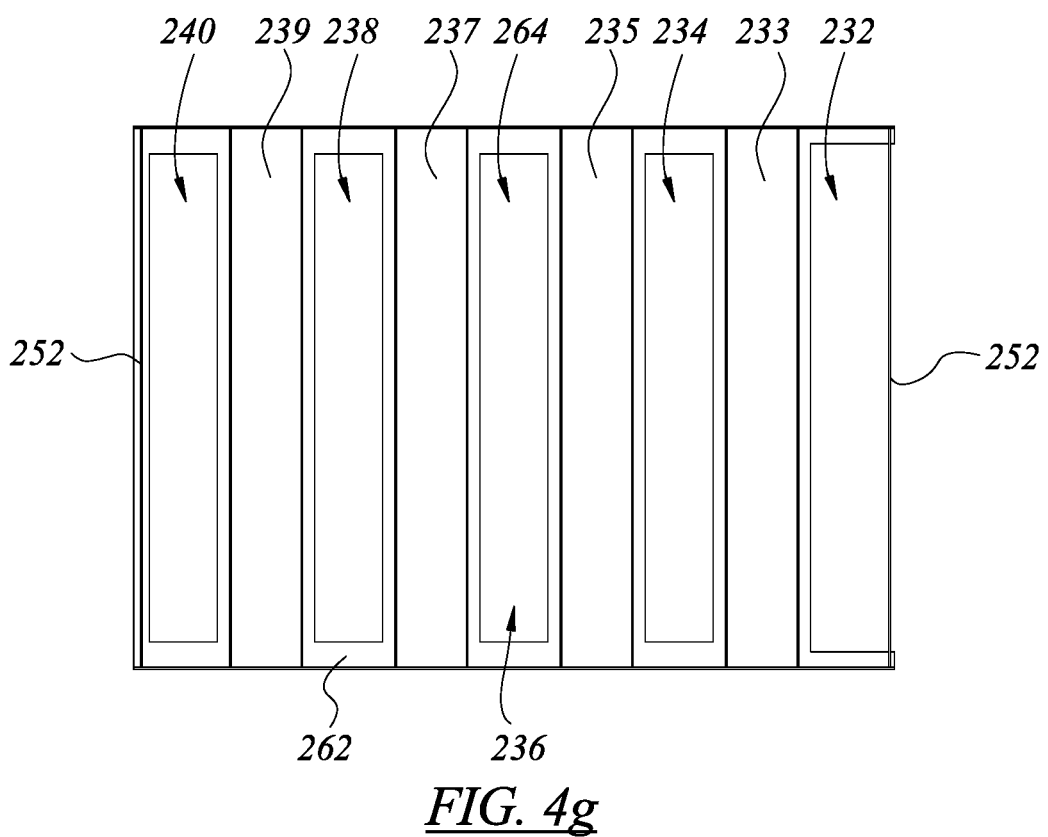
Figure 5A:
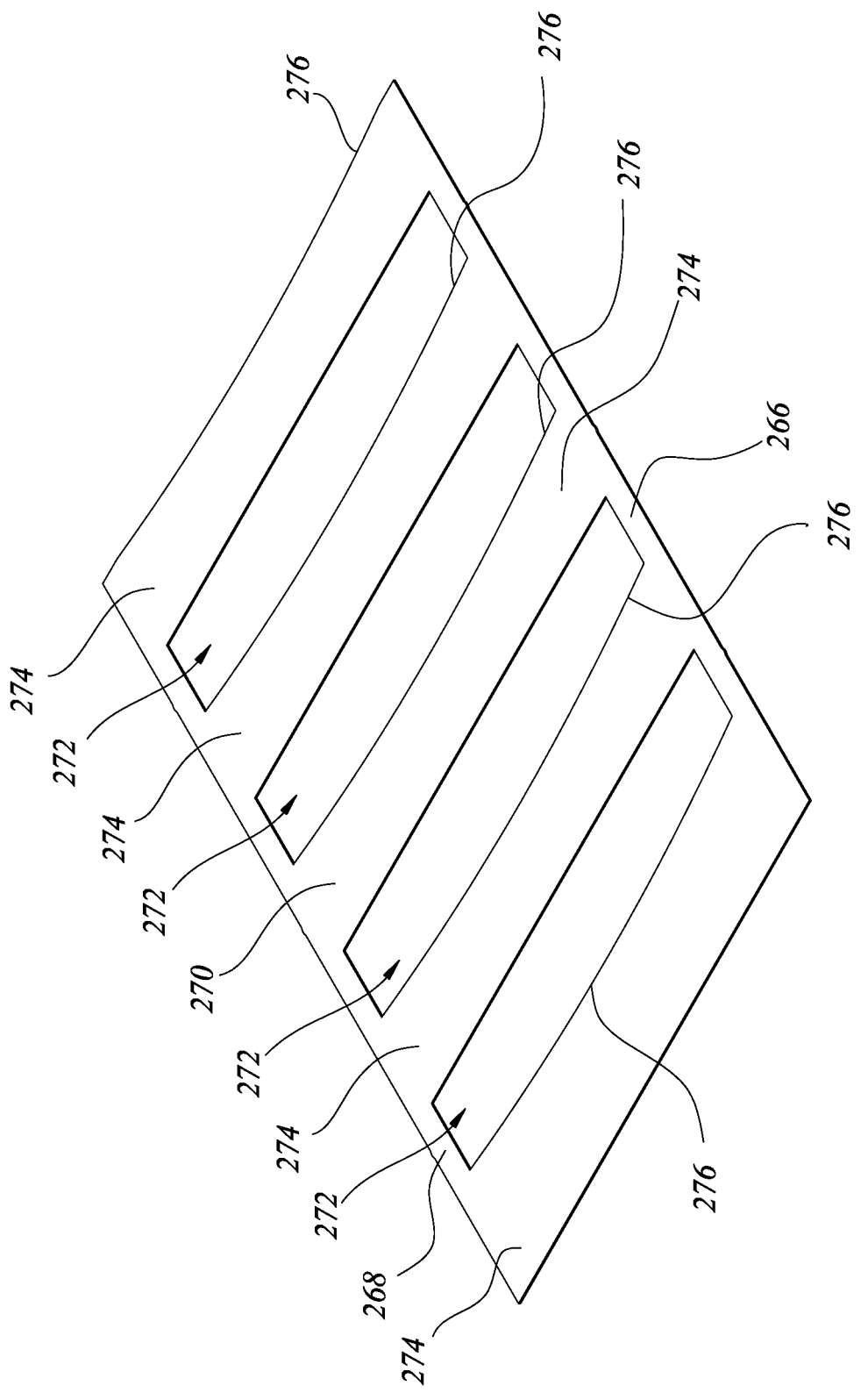
Figure 6A:
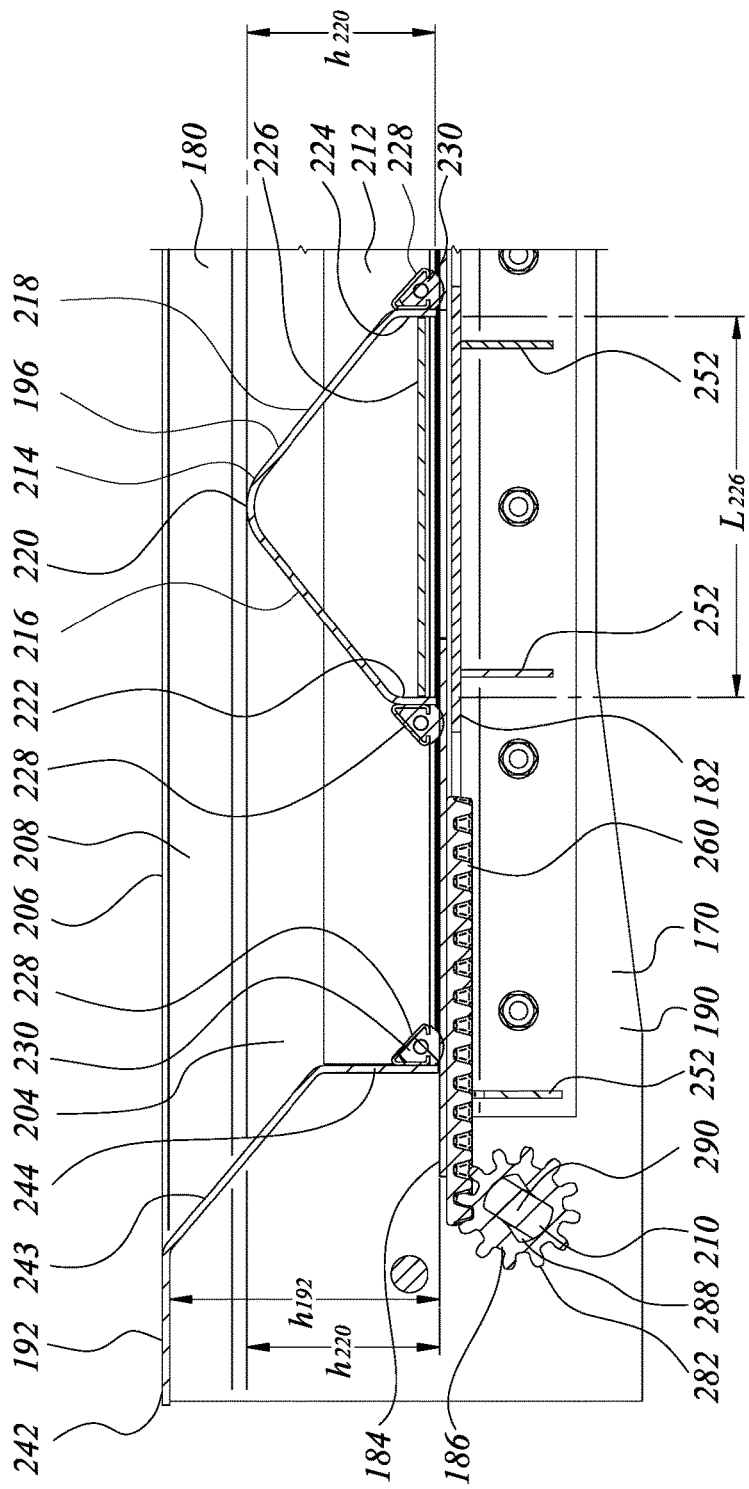
FIG. 6a is a cross-section of an enlarged detail of the gate assembly of FIG. 3a, on the railroad freight car of FIG. 1a, on section '6a-6a' of FIG. 3d.
Figure 6B:
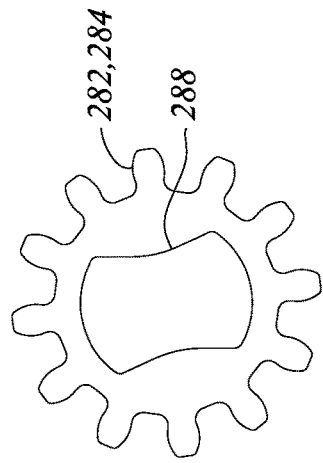

In car 20, as shown, the interior space of frame 130 also has, or is interrupted by, or is divided into a plurality of smaller regions or openings by, intermediate cross-members 140, 142 that link lengthwise running beams 132, 134 to divide the overall frame opening into sub-regions, or sub-portions, identified as openings 144, 146 and 148. Cross-members 140, 142 may be attached to, or may define a part or all of respective lower portions 82 of frames 78, 80. That is, to the extent that portions 82, 84, 86 and 88 of frames 78, 80 are, or include, webs, and are co-planar webs, transverse to the longitudinal centerline of car 20, web portion 82 forms a stem relative to cross-member 140, 142 as may be, which then acts as the flange of the combined assembly. That flange portion defined by cross-member 140, 142 may have the form of an elongate member such as a hollow structural section beam 150. As shown, beam 150 is a closed or hollow structural section or hollow member of triangular cross-section as seen in FIG. 2e. The triangular section includes a base or bottom portion, or plate, or flange 152, and two sloped sides or webs 154, 156 that run upwardly toward each other to meet at a radiused vertex. The bottom portion may be a solid plate extending between the toes of webs 154, 156 or it may be a pair of opposed flanges bent from the toes of each of webs 154, 156, as shown in FIG. 1b. The bottom face of flange 152 co-operates with the flanges of frame 130 and lies in plane $P_{130}$ of engagement interface 135. It may be taken as being part of engagement interface 135 in respect of whichever discharge gate assembly is mounted thereto. The respective laterally outboard ends of beams 150 are chamfered to match the slope of side slope sheets 116, 118. As seen in FIG. 2e, the width of cross-members 140, 142 (i.e., in the x-direction) is much less than their respective lengths (i.e., across the car in the y-direction). That is, the width measured over the combined width of sloped sides 154, 156 is of the order of 8-12 inches, and in the embodiment shown is 10 inches. The vertical rise of cross-member 140, 142 from the lower lip to the central crest is of the order of half that width, roughly 4"-6", and in one embodiment about 5". The length, by contrast is the same, or about the same, as the inside dimension width of frame 130, which may be 50 inches or more, up to the inside width between frame members 132, 134 which may be up to 70 inches in car 20 as illustrated. The width of cross-member 140, 142 is thus small as compared to the length of the opening to which the frame of gate assembly 170 mates, whether between cross-members 140, 142, or between either of them and end frame members 136, 138 of frame 130, as may be. That inlet opening distance in the x-direction corresponds to the length of the inlet opening of gate assembly 170 indicated in FIG. 3g as $L_{190}$. The corresponding inlet opening width in the y-direction is indicated as $L_{192}$. The gate opening length $L_{190}$ may be more than 50 inches, and in some embodiments may be more than 80 inches. For example, it may be more than 8 ft., as in the embodiment shown in which it is 100 inches. That is, the width of the cross-member, $L_{140}$, is less than ¼ of the length of the opening $L_{190}$. That is, the ratio of $L_{140}:L_{190}$ may be in the range of ¼ to 1/10, and in the embodiment shown is about, ⅛. Similarly, the structure is shallow relative to the size of the opening and relative to other structure of the car. For example, the height of cross-members 140, 142 is less than the vertical depth of center sill 36 as measured over top cover plate 158 and bottom flange 160. In the embodiment shown, it is less than ⅔ of that depth and is less than half of the depth of the clearance between bottom flange 160 and TOR. As shown, the crest or uppermost part of cross-member 140, 142 passes clear of, and below, bottom flange 160, and therefore clear of center sill 36. In some embodiments the vertical thickness is less than 1/12 of the length of the opening, $L_{190}$, and may lie in the range of 1/10 to 1/15 of that value. In the embodiment shown it is in the range of 1/12 to 1/20 of $L_{190}$.

Center sill 36 has a top flange or top cover plate 158, a bottom flange or bottom cover plate 160, and a pair of spaced apart first and second side webs 162, which form a hollow rectangular section. Center sill 36 also has a triangular, or slope-sided, cover, or hat, or shroud 164 that encourages lading to flow to either side of center sill 36 on discharge. Center sill 36 runs inside the hopper from end slope sheet to end slope sheet. Center sill 36 also has hangers, or gussets, or gusset plates 166 that depend from bottom cover plate or bottom flange 160, and that are aligned in web continuity with, and in the respective planes of, webs 162. The bottom margins of gusset plates 166 are cut to a V-shape to match the shape of the upward faces of sloped sides 154, 156. Internal V-shaped gussets 168 are located inside beam 150 in planar alignment with gusset plates 166, again providing web continuity. In this way, triangular beams 150 are connected to center sill 36. This is so notwithstanding that the apex of webs 154, 156 of beam 150 may pass (an as illustrated, does pass), below bottom flange 160.

In the example illustrated, the hopper defined by containment shell 38 is effectively a single large hopper, or single containment vessel, or unitary containment vessel, with a single or unitary outlet discharge frame 130, which is also large. That single large containment vessel can be subdivided by transverse partitions. Nonetheless, the structure remains in essence a single or unitary large container. The opening 125 in frame 130 is divided into sub-portions, there being three such sub-portions, or openings 144, 146 and 148, in car 20 as illustrated. In the example, rather than large conventional internal slope sheets that would divide the discharge of internal volume 40 into three distinct hoppers, the function of slope sheets as flow dividers is performed by the sloped upper members or walls or surfaces or sides 154, 156 of beam 150 of cross-members 140, 142. To the extent that these sloped walls can be thought of conceptually as intermediate slope sheets 54, 56, even if small ones, it can be seen that their vertical depth is, e.g., smaller than the depth of center sill 36 (it is approximately ½ of that depth in the embodiment illustrated) as discussed above. These flow dividers are located at a height (at the crest or apex between sides 154, 156) that is lower than the center sill; lower than the coupler centerline; lower than side wall transition 124; and lower than side sills 68, 70. Sloped surfaces or sides 154, 156 are much smaller than conventional slope sheets, and have a much higher ratio of lateral width in the y-direction (i.e., the length of beam 150) to the longitudinal slope length (i.e., the hypotenuse along the angled side in the longitudinal-vertical plane of the x-direction and z-direction axes). For example, in a conventional hopper car the length of the intermediate slope sheet may be greater than the 128" car width. By contrast, in the example, the width of the car is more than 3 times the slope length (i.e., an aspect ratio of 3:1, or, expressed differently, the length to half-width slope aspect ratio of the beam is 3:1 or more). The width of beam 150 (in the x-direction of car 20) is also modest. As seen in FIG. 2e, it is less than the wheel radius of the wheels of truck 24. That distance may be less than 18". The lip width (i.e., in the y-direction) may be of the order of 60"-70", or roughly a 3:1 to 4:1 aspect ratio of width (in the y-direction across the slope) to length (in the x-direction, along the slope). It is less than either the width or the height of center sill 36. In the embodiment shown, the running-direction length is less than 16 inches on the slope. The vertically projected horizontal component is the cosine component of that length. As such, it occupies a small portion of the length (i.e., in the x-direction) of frame 130 (less than $\frac{1}{20}$), and also a small portion of the available height. The bottom surfaces of frame members 132, 134, 136 and 138 are bent outwardly longitudinally or laterally, as may be, to lie in a common horizontal plane. Bottom flange, or flanges 152 is, or are, in the same plane, such that there are four attachment flanges around each of openings 144, 146, 148, that co-operate to define four-sides, co-planar lands to mate as attachment interface members with mating attachment interface members of discharge gate assemblies 170.

There are three discharge gate assemblies 170. Gate assembly 170 is a multi-aperture, or multi-opening gate assembly, as described below. One gate assembly 170 is mounted to each of the four-sided engagement interfaces defined by frame 130 and cross-members 140, 142, as may be, identified as discharge interface mounting lands 172, 174, 176 of discharge section 110 described above and shown in FIG. 1b. Although the mating interface could be of any geometry, provided that the upper face, or upwardly engaging members of assemblies 170 are configured to mate with discharge section 110, e.g., with the negative image of the fittings of discharge section 110, it is not necessary for discharge section 110 and gate assembly 170 to mate in a horizontal plane. It may, nonetheless facilitate both manufacture and assembly for the receiving flanges that co-operate to form the rectangular frame of discharge section 110 to be co-planar and therefore to define planar land 135; and that the corresponding flanges of gate assembly 170 should also be co-planar and co-operate to form a rectangular frame that defines a mating planar land or engagement interface of gate assembly 170, as in the embodiment shown. Since gate assemblies 170 are the same, only one such assembly will be described. Gate assemblies 170 are sliding gate assemblies, as opposed to hinged gate assemblies. In this description, gate assembly 170 may be referred to generally as a shutter gate, or as a set of shutters or louvers. Depending on the hopper car, there could be one, two, three or more gate assemblies 170. Gate assembly 170 can be thought of as having a stationary assembly, or frame, 180 that is rigidly mountable to, and therefore stationary relative to, car body 22 at whichever of lands 172, 174, 176; a stationary aperture plate, or gate pan, or stator assembly 182 rigidly mounted to frame 180; a moving assembly, movable member, shutter assembly or shutter 184 movable relative to stator assembly 182; and a drive, or drive assembly, or transmission 186, mounted to frame 180 and operable to move the shutter relative to frame 180. Frame 180 includes first and second, or left and right hand, side frames 188, 190, and first and second, or head and tail, end frames 192, 194.

Each frame has an infeed, or opening, 178, as which lading enters the gate assembly 170. Infeed opening 178 has the size or area bounded by the length-wise and cross-wise members of frame 180. There are also intermediate dividers or cross-members 196, 198, 200 and 202.

Side frames 188, 190 have a web 204 that extends downwardly and a top flange 206 bent outwardly horizontally to form the side frame into an angle. Flange 206 has mounting holes for threaded fasteners, by which to attach gate assembly 170 to the corresponding land of frame 130 of car body 22. Web 204 has a set of fastening holes or fittings to which stator assembly 182 is attached. The head frame end of each of side frames 188, 190 is deeper, i.e., web 204 extends further downwardly, to provide suitable depth for receiving drive shaft member 210 of transmission 186. Each side frame 188, 190 has an angled chamfer or lead-in 208 between horizontal flange 206 and vertical web 204. It may also have a skirt or shroud 212 set at a downwardly, inwardly convergent angle along its lowermost margin. Shroud 212 may have a downwardly extending seal, or brush 230, as described below.

Each of cross-members 196, 198, 200, 202 has its ends cut to conform to the shape of side frames 188, 190 and to shrouds 212. Each has a hat 214 having first and second sloped sides 216, 218 that merge at a rounded apex 220. Each side frame 188, 190 has a downwardly depending margin or skirt or cuff, or leg 222, 224. Apex 220 meets side frames 188, 190 at a height just at, or slightly shy of, the transition bend from chamfer 208 to web 204. A bottom closure plate, or flange 226 is mounted between the toes of legs 222, 224 such that a generally triangular closed section is formed, i.e., such that cross-members 196, etc., form closed-section beams. Seal housing strips 228 are mounted to the outside of legs 222, 224 and brushes or seals 230 are installed in strips 228. Seals 230 extend downwardly proud of legs 222, 224 and, in use, are engaged in a friction relationship with sliding shutter 184. When assembled, frame assembly 180 in the embodiment illustrated has five outlet openings or apertures 232, 234, 236, 238 and 240. Discharge gate assembly 170 may have as few as two shutter apertures, and as many as suitable. There may be three to six such apertures. The apertures are narrow slots. That is to say, the width of the aperture in the cross-wise direction (i.e., y-direction) of the frame is much larger than the travel length spacing in the opening direction (i.e., x-direction) of the aperture. This ratio may be in the range of 5:1 to 12:1, and is about 8:1, as shown.

Head frame 192 and tail frame 194 each have a horizontal flange 242 at the top; a vertical leg 244 extending downwardly; a sloped or chamfered lead-in portion 243 between flange 242 and leg 244; and a seal housing strip 228 and seal 230. The ends of head frame 192 and tail frame 194 are cut to fit between and to mate with the contours of side frames 188, 190 and skirts or shrouds 212.

Stator assembly 182 provides support for moving shutter 184. Stator assembly 182 may have the appearance of a grille with alternating solid slats, or planks, or panels 233, 235, 237, 239 and a closing margin 241; and apertures or openings 232, 234, 236, 238, 240, that match (and are given the same annotation as) the apertures or openings of assembly 170 more generally. That is, the openings defined between the head frame 192 and tail frame 194 and the various cross-members 196, 198, 200, 202 in frame assembly 180, and the solid panels and apertures or openings in stator assembly 182 are stationary. When movable member, or moving assembly, 184 is not present, it can be seen that the openings in frame 180 and the openings in stator assembly 182 align, and co-operate to form the passageways through assembly 170 that are indicated as apertures 232, 234, 236, 238 and 240. In terms of flow, the cross-wise extending members of frame assembly 180 are upstream; stator assembly 182 is downstream; and movable member 184 defines a weir, or weirs, that move slidably in the slot created between, and bounded by, the upstream and downstream assemblies. Stator assembly has a main sheet 250 that has downwardly bent side margins or flanges, or legs 246, 248. These margins have apertures formed in them for fastening hardware such that legs 246, 248 may be mated with the downwardly extending legs of side frames 188, 190. The various apertures are punched or cut in main sheet 250. On the underside of main sheet 250 are stems, or webs, or ribs 252 that run parallel to the long edges of the various apertures, offset sideways away from the edge. Ribs 252 and main sheet 250 form T-sections along the edges of the various apertures, and provide a stiff supporting edge for the corresponding panels or slats of sliding movable shutter 184. Rib 252 at the end nearest to head frame 192 has notches 254, 256 that provide a space, an allowance, rabbet, clearance opening, passageway, or accommodation for rack member 260 of drive transmission 186. Apertures 232, etc., are less wide than the main body of sheet 250 between flanges 246, 248, such that a continuous horizontal strip 262, 264 remains on each side of sheet 250. Strips 262 and 264 co-operate with flanges 246, 248 to form an angled reinforcement along the edge of the plate. Expressed differently, stringers 278 run longitudinally from the leading rib 252 nearest head frame 192 to the most distant rib nearest tail frame 194. The uppermost edges or surfaces of stringers 278 provide intermediate sliding surfaces upon which the various louver or shutter panels ride when sliding open and closed. In effect, in the embodiment illustrated, each stringer 278 can be thought of as an angle iron in which the vertical web is the flange defined by leg 246 or 248, and the horizontal flange is defined by portion or strip 262, 264 remaining between apertures 234, 236, 238, and 240 and legs 246, 248 respectively. On assembly, apertures 272 are the same width as, or marginally wider than, apertures 232, 234, 236, 238 and 240, as may discourage accumulation on sheet 250.

Shutter 184 is formed of a flat sheet or flat plate 270. It has four apertures 272 punched or cut therein. Apertures 272 have a width $W_{272}$ that is not as wide as plate 270, but leaves side strips 266, 268, that correspond to, and may be the same width as, strips 262, 264 of sheet 250, and to the location and width concealed by shroud 212. Apertures 272 also have a length $L_{272}$ in the direction of sliding motion. Length $L_{272}$ is shorter than the dimension $L_{226}$ of plate 226 and the dimension $L_{233}$ of stator assembly 182 in the direction of travel, such that, when gate assembly 170 is closed, all of the openings in the shutter plate 270 are concealed so that lading does not flow. Plate 270 also has louvers or slats or shutters, or blanks, such as moving, or movable, panels 274. In the example shown, there are five such panels or louvers or slats or shutters 274 corresponding to the number of stationary apertures frame assembly 180 and in stator 182. Louvers or shutters 274 accordingly have a length in the direction of travel, $L_{274}$ that is greater than the length in the direction of travel, $L_{232}$, of corresponding apertures 232, etc., such that when gate assembly 170 is closed, lading does not flow. The edges of shutters 274, when closed, overlap, and are supported by the corresponding aperture margins of stator assembly 182. When the various shutter panels are moved, in sliding translation in the opening direction, toward the open position, they progressively expose the apertures in the gate, thus permitting the egress of lading under the influence of gravity. By contrast, when they are driven in sliding translation toward the closed position they occlude the apertures, advancing until the opening is fully eclipsed, i.e., closed. The forward edge of apertures 272 may be a straight edge. Alternatively, as shown, it may be arcuate according to the curved edge 276 shown. The trailing edge of plate 270 may also have curved edge 276. The thickness of plate 270 corresponds to, and fits in sliding relationship in, the vertical clearance space between shroud 212 and plate 270. When shutter 184 (being, collectively, all of shutters 274), moves from closing apertures 232, etc., to opening them, the center of the arc of curved edge 276 will clear the corresponding edge of the stationary cross-members, allowing lading to flow first at the center, and then wider along the arc as the gate opens further. Similarly, when the gate is closing, it will start to close at the outer corners first, and at the center last. This could also be achieved by having a straight edge on the moving plate, and a curved edge on the stationary elements. It is convenient that the non-straight profile be on the moving element.

The transmission or drive 186 includes input drive shaft 210, which has an input interface, or input interface member, or simply a rotational motion input, such as may be in the nature of a male or female engagement fitting 280 formed to receive torque from an external source, such as a pneumatic or electric drill operated by personnel at trackside. To that end, fitting 280 extends laterally proud of side frames 188, 190 on either side of car 20. In the illustration, fitting 280 is a female socket. Shaft 210 has first and second drive output interfaces, or outputs, in the nature of gears or pinions, 282, 284. Racks 260 are mounted on the underside of the leading slat 274 in line with strips 266, 268. In operation, as the teeth of drive pinions 282, 284 turn, they engage the mating teeth of respective first and second racks 260 adjacent the left and right hand side frames 188, 190, driving strips 266, 268 forward and backward between the open and closed positions of the sliding gate. Strips 266, 268 thus function as parts of the drive transmission, being drag links in the opening condition, and push rods in the closing condition. They slide in the passageways, or guideways, or slots, or tracks, define between shrouds 212 and strips 262, 264. Strips 266, 268 also function as reference datum members that establish and maintain the spacing between the movable shutter panels and the respective openings with which they engage or inter-act.

It would be possible to make moving assembly 184 as an assembly—with separate push rods to which shutter plates are attached, e.g., with fasteners such as rivets or bolts. However, as in the example, a simpler structure arises by making them from a single sheet of stamped or punched or cut metal.

In summary, each gate assembly 170 is a sliding gate assembly. It has a stationary structure and a moving structure. The stationary structure includes at least two openings. The moving structure includes at least two shutter members that correspond to the two openings. The shutter members are mechanically joined or linked such that they are yoked or slaved together, and therefore travel through the same motion. The shutter members are movable between a first position and a second position. In the second position the openings are less obstructed by the shutter members than in the first position.

In that assembly, the first and second positions are closed and open positions. In the first position the openings are closed to prevent the egress of lading from the hopper. In the second position the openings are open to permit egress of lading. The shutters may open progressively. The shutter members may have a non-linear leading edge. That leading edge may be arcuate. Alternatively, the stationary member may have an arcuate trailing edge that is progressively exposed as the respective shutter opens. There is a path-length distance of travel of the shutters, or each of them, between the closed position and the open position. The openings have a width across the gate, and a length in the direction of shutter movement. The width is greater than the length. There is a ratio of aperture width to aperture length. That ratio is in the range of 5:1 to 12:1. In one embodiment it is about 8:1. The gate has a frame. The frame extends peripherally. The frame has two long cross-wise running sides and two length-wise running sides. The sides co-operate to form a rectangle. There is at least a first cross-member that divides the inside of the rectangle into at least the two openings. That is, there is a divider between the first and second openings. In the open position, one of the shutter members is at least partially concealed under the divider. In general, where the number of openings is n, there are n−1 dividers.

In the embodiment shown, in the open position the shutter plates are sheltered by the triangular cross-section cross-members 196, 198, 200, 202. The triangular cross-members 196, 198, 200, 202 have a width $L_{226}$ over legs 222, 224 that is greater than the length $L_{272}$ of the slot in the opening and closing direction. The sliding gate has a through thickness height. The sliding gate has an overall width and an overall length. The through thickness height is less than ⅓ of the cross-wise width measured over the vertical walls of the side fames, in some embodiments is less than ¼ of the width, and in the embodiment illustrated is about ⅕ of the width. The through thickness is less than ⅓ of the length measure over the flanges, in some embodiments is less than ⅕ of the length, and in the embodiment shown is about ⅛ of the length of the frame. In operation, the displacement of the shutters in the direction of travel is less than ⅓ of the overall gate length. That is, the sliding gate valve, including its triangular members and side frames, is shallow in vertical dimension as compared to either its length or its width. The foregoing relative dimensions and ratios relate to the overall gate structure being relatively flat, and substantially planar.

In other embodiments, with suitable adjustments of length and width, discharge gate assembly 170 could be mounted with the direction of motion across railroad car 20, rather than lengthwise. This would place both ends of torque input shaft 210 on one side of car 20. It is convenient for the direction of opening to be parallel to the centerline of car 20.

In the embodiment of discharge gate assembly 170, pinions 282, 284 and rack members 260 are used to convert rotational motion into linear translation or the movable shutter members in the x-direction. In this example, pinions 282, 284 have a lobate bore 288 that receives the generally rectangular torque shaft section 290. The lobate bore is larger than the torque shaft to leave an angular tolerance, or lost motion, between the angle at which the driving shaft stops driving the pinion counter-clockwise, and when, as driven in the opposite direction, it begins to drive the pinion clockwise. Assembly 170 also includes a lock 292, which may have a pawl that engages a toothed wheel. The pawl is lifted to disengage from the toothed wheel when gate assembly 170 is to be opened or closed. The pawl and wheel arrangement is found on both sides of gate assembly 170, with the pawls being connected by a transverse shaft or rod 294, such that release and engagement can be set by personnel at trackside on either side of car 20. Corresponding pawls or fingers 296 mounted along rod 294 fall into place to engage the leading edge of the movable louver or shutter plate when it is closed. To that end, pawls or fingers 296 may have a notched finger-tip, or catch, or dog, that engages the leading edge.

Figure 7A:
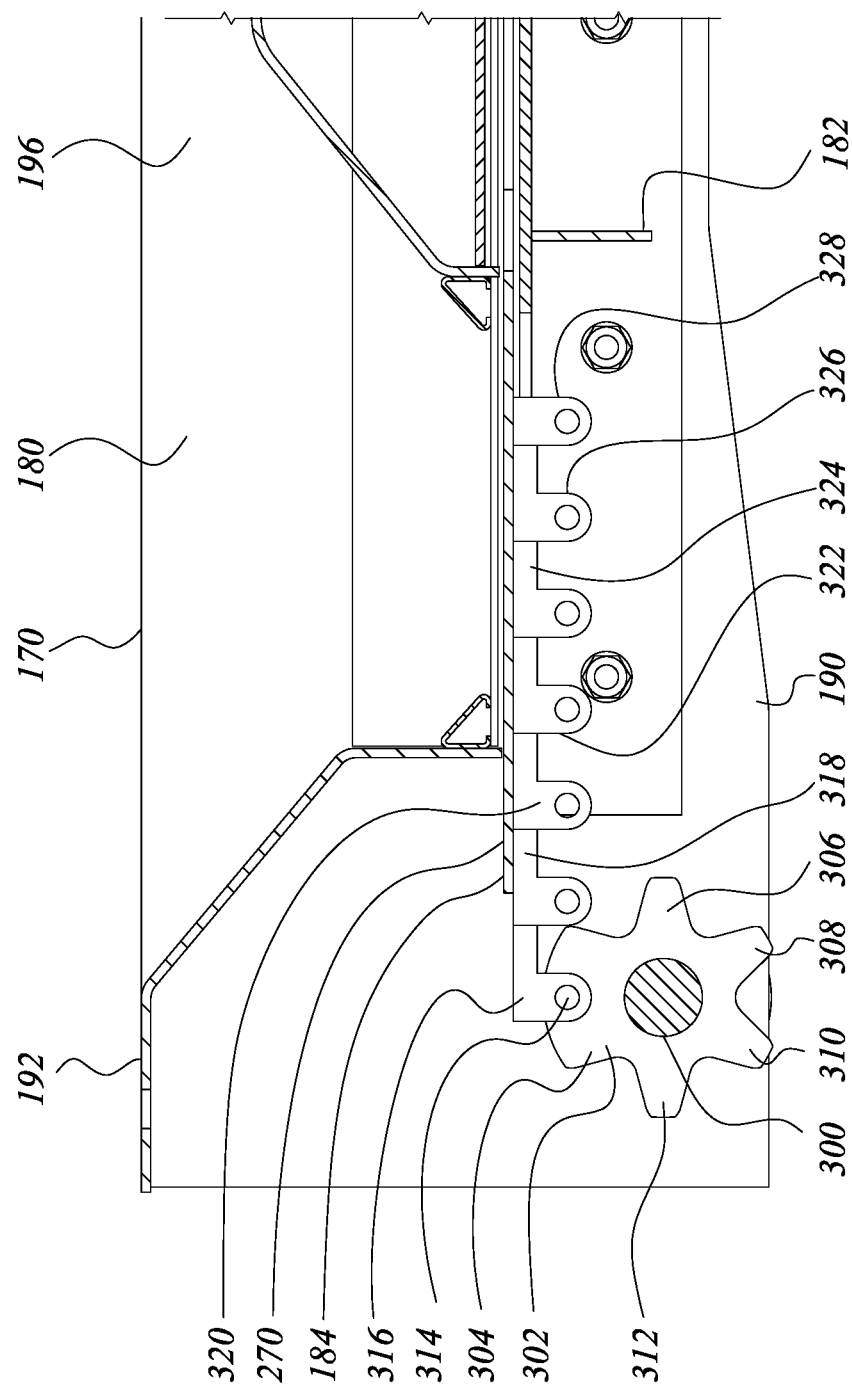
Figure 7B:
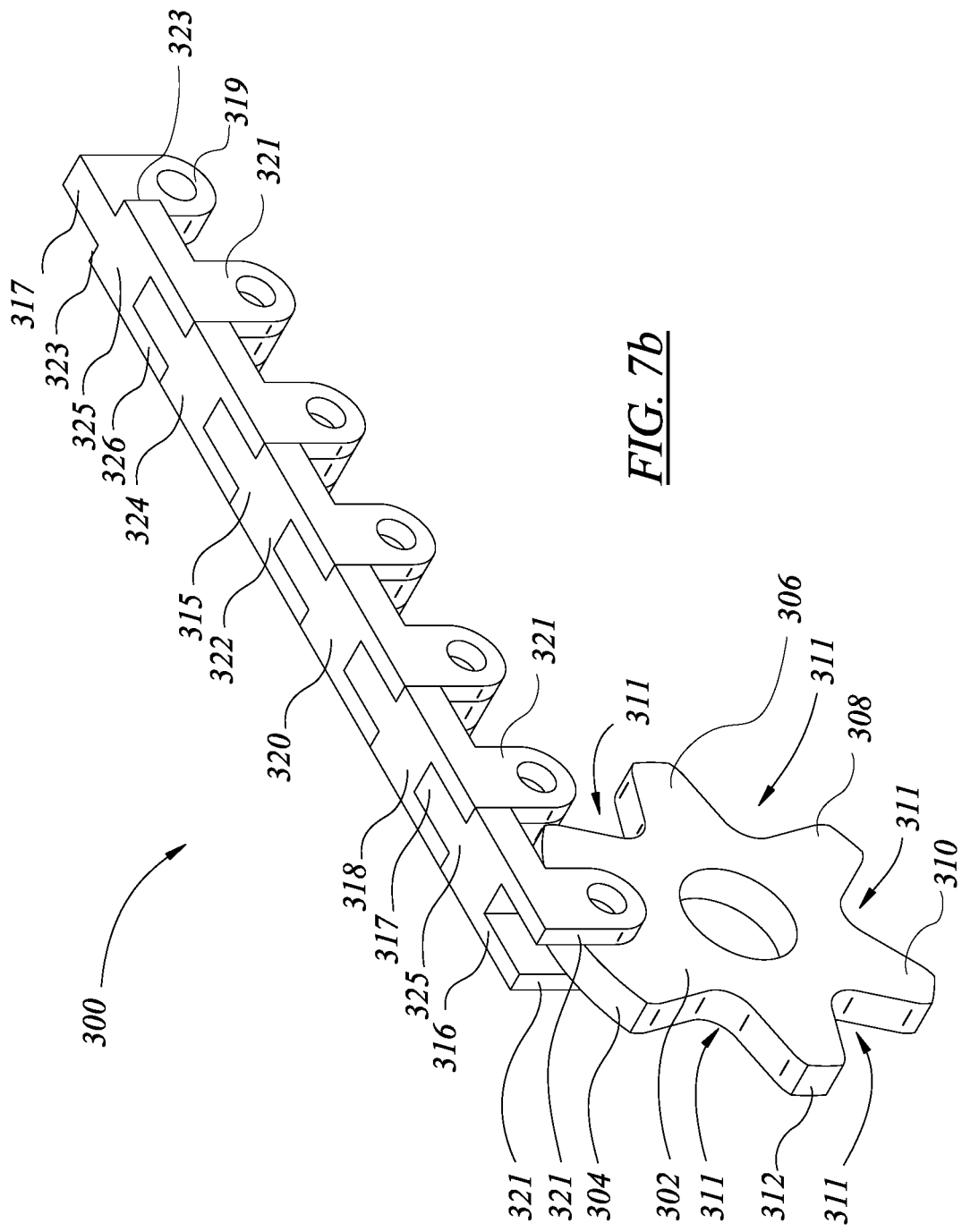
Figures 7C, 7D:
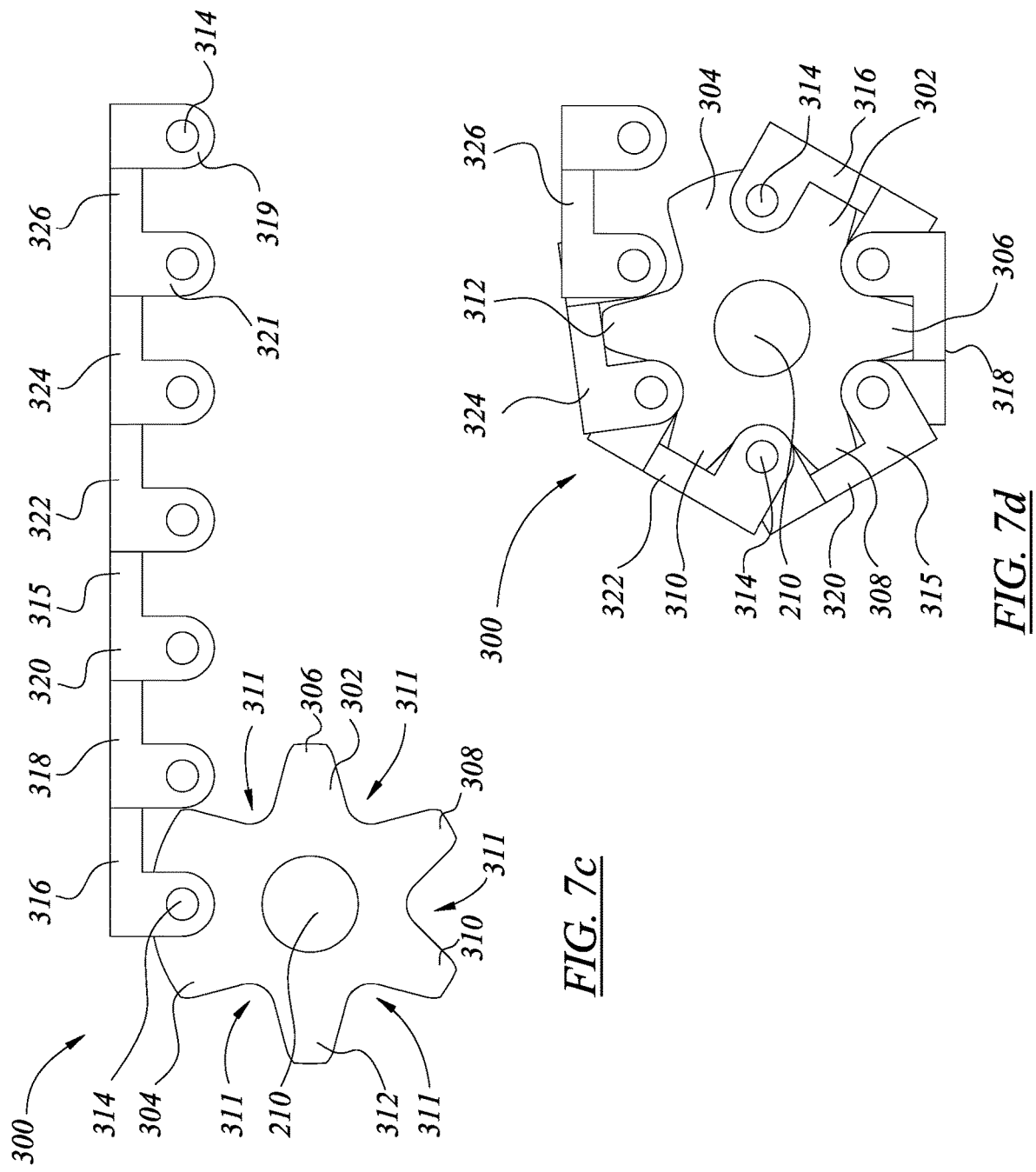
FIG. 7c is a side view of the mechanism of FIG. 7b as extended.
FIG. 7d is a side view of the mechanism of FIG. 6b as retracted.

An alternate embodiment of motion transmission apparatus or assembly or linkage is shown in FIGS. 7a to 7c. In this embodiment, drive or transmission 300 includes shaft 210 as before, but rather than having the squared or rectangular torque transmission sections described above, it carries a wheel or toothed wheel or gear identified as fixed pinion 302. Fixed pinion 302 has a series of lobes 304, 306, 308, 310, 312. Lobe 304 is pierced and the pin 314 of a first link 316 of a set of linkages 315 is mounted through lobe 304. That is, a pivot pin or hinge connection is made such that link 316 cannot separate from lobe 304. The pin connection to lobe 304 then makes lobe 304 function as an arm or crank drive by shaft 210. As shaft 210 turns to open the gate, the pins of the successive articulations between the following links 318, 320, 322, 324 and 326 locate in the tooth gaps between the corresponding successive lobes. The last link, 328, is fixedly attached to main sheet, or plate, 270. In this embodiment, the pairs of articulated linkages in set 315 are joined to their respective neighbours, or neighbour, at articulation pins 314. Notably, the leading part or leg 319 of the nose or leading portion 317 of each link lies on the centerline of the lobed wheel or gear of pinion 302, and pivots in space 311 between the respective corresponding pair of adjacent lobes. The rearward portion of each linkage is bifurcated, or channel-shaped, such that its arms, or legs 321, embrace the following lobe of the lobed wheel, i.e., pinion 302, and provide a clevis into which the leading portion 317 of the following linkage is received in its double-shear, pin-jointed connection. In effect, the linkages are joined together in the repeated male-female relationship of tank tracks. When the set of linkages 315 is unwound to lie against the face of the sliding plate, as in the orientation of FIG. 7c, the various linkages are laid down against the plate in series (i.e., sequentially or progressively) to lie against the sliding gate and form a continuous track that is straight and flat. As seen in FIG. 7b, the nose of the leading central part of each linkage lies between the legs of the clevis. The shoulders 323 of the shank of the linkage bottom against the trailing end of the shank of the leading linkage to which it is mounted. The shank has a channel cross-section. The back of the channel 325 lies against the sliding gate, and the leading face of back 325 abuts the rearward face of back 325 of the preceding section. Legs 319 and 321 of each segment extend comparatively radially inwardly relative to the centerline of shaft 210, even when they lie on a secant against the sliding gate. When backs 325 line up, they transmit force in compression between their respective backs along a line of action parallel to the sliding gate, to urge the sliding gate to move. In the example, that motion in compression is in a direction to close the gate. In this example, the various linkages 316 to 326 can be considered conceptually as the vertebrae of a spine. Since the back is radially outward, the compressive force is applied eccentrically relative to pins 314, in a manner tending to force the back more tightly into the orientation of FIG. 7c. That is, the application of compressive force is essentially an over-center force tending to close the linkages together, i.e., forcing the vertebrae of the spine to align in a straight line in compression. The eccentricity of backs 325 relative to pins 314 keeps the chain from flexing or buckling away from the sliding gate, and the sliding gate prevents the chain, or track, from flexing in the opposite direction in bucking. The fixed mounting to lobe 304 means that the range of motion of the transmission is limited to less than one full revolution of shaft 210. That is, once the segments of the set of linkages 315 fills the spaces between all the lobes, the assembly cannot turn further.

Figure 8A:
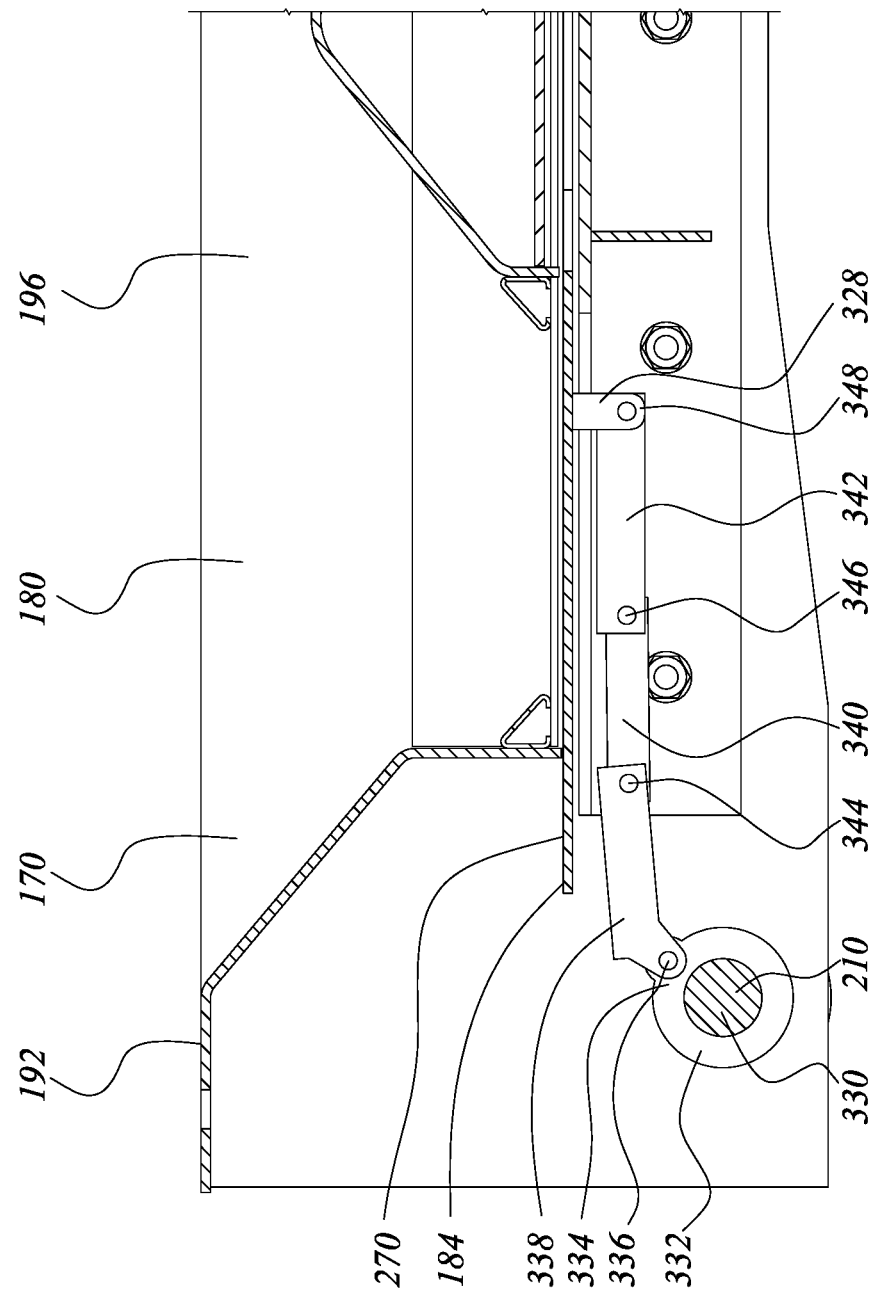
Figure 8B:
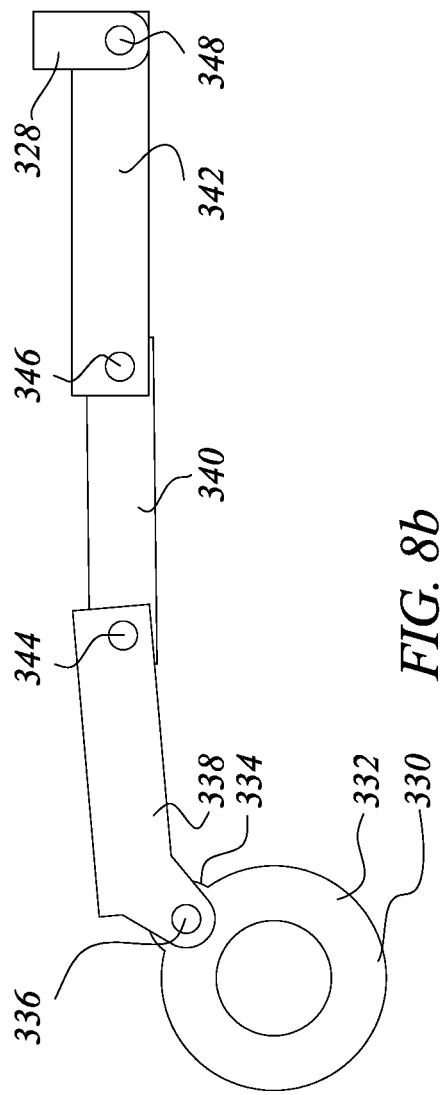
FIG. 8b is a side view of a door operating mechanism of the enlarged detail of FIG. 8a as extended.
Figure 8C:
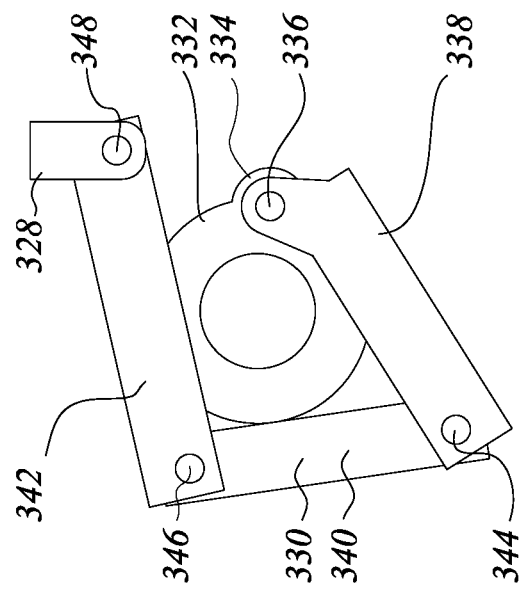
FIG. 8c is a side view of the mechanism of FIG. 8a as retracted.
Figure 9A:
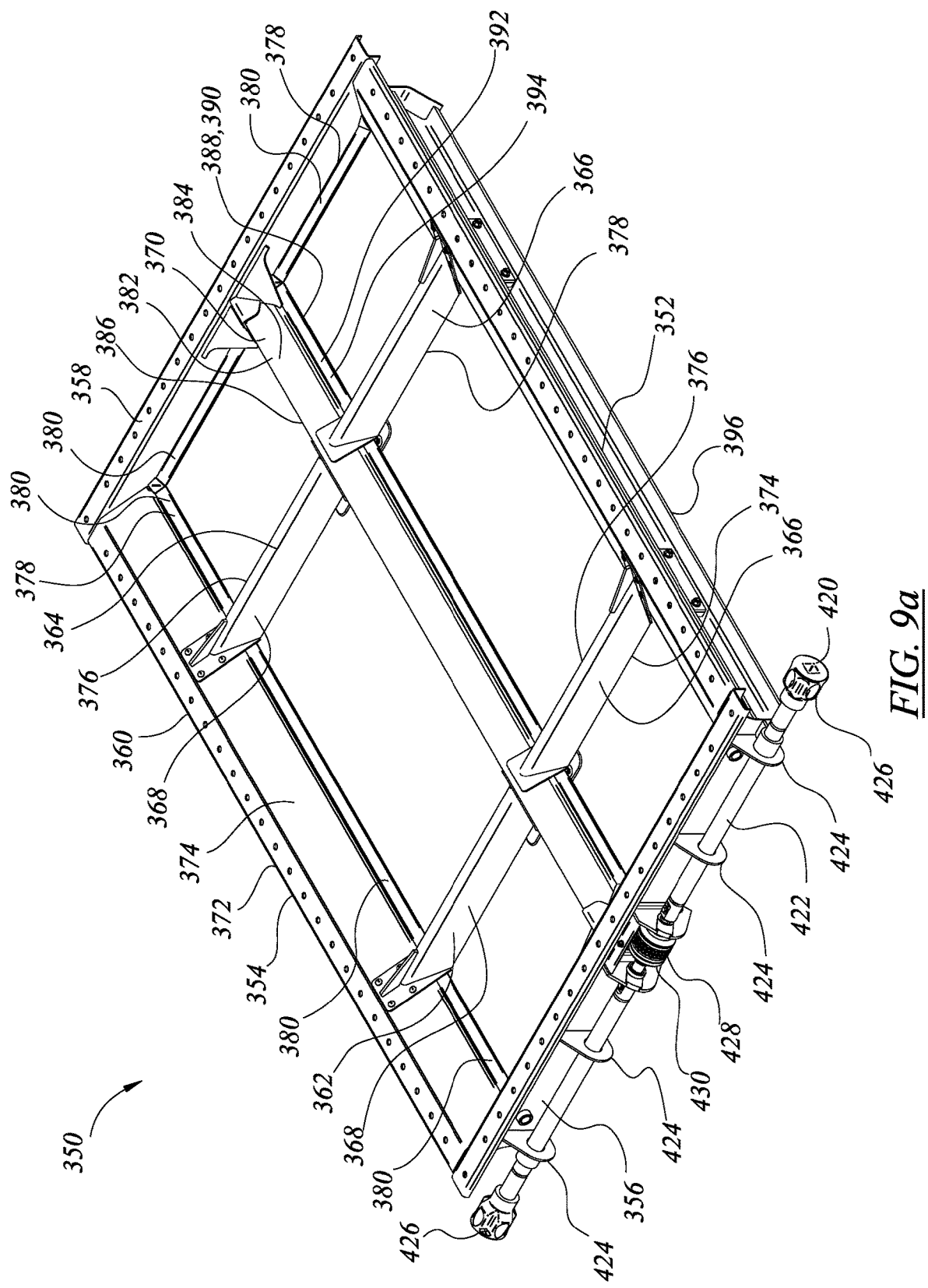
FIG. 9a is a perspective view of an alternate gate assembly to the gate assembly of FIG. 3a, taken from above.
Figure 9B:
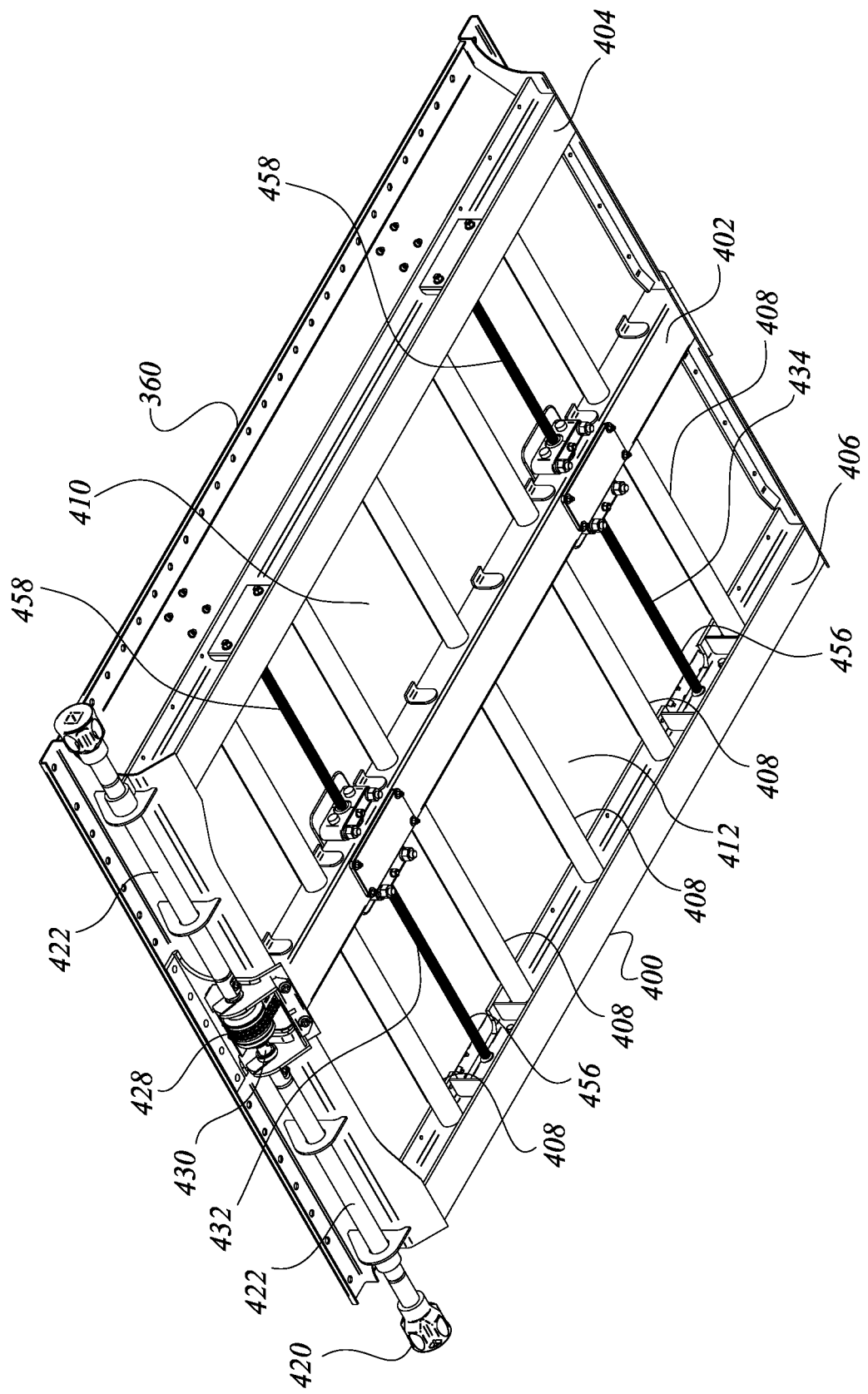
FIG. 9b is a perspective view of the gate assembly of FIG. 9a seen from below.
Figure 9C:
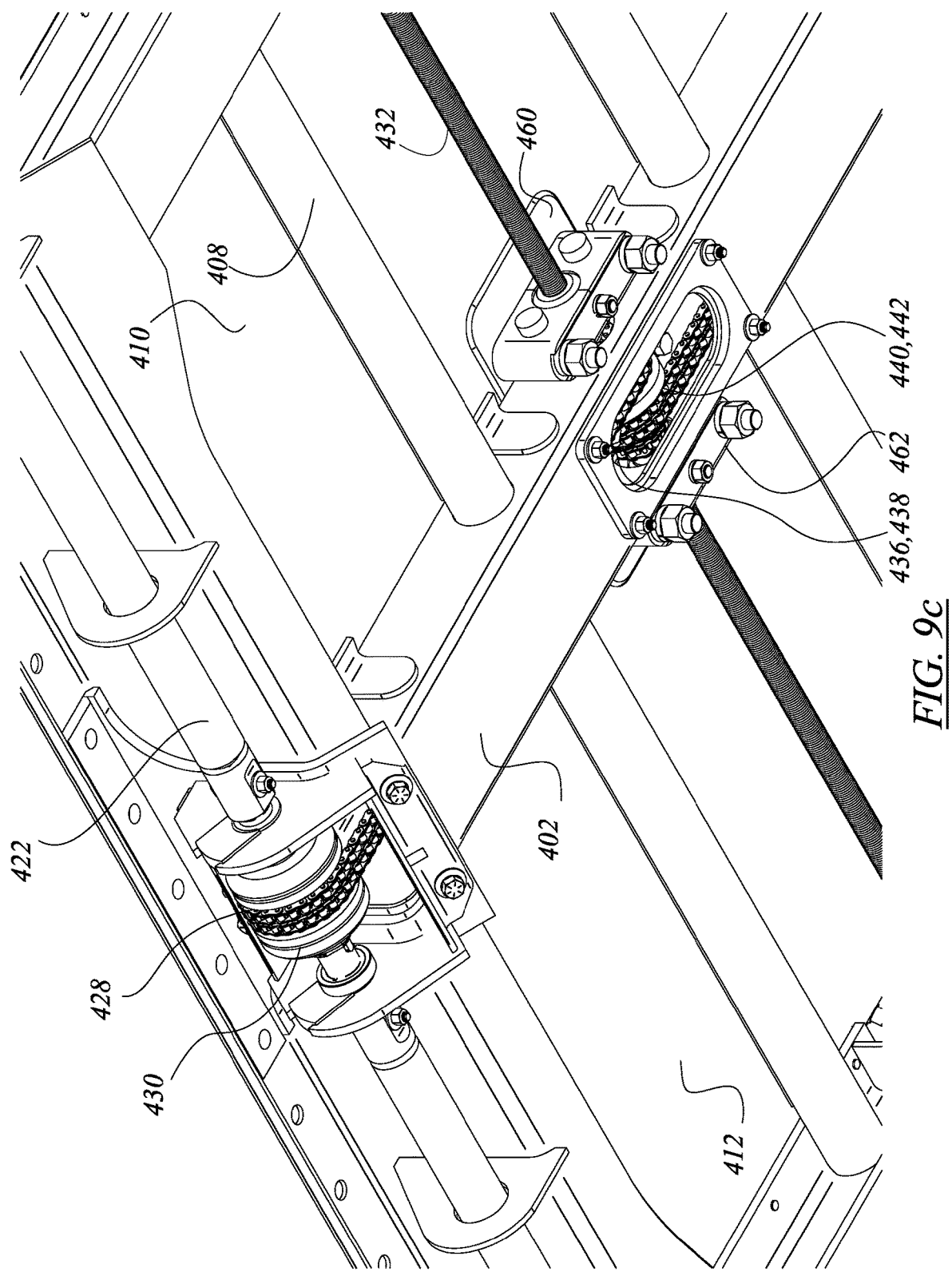
Figure 9D:
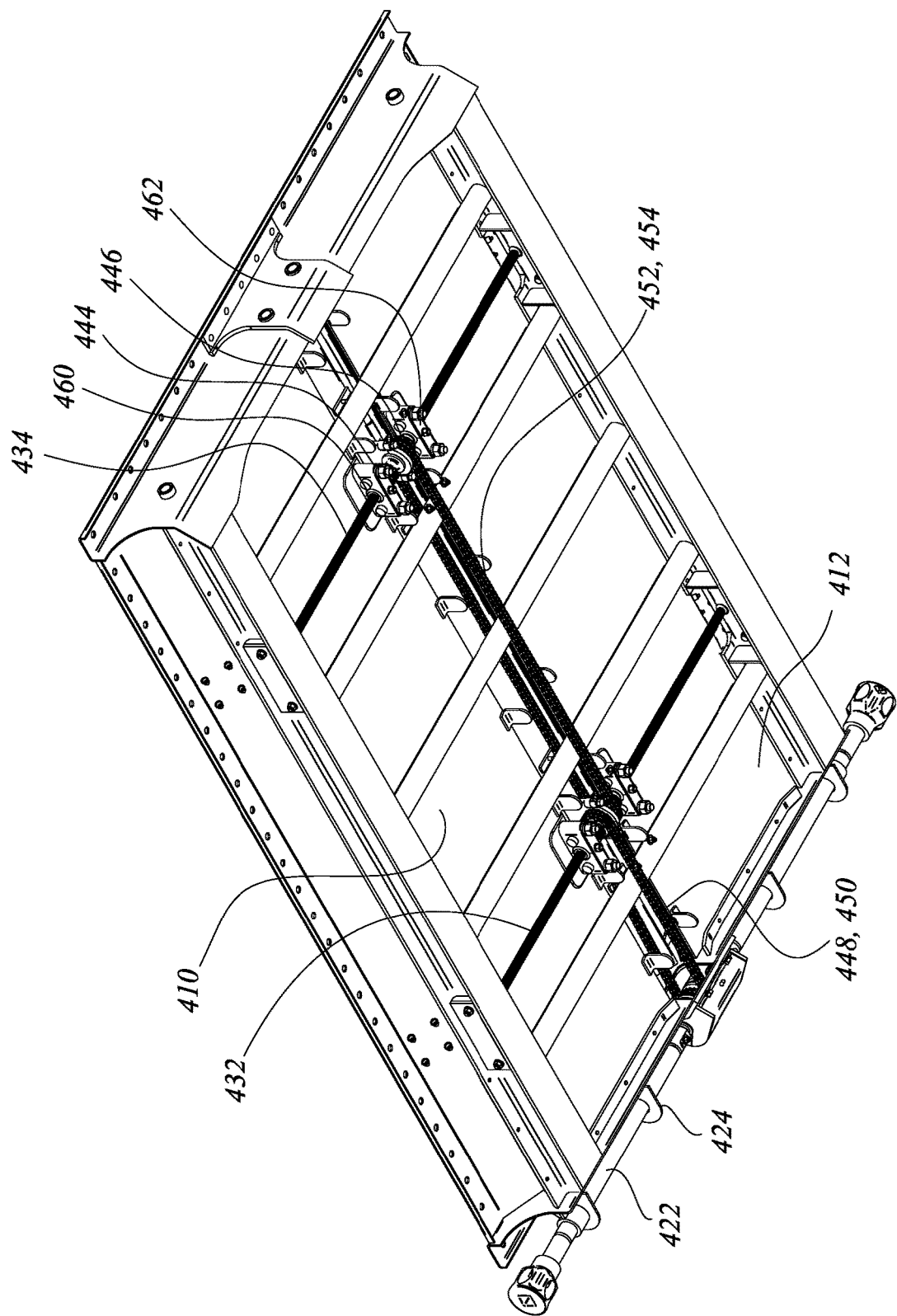
FIG. 9d shows the drive mechanism of FIG. 9c with shroud removed.
Figure 9E:
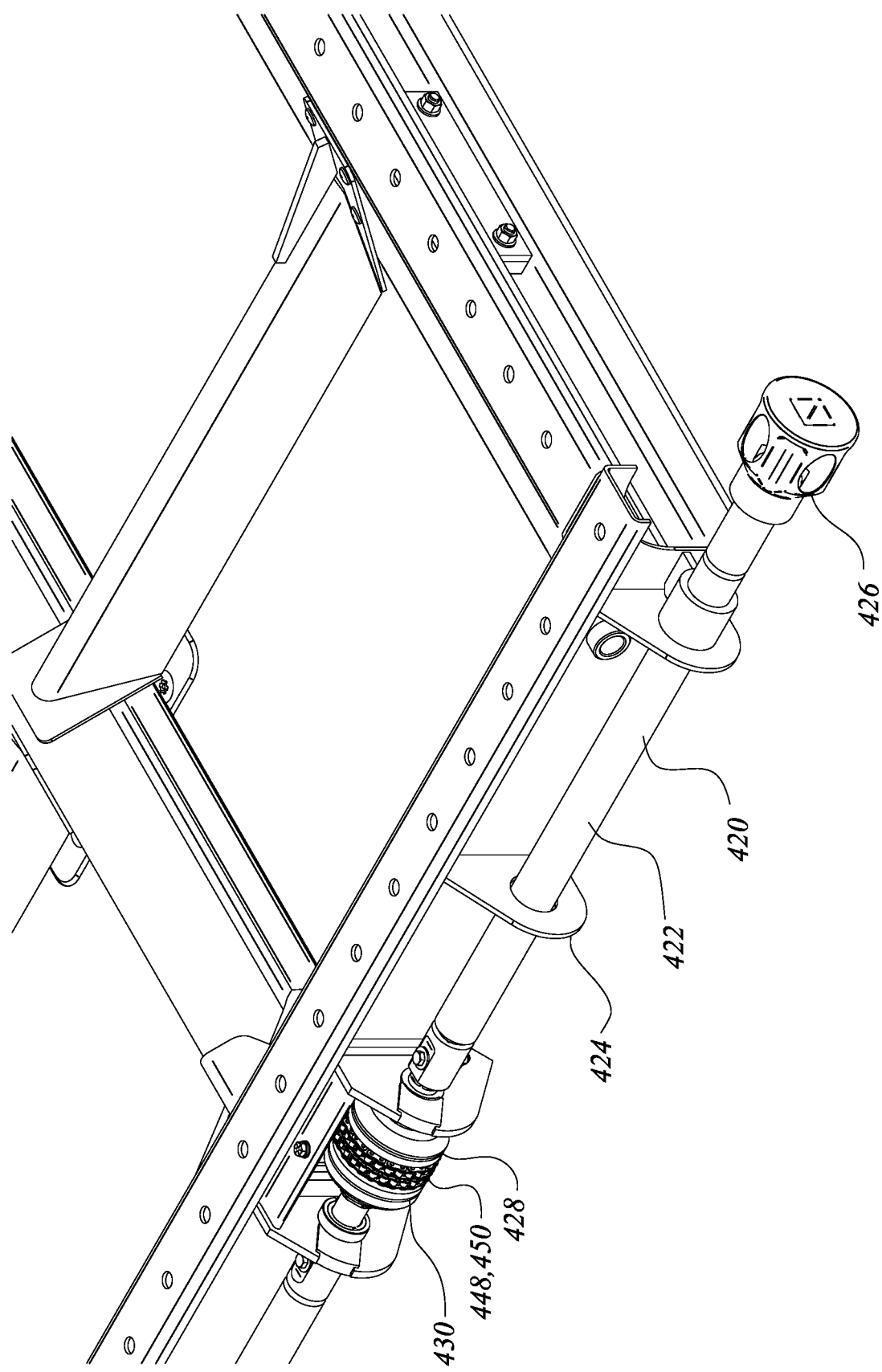
Figure 10A:
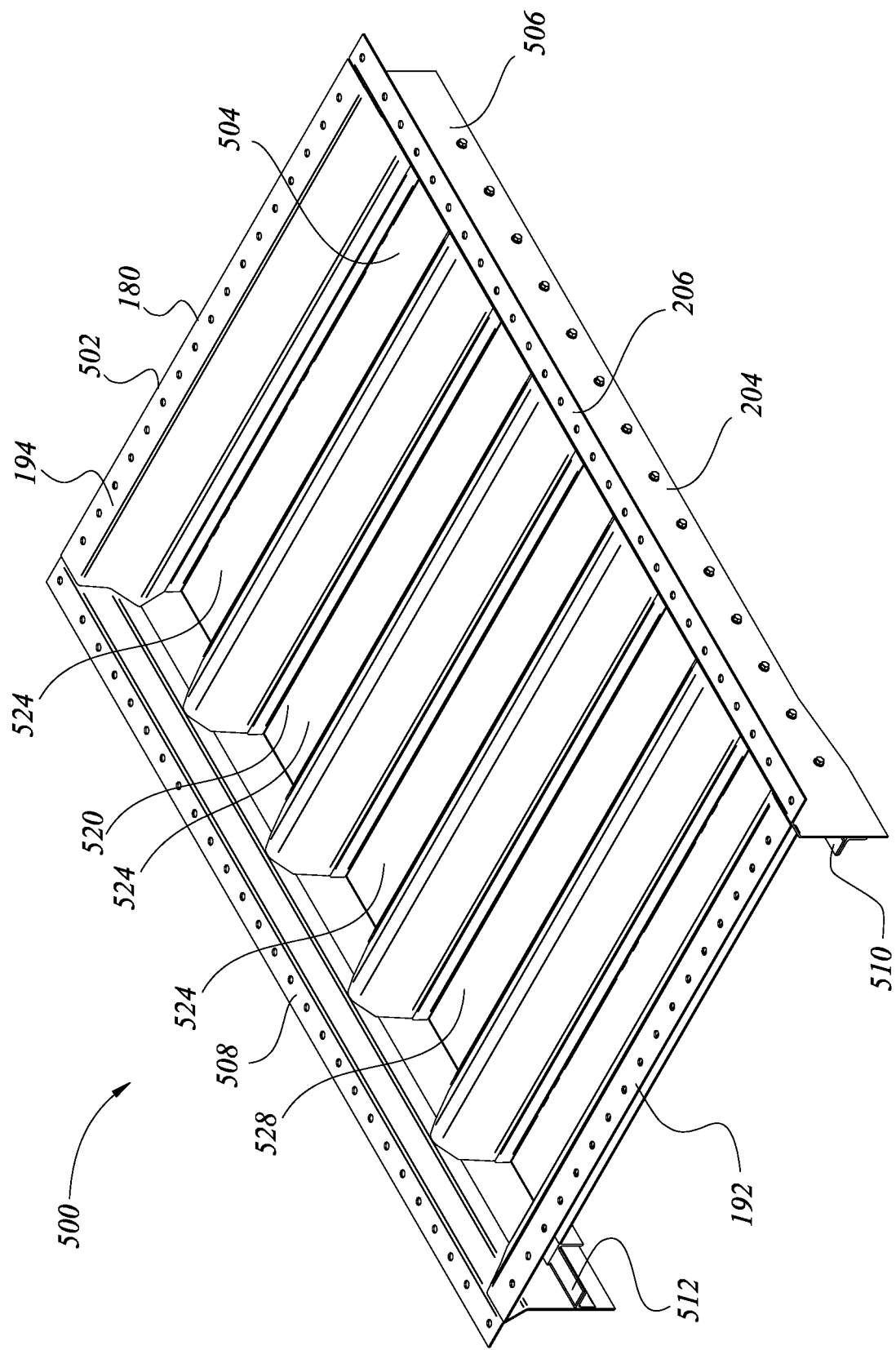
Figure 10B:
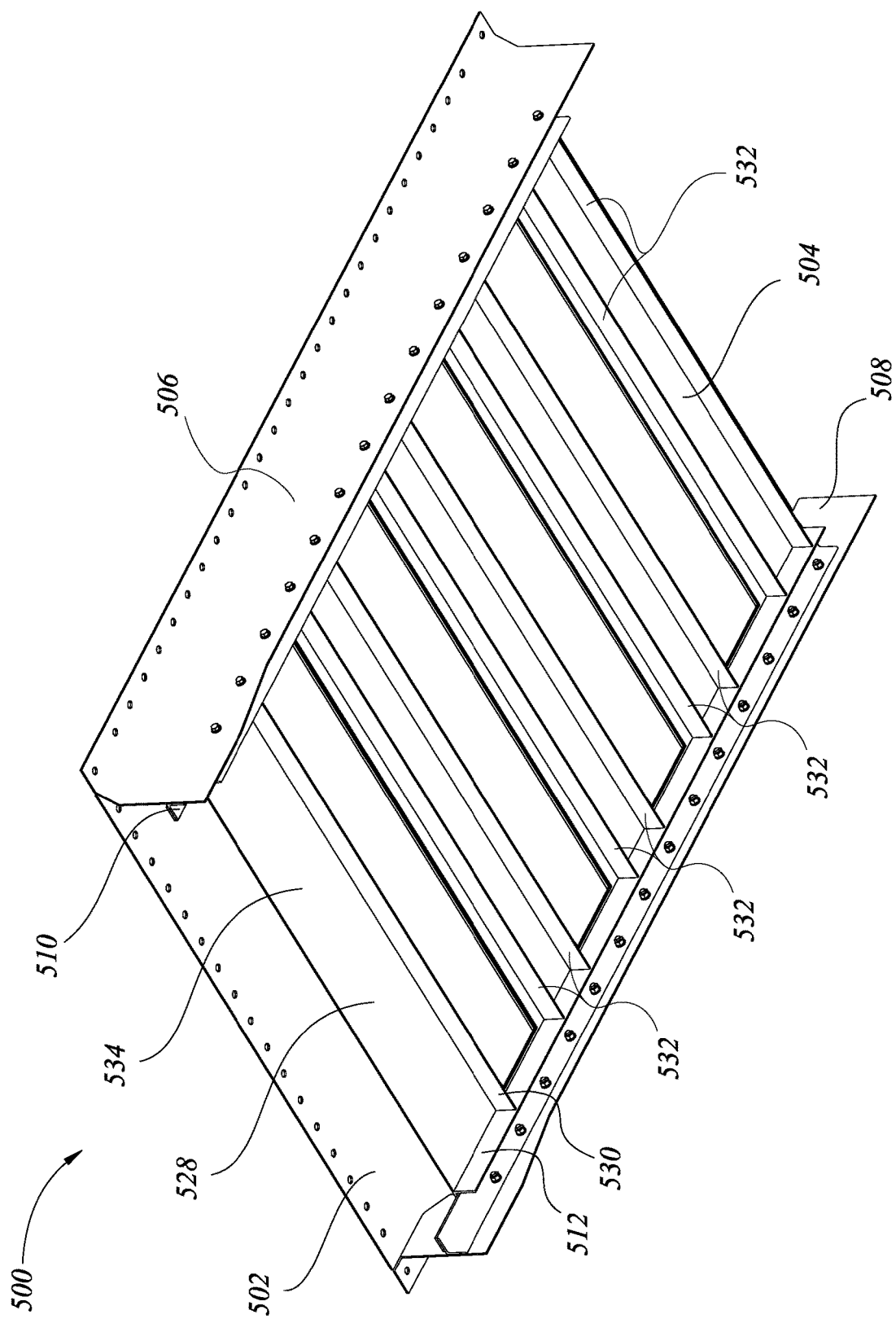
FIG. 10b shows a perspective view of the gate assembly of FIG. 10a from below.
Figure 10C:
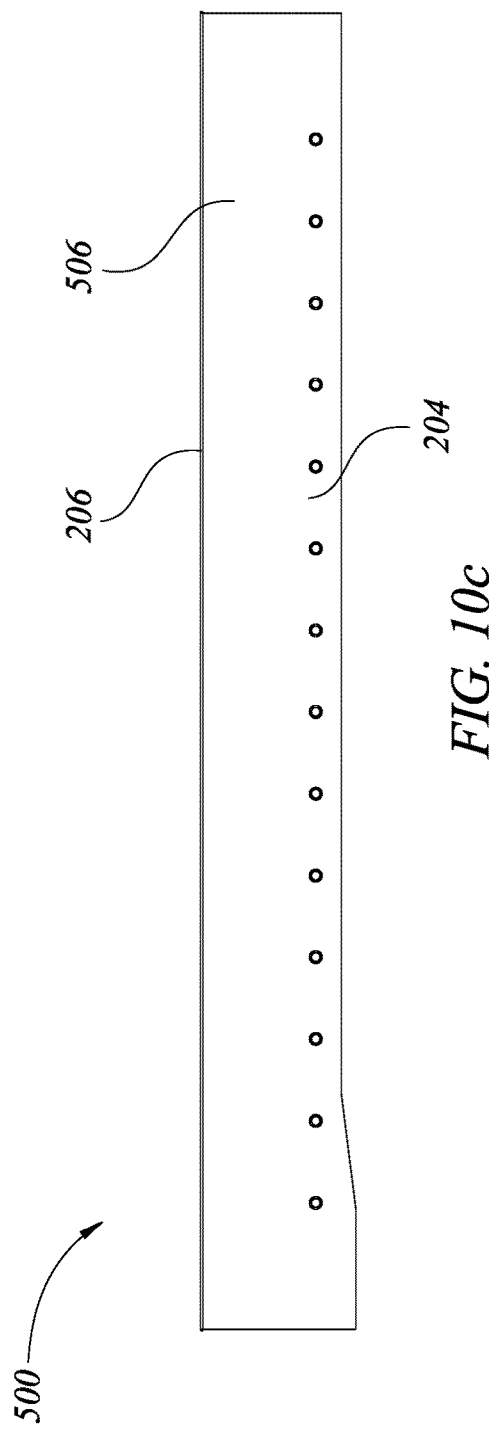
Figure 10D:
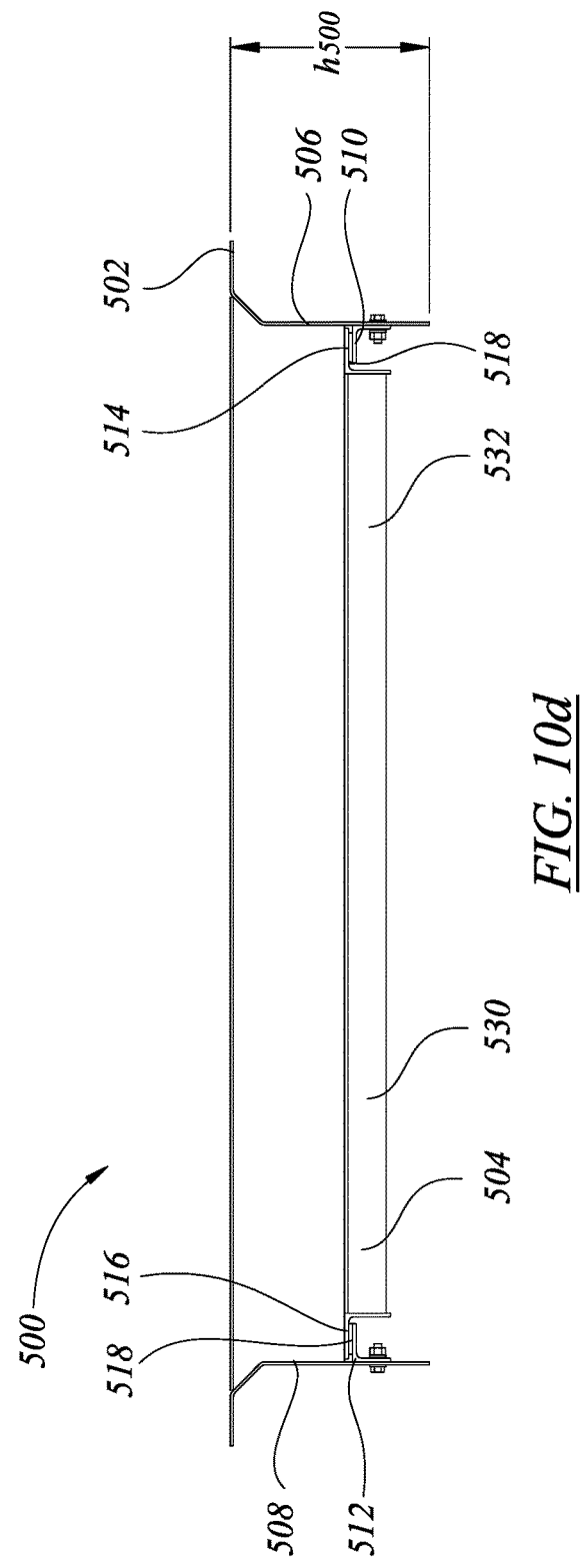
Figure 10E:
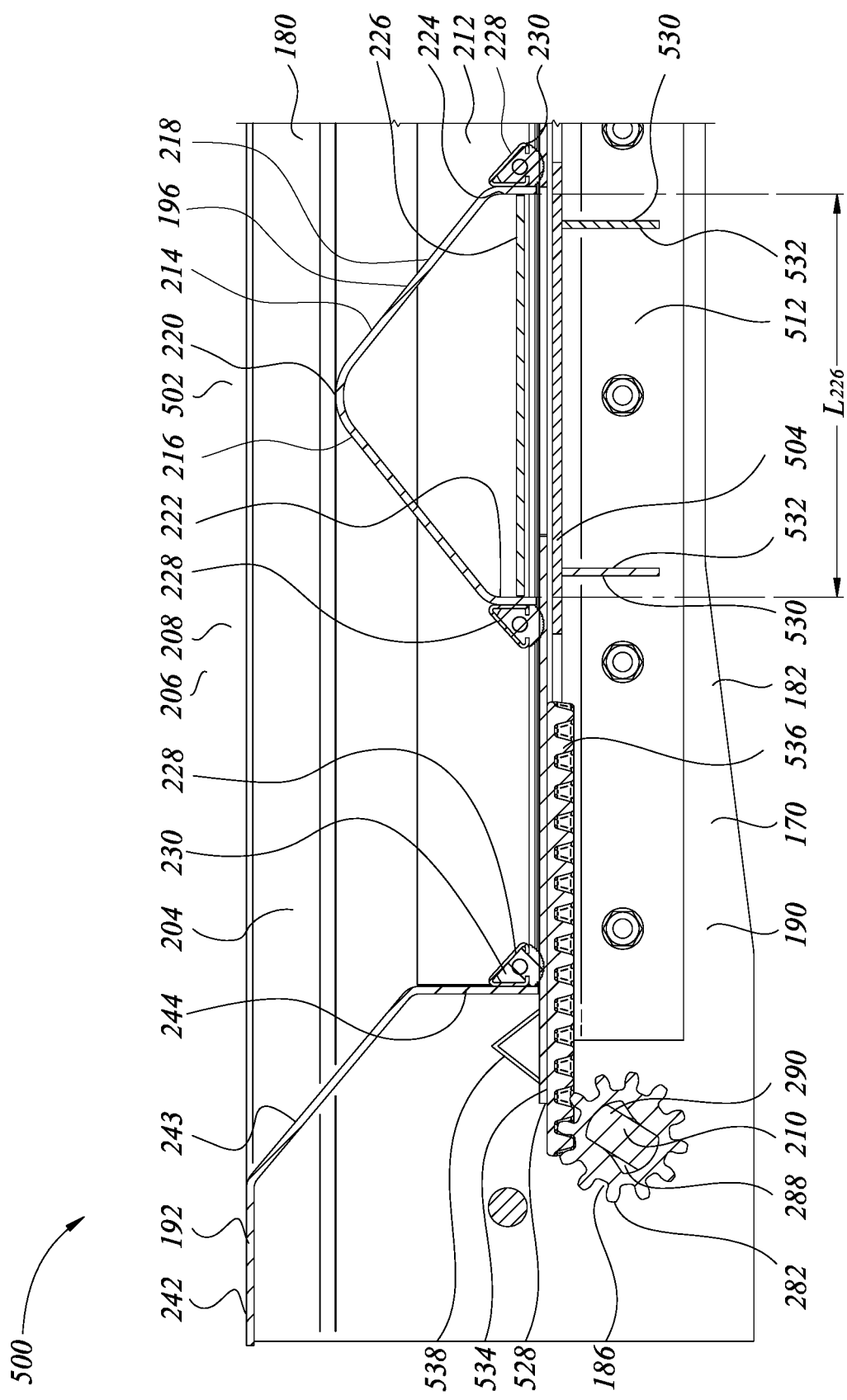
Figure 11A:
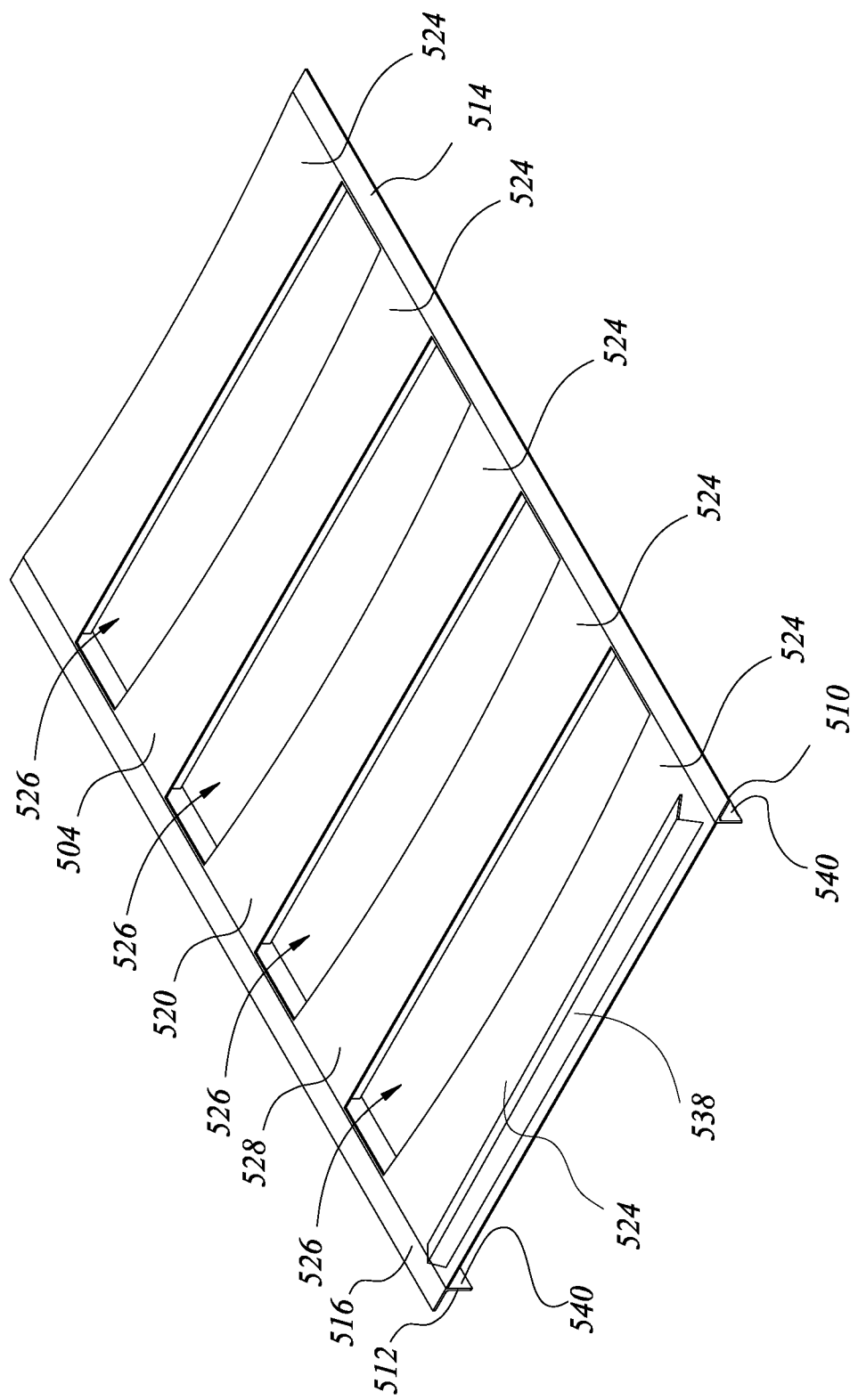
Figure 11B:
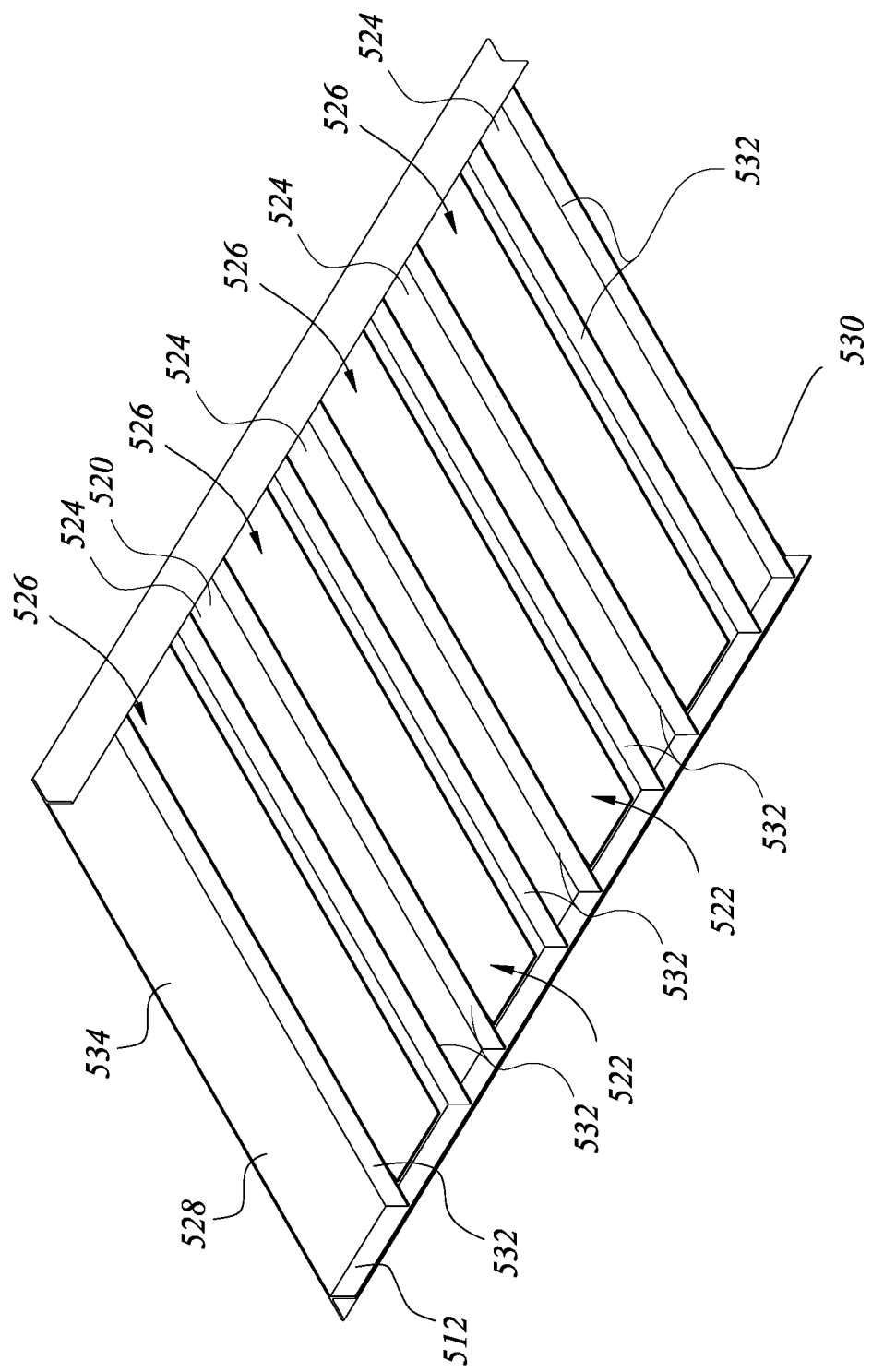
Figure 11C:
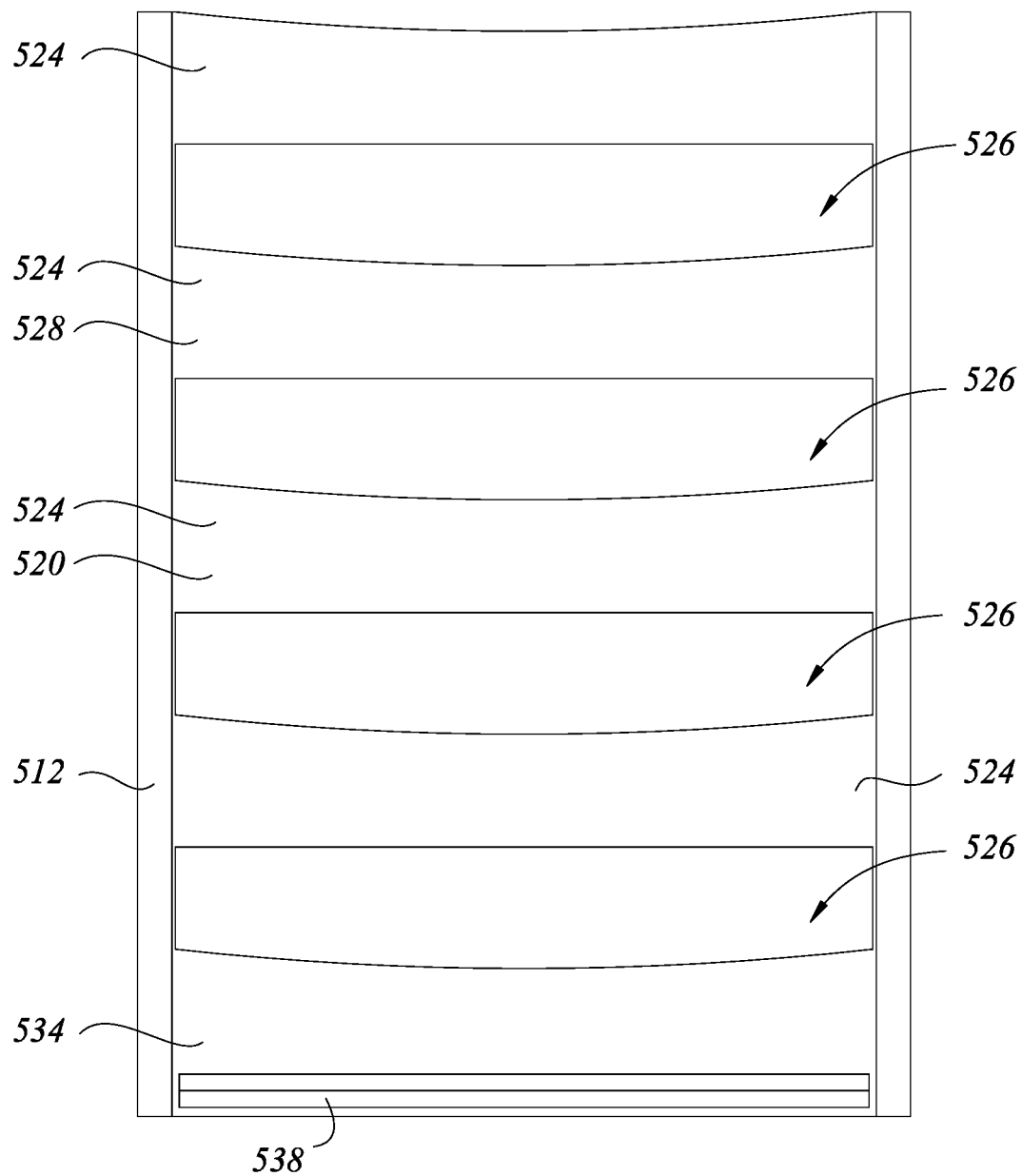
Figure 11D:
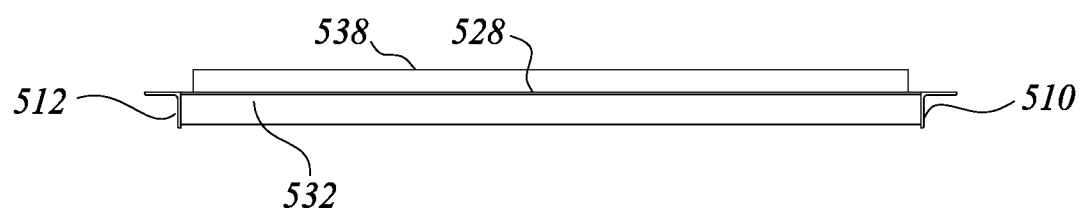

Alternatively, in FIGS. 8a to 8c, drive or transmission 330 has an annular disc 332 rigidly mounted to shaft 210. Disc 332 has a radially outwardly protruding ear or wing 334 pierced to accept pivot pin 336. Transmission 330 has a set of links, or linkages, 338, 340, 342 that are linked together at pin joints 344, 346. The far end of link 342 is connected at a pin 348 to a footing 328 mounted to main sheet or plate 250. As can be seen in FIG. 8c, as shaft 210 turns counter-clockwise (i.e., to open the shutter gate) links 338, 340 and 342 are progressively wound around shaft 210. Note that linkages 338 and 342 are U-shaped or channel-shaped in cross-section such that they define devises. Thus when wound, the sides of the U-shape seat about disc 332. Linkage 340 is a plain bar that lies in the same plane as disc 332, and so it meets on a tangent. When the set of linkages 338, 340, 342 winds around wheel or disc 332, in less than one full revolution of shaft 210 it cannot turn further as shown in FIG. 8c, and stops.

In the alternate embodiment of FIGS. 9a-9e, there is an alternate hopper discharge gate, or discharge gate assembly, 350 that is sized to mate with the respective lands 172, 174, 176 of car 20, such that it can be mounted to the same foot-print as could discharge gate assembly 170. Hopper discharge gate 350 include a frame 360 that has a pair of opposed, longitudinally-running side frame members 352, 354; and a pair of opposed, cross-wise running first and second, or head and tail, end frame members 356, 358. Members 352, 354, 356 and 358 are co-operatively assembled to form a rectangle, as before. Gate 350 also includes a longitudinal member, divider, or partition, or beam, 370 that runs lengthwise from member 356 to member 358 at a location intermediate members 352 and 354. In the embodiment illustrated, member 370 runs along the longitudinal centerline of gate 350, and the gate assembly is symmetrical to either side of the centerline. Gate 350 also has first and second intermediate laterally extending beams or members 362, 364 that run across gate 350. Each of members 362, 364 has a first, or left hand, portion 366, and a second, or right hand, portion 368. Portion 366 runs from member 370 laterally outboard to the left to member 352; portion 368 runs from member 370 laterally outboard to the right to member 354.

Each side frame 352, 354, has an upper, horizontal flange 372, with mounting fittings, a sloped portion 374 extending inwardly and downwardly, and a lowermost vertical leg 376. A seal strip 378, generally similar to seal housing strip 228, and including a brush or seal 380 corresponding to seal 230, is mounted to the inward face of leg 376. Side frames 352, 354 function as longitudinally extending beams.

Central longitudinal member 370 is also a beam. It may be generally 5-sided in section. That is, it has a hat or cap 382 that includes to sloped sides 384, 386 that meet at a radiused apex. It also has downwardly extending legs 388, 390 and seal housing skirts 392 mounted thereto, in the manner described above. Seals or brushes 394 are mounted therein. There is also a bottom plate or bottom flange 396 that closes the section.

A stationary grille or grid, or sub-frame 400 is carried underneath frame 360. It includes a central member 402 that extends longitudinally underneath member 370; a left hand frame member 404 that extends under member 352, and a right hand frame member 406 that extends longitudinally under member 354. Stationary cross-members 408 run laterally across frame 360 from left-hand member 404 to right-hand member 406, through central member 402. Central member 402 may be a structural steel tube, or may be a channel with a back facing downward and toes extending upward to mate with central longitudinal member 370 laterally inboard of seals or brushes 394. Left and right hand frame members 404 and 406 may be hollow structural tubes of square or rectangular section.

The first and second, or front and rear, ends of central member 402 are mounted to, and capped by, head and tail end frames 356, 358. The first and second, or front and rear, ends of left hand and right hand frame members 404 and 406 are also mounted to, and capped by, the vertical webs of head and tail frame members 356, 358. The top surface of members 404, 406 is spaced downwardly from the bottom surface of frame members 352, 354 to leave a gap, or slot, or allowance, or accommodation. Stationary cross-members 408 are mounted flush with the respective top surfaces of members 404, 406.

Gate 350 also includes moving a pair of first and second or left-hand and right-hand members, or gates, or slats, or doors, 410, 412. These gates move laterally in sliding motion upon cross-members 408, and over the top surfaces of members 404, 406 through the clearance slots or accommodations defined between members 404, 406 and members 352, 354, respectively. Doors 410 and 412 may be matching and symmetrically mounted relative to frame 360 and sub-frame 400. When doors 410 and 412 are open, an outboard portion thereof extends laterally outboard of side frame 352 or 354, as may be, and the inboard edge is sheltered by the side frame seal shroud. Conversely, when doors 410, 412 are closed, their inboard edges seat on top of the upper surface of central member 402, sheltered by the seal strip housings, laterally inboard of seal or brushes 394.

Discharge gate assembly 350 may also include a drive transmission 420. It includes a shaft 422 that is carried in hangers 424 on head frame member 356. It has input fitting 426 at either end at which it receives torque and rotation from a mechanical source of torque and rotation at trackside, such as a pneumatic or electric drill. As can be seen, input fitting 426 is located at a low height, well below the side sill, and, given the wideness of frame 360, is located in a position that is trackside accessible from either side of car 20. Input fitting 426 may be a female (or male) socket that mates with a male (or female) drive of the trackside power source. At the center of shaft 422 are a pair of output sheaves, or pulleys, or gears 428, 430.

Two sets of rods or shafts 432, 434 extend laterally through central member 402 and laterally outboard to members 404 and 406. Bushings are provided in members 402, 404, and 406 for receiving shafts 432, 434. Between the legs or webs of central member 402, mounted to rod or shaft 432 there is a pair of input sheaves or pulleys or gears 436, 438, and a pair of output sheaves or pulleys or gears 440, 442. Between the legs or webs of central member 402, mounted to rod or shaft 432 there is a pair of follower sheaves or pulleys or gears 444, 446. Drive chins 448, 450 link gears 428, 430 to gears 436, 438. Further chains 452, 454 link gears 440, 442 to gears 444, 446.

Rods or shafts 432, 434 may have unthreaded central and end portions that are carried in the respective bushings. Rods or shafts 432, 434 have left hand and right hand outboard threaded portions 456, 458. Portion 456 is of opposite hand to portion 458.

Left-hand and right-hand internally threaded cross-heads 460, 462 are mounted to the underside of each of doors 410, 412 near their inboard margins. Cross-heads 460 are of opposite hand to cross-heads 462. Accordingly, rotational motion of shaft 422 in one direction, carried through the various gears and chains will drive doors 410, 412 apart to the open position; and rotational motion in the other direction, carried through the various gears and chains, with drive doors 410, 412 toward each other to the closed position. Thus are the doors operated.

As installed, the loops of the various chains are more or less on, or roughly symmetrical relative to, the longitudinal centerline of the gate, and are sheltered within longitudinal beam 370. The chains pass over beams or rods or shafts 432, 434 in one direction and pass under them in the other, i.e., on the return leg. In operation, beams 362 and 364 are located above the threaded drive shafts, such that when lading passes out of car 20, the threaded rods are sheltered by beams 362 and 364.

As indicated above, assembly 350 is intended to be mountable on the same footprint as assembly 170. In the embodiments illustrated, there are three such discharge gates, two mounted with their head frames facing end 28 of car 20, and one with its head frame facing end 26 of car 20. Multiple opening gates having shutters or louvers that are yoked or chained to move together in the same direction, which may be the longitudinal or axial direction of car 20, or a pair of doors that split and are mounted to be driven in opposite directions, such as transverse to the longitudinal rolling direction of car 20 do not have to be used with flat-bottom hopper cars. They could be mounted to the hopper discharges of hopper cars having two or more distinct hopper discharge section, such as may have substantial intermediate slope sheets between adjacent hoppers.

FIGS. 10a to 10e and FIGS. 11a to 11d pertain to an alternate embodiment of gate to that of FIGS. 3a to 6b. In FIGS. 10a to 10e there is a gate assembly 500 that may be understood to fit the same hopper car discharge opening as either assembly 170 or 350. That is, gate assembly has the same footprint, and same elements for mating with the footprint of the hopper car, and so no further description of the hopper car is made. Similarly, gate assembly 500 has a stationary frame having longitudinal members and horizontal cross-frame members at the end in the manner of gate assembly 170. Gate assembly 500 differs from gate assembly 170 insofar as while gate assembly 170 has a moving shutter plate 184 that is sandwiched between the stationary frame 180 and the stationary support backing frame of stator assembly 182, gate assembly 500 has a stationary frame 502, and a moving shutter member or assembly or array, or simply a shutter 504. Stationary frame 502 and moving shutter assembly 504 are shown together in FIGS. 10a to 10e, and moving shutter assembly 504 is shown by itself in FIGS. 11a to 11d. It does not include a stationary reinforcement below moving shutter frame 504. In this embodiment, side frames 506, 508 include shutter guides 510, 512 that run longitudinally along side frames 506, 508 respectively. In the example given, the depending skirts of 222, 224 have guides 510, 512 mounted to them, guides 510, 512 having the form of rails, or side rails upon which the lateral edges 514, 516 of shutter frame run. The guide rails can have the form of angle irons mounted to the lower margins of skirts 222, 224 with the horizontal flange faced upward. A slider strip or bearing strip 518 may be mounted on the upward facing surface of the flange. When mounted in place the upper flange is spaced downward from cross-members 196 to 202 by a gap suitable for accommodating the margins or lateral edges 514, 516 of movable shutter frame 504 below the cross-members, with the peripheral seals mounted in places as wipers.

In this arrangement the movable member, i.e., shutter member 504 has a sheet or plate 528 having an array of slats 520 and an array of complementary openings 522 in which the slats 524 and openings 526 of arrays 520 and 522 alternate, as above. The size, shape, and aspect ratio of the various slats and openings may be as indicated above in respect of assembly 170. In this instance, however, in place of a stationary reinforcement plate or frame as in assembly 170, an array reinforcements 530 is mounted to the underside of the various slats 524 along the laterally extending margins of openings 526. Individual ones of the reinforcements of array 530 may have the form of stems 532 that extend downward of the plane of slat 524. They could also have the form of an angle iron or channel mounted with its toes against the back or underside of plate 528, or a seamless steel tube mounted in the same location. Reinforcements 530 run laterally, i.e., cross-wise between the side frames. In the embodiment illustrated they are seen as perpendicular T-stems. Margins 514, 516 may include angle irons 540 that run along the lengthwise running edges of plate 528. The back of the angle iron abut the end of the lateral stiffener or stem 532 of reinforcements 530. The horizontal leg of the angle iron provides the sliding land that runs upon the corresponding one of guides 510, 512.

The leading panel 534 has racks 536 mounted to the underside in the manner of assembly 170. Racks 536 engage, or are engaged by, the pinions of the drive system in the manner of assembly 170 as previously described. In some instances, there may be a third rack, and a corresponding third pinion, in the middle of panel 534, or, alternatively doubled racks, i.e., two such racks 536 beside each other in parallel on each side of plate 528. To the extent that the leading margin of leading panel 534 is otherwise unsupported, and since racks 536 are mounted to its underside, an reinforcement 538 is mounted to the top side of the leading edge so that panel 534 can move through its range of motion over drive shaft member 210. Reinforcement 538 runs laterally across movable member 504. Reinforcement 538 may have the form of a vertical stem, such as stems 532. Alternatively, in FIG. 10e, reinforcement 538 is shown as being an angle iron welded in place with toes facing downward. In a further alternative, reinforcement 538 could be made by forming an upward flange on the leading edge of panel 534.

Figure 12A:
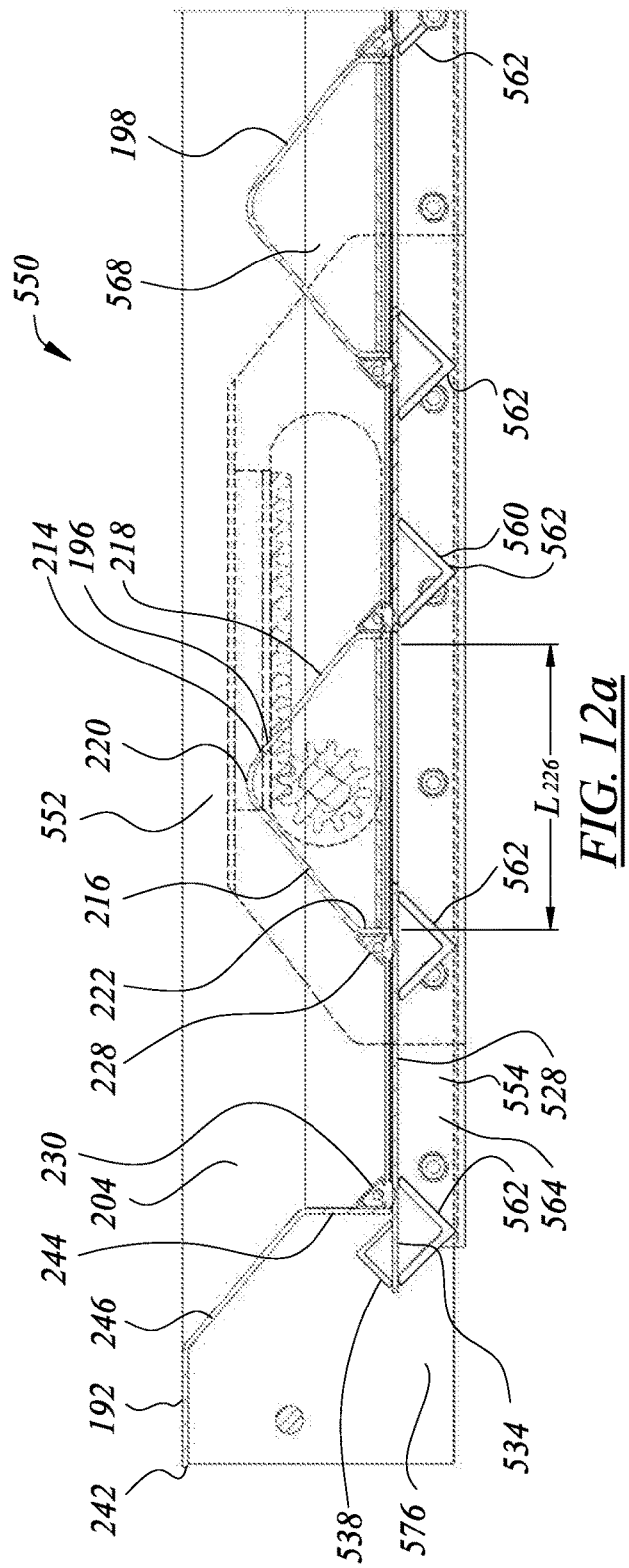
FIG. 12a is a side view, in section of an alternate embodiment of gate in a view analogous to FIGS. 6a and 10e from inside the gate looking outward.
Figure 12B:
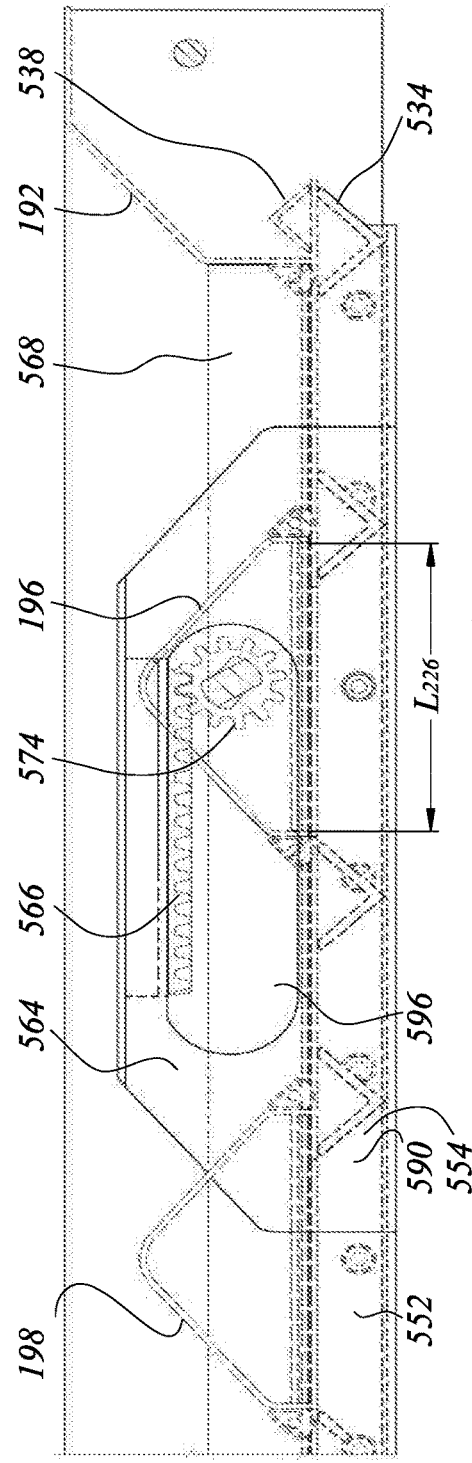
FIG. 12b is an opposite side view to that of FIG. 12a, from outside.
Figure 12C:
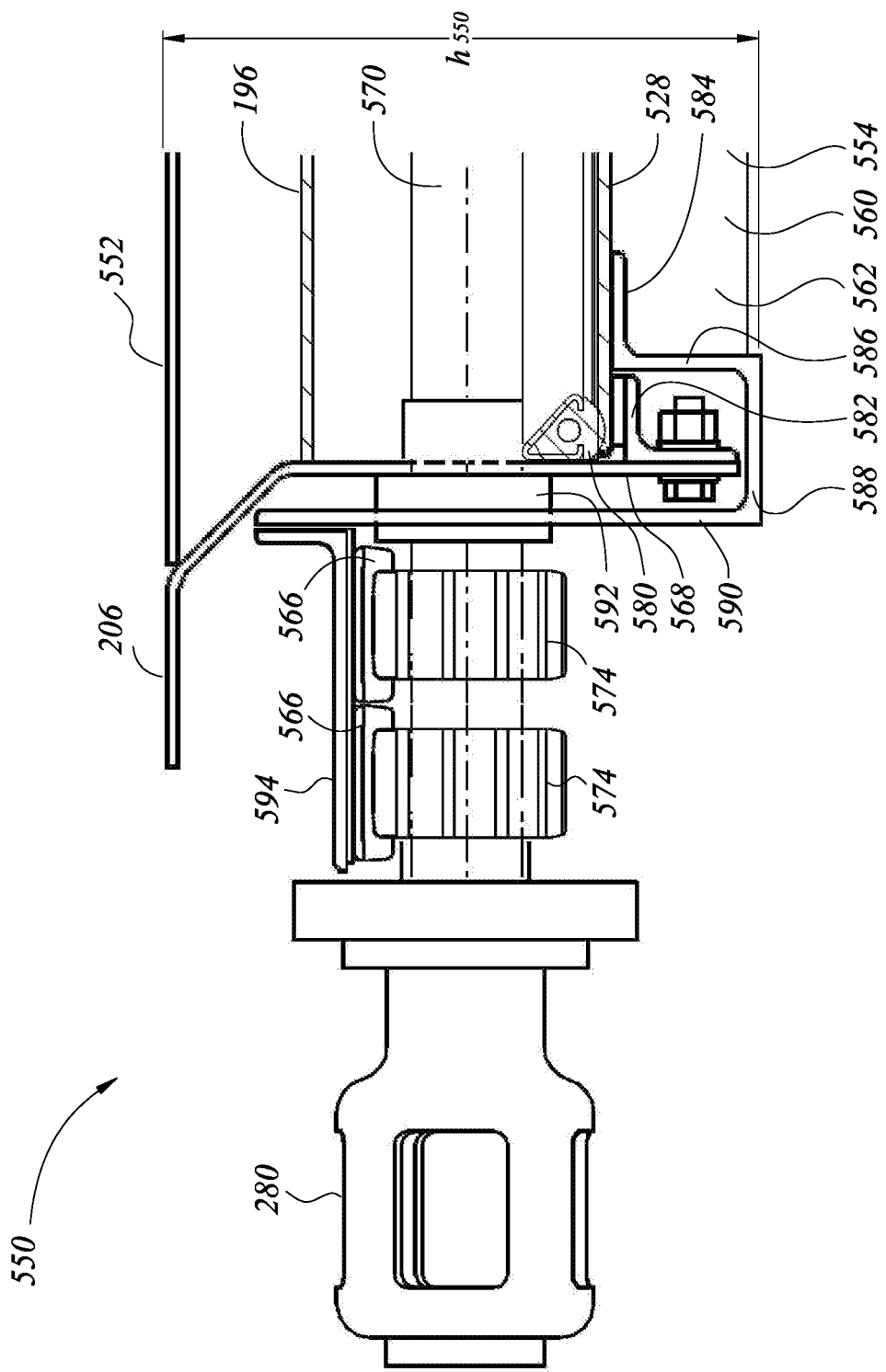
FIG. 12c is an end view detail in partial section showing the drive arrangement.

In FIGS. 12a to 12c an alternate gate assembly 550 is shown to that of gate assembly 500. It has a stationary assembly 552, and a movable assembly, or movable member, or movable shutter, or movable shutter assembly, however it may be called, 554. It is generally the same as gate assembly 500, but differs in the following respects. First, array of lateral reinforcements 530 is replaced by an array 560 in which downward reinforcement stems 532 are replaced by angle irons 562 having their toes facing into the underside of the respective slats or panels. Angle irons 562 have a lesser or shallower vertical depth than stems 532. Furthermore, racks 536 are replaced by racks 566. That is, rather than being mounted to the underside of shutter plate 504, racks 566 are mounted to the underside of left and right hand extensions, or brackets, 564, that locate laterally outboard of, or outside of, side frames 568 of assembly 550. Brackets 564 function as drive input mountings, at which force and motion are transferred from the drive transmission to the movable member or movable assembly 504. They receive motion from pinions 574 mounted at opposite ends of drive shaft 570, which may be taken as being conceptually substantially the same as drive shaft 210 to the extent of having a torque input fitting or head at one or both ends, and a torque shaft that extends between those ends, is mounted in bushings in the respective ide frames and transfers motion to the movable member through a rack-and-pinion relationship. The drive shaft 570 locates upwardly of moving member 504, and passes though the frame in the shelter of the leading cross-member, 572. Racks 566 face downwardly, and are engaged by pinions 574 in the same manner as before. In view of the upward placement of drive shaft 570, the bottom margin of side frame 568 runs on a straight edge, which may be a horizontal edge. As seen by comparing FIG. 12b with FIG. 6a, the leading portion of skirt 576 of side frame 568 is at the same level, rather than having a downwardly depending end. As seen in FIG. 12c, the lateral margins 580 of plate 578 of moving member assembly 504 ride on guides 582, which are vertically smaller than guides 510, 512. As before, guides 582 may have the form of angle irons fit on assembly with mechanical fastening hardware, such as bolts or Huck Bolts or rivets, as may be. Alternatively, guides 582 can be formed as horizontal flanges of side frames 568. In this arrangement, as seen in FIG. 12c, the extensions defined by brackets 564 have a channel cross-section, in which the legs of the channel have unequal length. That is the short leg 588 of the channel has a foot or toe 584 that is mounted to (e.g., by welding) the underside of plate 578. Short leg 586 extends downwardly to clear the lowermost edge of side frame 568. Back 588 of the channel extends laterally outward beyond side frame 568 to the long leg 590 that runs upwardly. The upper region of long leg 590 has an accommodation, or opening, or aperture or cut-out 596 to leave a clearance space for bushing 592 of drive shaft 570. Rack 566 is mounted on a bracket, or angle or flange 594 that is secured, e.g., by welding to, or forms part of bracket 564. Pinions 574 may be single pinions, or they may be double pinions as shown.

In gate assemblies 500 and 550, the moving member or moving assembly, be it 504 or 554, is movable between first and second, or open and closed, positions to govern the egress of lading through gate assembly 500 or 550 generally, as may be. The movement is axial translation, in which the motive force is provided through a mechanical transmission that is accessible from trackside level. That input force or torque may be provided by, or through, an automated or powered drive head that engages the input shaft. Whereas gate assembly 170 is a three piece assembly, in which a moving shutter is mounted between upper and lower stationary frames or stationary assemblies; gate assemblies 500 and 550 are two piece assemblies in which there is a stationary member and a moving member that co-operate to govern egress of lading.

Employment of such outlet gates 170, 350, 500 and 550, or several of such outlet gates or gate assemblies mounted in close proximity as shown and described, may tend to facilitate a reduction in car length for the same volume of lading, or, conversely, to permit a larger volume of lading for the same car length, or some combination thereof. Inasmuch as there is effectively only a single lading containment vessel, and effectively only a single discharge section, there are no large intermediate slope sheets rising above the level of the discharge section, i.e., the discharge section is free of any sloped surface rising above the crest of lateral cross-members 140, 142. Accordingly, gates 170, 350, 500 and 550 are placed close together, to approximate a single flat opening bottom. To the extent that any of gates 170, 350, 500 or 550 has an overall length-wise dimension in the x-direction, "Close together" may be defined as being less than half that length apart, or, alternatively, less than 2 feet (60 cm) apart. In the embodiments illustrated, they are less than one quarter of their length apart, and are less than one foot (30 cm) apart.

The placement of a wider outlet gate at the bottom of the car creates more volume in the lower portion of the car, e.g., below the level of the side sills, or below the level of the center sill, or below the coupler centerline height, whichever may be used as a datum. This may be expressed, alternatively, as having a greater portion of the lading volume of the car located lower than the 98" upper limit on center of gravity for interchange service in North America. The use of open frames, such as frames 78, 80 could be supplanted by frames that have a continuous web. Car 20 could retain such partitions as bulkheads to segregate the lading into two, three, or possibly more, regions. However, where such frames are employed, car 20 may have a reduced empty car weight. A reduction in empty car weight may permit a relatively greater amount of lading to be carried within the "70 ton" (220,000 lbs.), "100 ton" (263,000 lbs.), "110 ton" (286,000 lbs.), or "125 ton" (315,000 lbs.), standards established by the AAR.

In the embodiments shown and described, the discharge section of car 20, has what can be termed a "flat bottom". That is, the vertical depth (i.e., in the z-direction) of each of frame 130 and gate 170 is shallow as compared to the width (in the y-direction) and length (in the x-direction). The use of cross-members 140, 142 in frame 130, and of cross-members 196, 198, 200, and 202 in gate 170, has the effect of breaking a long slope sheet into smaller sections. That is, in a conventional discharge section with a gate opening length in the x-direction equal to five times $L_{230}$, there might typically be corresponding slope sheets leading to the opening of a slope length five times as great as the length of sides 216, 218. But such a discharge section would also mean that the adjacent slope sheet structure of the car body itself would have five times the vertical rise for the same horizontal run. Such an opening would tend to be narrower, and higher, implying longer and taller slope sheets several times as large (and as deep) as the inclined faces of sides 154, 156 of cross-members 140, 142, and the corresponding end slope sheets. By splitting the opening of the discharge gate into a plurality of slots that are short in the direction of travel of the shutter (i.e., the x-direction in FIG. 1e) and wide in the transverse direction (i.e., the y-direction in FIG. 1e), the structure has the effect of apportioning the slope sheet length among the openings, making the gate long, wide, and shallow. Whereas conventional discharge and gate structures tend to be roughly as high as long, the apparatus shown and described is much smaller in vertical extent than in length or width. The depth of gate 170 can be measured overall, as in $h_{170}$ shown in FIG. 3d; or it can be measured from the inlet height to the shutter, as in $h_{192}$ shown in FIG. 6a; or it can be shown as the height of the internal dividers 196, 198, etc., with the sloped sides 216, 218 and crest or apex 220, as $h_{220}$. Alternatively, it can be considered as the height of the two-piece assembly 550 or 550 as shown in FIGS. 10a to 11d and 12a to 12c, from the inlet flange of the stationary member or assembly, to the bottom of the movable assembly. As shown, him is of the order of 8-12 inches, and is less than half the clearance height between bottom flange 160 of center sill 36 and Top of Rail. In the embodiment shown, it is less than one foot. Alternatively, it is less than the depth of the center sill, and in the embodiment shown, less than half the depth of the center sill. In one embodiment him is about 10 inches. The overall height of gate assembly 500 is somewhat less than this; the overall height of gate assembly 550 is still less again. Alternatively, $h_{192}$ may be in the range of 5-8 inches, and in the gate assembly 170 is about 6 inches deep. In the further alternative, $h_{220}$ may be in the range of 3-5 inches, and in the embodiment shown is about 3½ inches. Even taking the largest of these $h_{170}$, gate 170 is more than 4 times as long as it is deep. It is also more than three times as wide as deep. In the embodiment shown in FIG. 2e, gate 170 is more than 6 times as long as deep, and more than 5 times as wide. Relative to $h_{192}$ those ratios would be double. Relative to $h_{220}$, those ratios would be triple. In the case of gate assemblies 500 and 550, the through thickness would be correspondingly smaller, and the various aspect ratios would be adjusted correspondingly. The net result is that whereas conventional discharge sections are boxy and tall, the discharge sections herein are predominantly flat, i.e., more than triple as larger in length and width as in depth, like a flat bottomed car, or like a drop-bottom gondola car. The proportion of the bottom between the trucks that is "flat" at the gate flanges of frame 130 is more than 35% of the projected area of the car between the truck centers. It is an even higher percentage of the available footprint at the given height relative to Top of Rail, given the narrowing of the AAR underframe envelope. That is, whereas it is more than 35% of the projected area of the maximum car width between the truck centers, it is more than 50% of the projected area at the lowermost boundary width of AAR Plate C of AAR Plate F. In the embodiments illustrated it may be more than ½ and ⅔ of those areas, respectively.

Another way to express this is to consider the multiple-louver gate assemblies 170, 500 and 550 as slope-sheet fore-shortening gate assemblies. That is, the effective discharge section slope sheet rise is fore-shortened by breaking it into multiple sections by using an array of high-aspect ratio lateral slots, placed side-by-side, with sloped dividers between the slots. In these embodiments the lading discharges through the slots in parallel. In a conventional single-opening gate assembly, the single gate opening corresponds substantially to the entire horizontal area of the vertically projected door opening. In this description, gate assemblies 170, 500 and 550 are multiple-opening sliding gates. They are oriented to lie horizontally, or flat. The net inlet area of the gate is defined by the rectangular inlet of the stationary frame of the gate assembly. For example, the area of opening 178 in FIG. 3g can be calculated as $A_{178}=L_{190} \times L_{192}$. The net outlet are is defined by the sum of the outlet areas of the array of slots when fully open. In the examples of gate assemblies shown and described, the ratio of outlet area to inlet area is less than ⅔. Generically, apart from the inlet chamfers to smooth the feed-in of the granular lading, the ratio of outlet area to inlet area approaches, or approximates $(n/(2n-1) \times (w_{slot}/w_{panel})$, where n is the number of slots; n−1 is the number of lateral cross-members; $w_{slot}$ is the throat width of the slot in the direction of opening (e.g., $L_{232}$), and $w_{panel}$ is the width of the blank panel between two adjacent openings (e.g., $L_{233}$). That is, $w_{panel}$ is the width of the blank necessary to close the slot when the movable member is in the closed position, and is at least as large as $w_{slot}$. In some embodiments, the ratio of outlet area to inlet area lies in the range of $¾ \times (n/(2n-1) \times (w_{slot}/w_{panel})$ of to $(n/(2n-1) \times (w_{slot}/w_{panel})$. In a narrower range, the outlet area is less than ⅔ and greater than ⅓ of the inlet area. In a still narrower range, it is less than ⅗ and greater than ⅖ of the inlet area. In any case, in those examples, the outlet area is, respectively, less than ¾, less than ⅔ and less than ⅗ of the inlet area. In some embodiments, the outlet area may be less than half the inlet area. In each example, the use of a plurality of openings and at least one sloped-top cross-member allows the vertical rise to be fore-shortened, and thus the effective depth of the gate for an equivalent width reduced by splitting the slope into at least two steps. This split, as demonstrated, is made within the vertical thickness of the gate assembly itself.

The use of hopper gate doors in which there is a divider, typically a sloped-hat divider, between two openings (or several such intermediate dividers, 'n', between more than two openings, 'n+1', as may be) may tend to yield a "flat bottomed" car in which frame 130 of the discharge section of the hopper and the frame of gate assembly 170 are substantially rectangular and flat, i.e., the vertical through-thickness overall of the gate and the aperture dividers defined by cross-members 140, 142 is small relative to both the width and the length of the gate, such that the hopper can be said to be "flat bottomed". This can also be expressed by indicating that the hopper car is a single hopper car, in which the discharge section is a multi-opening array that extends continuously, or substantially continuously over more than ⅔ the width (in some embodiments, over half the width); and that extends substantially continuously over more than half the length between truck centers. Another way to consider the car conceptually is that it has such a large number of close-spaced discharge openings that the combined effect approximates that of having one large continuous opening, albeit in which each ⅓ of the continuous opening is separately operable, given that there are three gate assemblies 170. In some embodiments, each gate assembly may have three or more openings. In a car with three such gate assemblies, the total number of such openings would be in the range of 9-15, it being 15 in the embodiment illustrated. The overall result is a car that has a flat bottom profile between the trucks defined by frame 130, and as such resembles a drop-bottom gondola car, or depressed center gondola car in side view, yet that remains a bottom-dumping hopper car.

In effect, car 20 is the length and width of a three-hopper or four-hopper railroad car, but rather than have two or three distinct hoppers, and the large internal slope sheets used in such cars, the use of wide, multi-opening arrays as described herein effectively permits such formerly distinct and apart discharge sections to be enlarged and merged or run into each other, such that what might formerly have been a two-hopper or three-hopper car effectively becomes a single-hopper car with a large, "flat-bottomed" gate array. Since the gate arrays can be carried at a low level, the volume of the lower portion of the car may tend to be increased.

Another way to express this general flatness and shallowness of the total discharge opening array of car 20, even if frame 130 were not a single or unitary frame, but rather were portioned into distinct sub-frames, is to sum the total combined length of the gates relative to either the truck center distance or the distance over the strikers. For example, that sum-of-the-lengths of the gates 170, etc., may be more than ⅓ of the truck center distance. It may be more than half that distance. In the car shown it may be more than ⅗ of that distance, namely a sum of more than 300 inches over a truck center distance of about 465 to 470 inches. Even in an alternate embodiment of a car with two distinct hoppers, and internal or intermediate slope sheets of some extent rising to the level of the center sill or above, the use of two large discharge grilles, such as provided by the multiple aperture, multiple-shutter or multiple-louver arrays of assemblies 170, 500 or 550, or large area opposed doors of assembly 350, for each hopper, would increase the volume of the lower portion of the car.

In the gate assemblies 170, 500, 550 there is a shutter or louver type system used to create openings to allow the discharge of grain or such other granular lading as may be. These gates have a frame, such as 130, with a series of spaced-apart cross-members of triangular cross-section (at least one; there being four 196, 198, 200, 202, as illustrated) that act as reinforcements or beams that span the gate. They also act as flow dividers and as small scale slope sheet proxies providing sloped surfaces that break what would otherwise be a large rise in a single slope sheet into small segments, permitting the flattening of the discharge. A series of openings is created to either side of the various cross-members. The openings are opened and closed by the sliding movement of the shutters or louvers, which are linked together to a common drive member. When the gates slide open, the commodity carried as lading discharges between the triangular cross-members.

The use of a planar, horizontal flanged interface as the land at the bottom of the discharge section, i.e., at the flanges of frame 130, permits the gates to mount at a flange connection using mechanical fasteners. Alternatively, the gate structure could be welded to car body 22 in a lap weld configuration. The use of mechanical fasteners may be convenient, and may facilitate replacement or repair, such as may occur from time to time.

In assembly 170, the triangular reinforcements, cross-members 196, 198, 200, 202 span the gate transversely (i.e., cross-wise to the longitudinal rolling direction). The apex of the triangle faces upwardly, and the slope on the triangle allows the commodity for which the car is designed to discharge under the influence of gravity. (For grain this slope angle is 36 degrees). The reinforcement has a bottom flange to yield a closed triangular section beam, such as may tend to be resistant to bending deflection. In some examples, the beam may typically be of the order of 50 to 90 inches long, and 8 to 12 inches deep, and 18 to 20 inches wide. Sealing may be aided by attaching a seal or brush, such as may be in a form to accept installation of a carpet rod.

The relative lowness and flatness of the structure can be expressed in a number of ways. First, with reference to the structure of the car body, the outlet discharge section frame may be a rectangle, i.e., the land of frame 130, that has its downwardly facing surface at a height that is less than half the height of the coupler centerline above TOR. That height may be lower than the height of the bottom flange of the center sill. It may be less than ⅔ of the height of the bottom flange of the center sill. The width of frame 130 in the y-direction may be greater than three times its height above TOR. The length of frame 130 in the x-direction may be more than 10 times its height above TOR. In the embodiment shown the width is more than five times the height above TOR, and the length is more than 20 times the height above Top of Rail. Expressed in terms of the discharge gates, the width of assembly 170 or 350 over the side frames may be more than 10 times the clearance above TOR, and as shown it is more than 20 times that distance. In terms of length of one assembly 170 or 350, the lengthwise ratio is greater than 15 times clearance, and in the embodiment shown it is more than 30 times clearance.

As above, the outlet gate slide may include a flat plate with transverse slots cut in it. The gate slide does not have to be a flat plate. It could be a plate with reinforcements to discourage deflection. The cut-outs may be, and as described generally are, rectangular in shape, although other shapes suitable for the discharge of lading could be chosen. In the embodiment shown and described, one of the sides of the rectangle may be given a curved profile, as indicated, on the leading edge of each cut-out. The arc may tend to prevent the leading edge of the opening from becoming unsupported all at once. The arc allows the support to spread gradually out to the edges as the gate slides open. Other shapes may achieve a similar effect.

In assembly 170, the gate is supported by a gate pan, namely stator assembly 182. It is bolted to outlet gate frame 180, and serves to support the sliding portion, i.e., the "shutter" or shutter plate that is the movable member 184 of gate assembly 170. The gate pan has structural depth, being reinforced by a set of ribs, and may tend to limit or to reduce the deflection of the sliding portions or plates 270 of gate assembly 170. This is a three-piece assembly in which the movable member is sandwiched between two stationary members. A two-piece assembly may also be provided, as in assemblies 500 and 550. In these assemblies the upper member is stationary, and provides the lading distributing flow dividers, while the reinforced lower structure is movable. In each case, the stationary members and movable members have apertures and solid panels. In the open position, the movable member is positioned to align the openings of the stationary and movable members; in the closed position, the solid panels of the movable member are aligned with the openings of the stationary member, or members.

There are a number of options in providing drive to the sliding portions between the closed and open positions. One opening method for gate assembly 170 is a drive system that includes a rack and pinion arrangement, as in FIGS. 6a and 6b. This arrangement includes a secondary lock to prevent unintentional opening. The drive shaft may have non-circular shape. The non-circular shape permits a measure of lost-motion, such as permits the release of the secondary lock. Another option is to employ a toggle lock mechanism as in FIGS. 7a and 7b. This mechanism is driven by the drive shaft. As the shaft rotates the links pull the gate slide toward the shaft. The links are wound around the shaft until the gate is fully open. To close the gate, the shaft is rotated in the other direction and the links push the gate closed. The action of the links locking together discourages accidental opening of the gate. In the further alternative of FIGS. 8a and 8b, another option is to drive the gate slide using a chain-and-sprocket system. It is similar to the toggle lock system. As the shaft rotates, the chain is wound around the sprocket pulling the gate slide to the open position. To close the gate, the shaft is rotated in the other direction and, as the chain unwinds, it pushes the gate closed. The chain links are designed to that, when the chain is pushed the links lock together forming a rigid strut that is able to push the gate closed. The locking-together of the links is what creates a locking feature that may tend to discourage inadvertent or accidental opening of the gate. Still another system to open the gate includes a screw jack, or scissors-type mechanism, similar to the double-threaded opposite-hand threaded shafts 432 and 434. As the shaft rotates, respective lead screws on the right-hand and left-hand threaded ends of the shaft advance toward each other, or spread apart from each other, as may be. Linkages mounted to these lead screws are linked at their other end to plate 270 in the manner of the arms of a scissors-jack. As the lead screws approach, the arms straighten to push the door closed; as they separate the arms diverge, pulling the gate open.

In FIGS. 13a-13f another example of a hopper car, 620 has a body 622, supported on trucks 24 for rolling motion along railroad tracks. It has a first end 626 and a second end 628. The car has main bolster 30, couplers 32, and striker plates 34, as in railroad hopper car 20, described above. It has the same outlet gate footprint, defined by frame 130 and cross-members 140 and 142. Car body 622 is a lading containment shell. Lading is introduced from above, and is discharged out the bottom of the car, that discharge being governed by an array of outlet gating, such as multiple outlet gate assemblies 170, as above.

In many respects, hopper car 620 is largely the same as hopper car 20, and, unless otherwise noted, may be taken as being the same, and the various component names and annotation numbers may likewise be taken as being the same. Hopper car 620 is nonetheless different from hopper car 20, or may be taken as being a further development of hopper car 20.

As above, frame 130 is large compared to earlier discharge section openings, and has an overall peripheral footprint encompassing more than one outlet gate assembly 170. The resultant opening is abnormally long in the length direction (i.e., x-axis), and abnormally wide in the transverse direction (i.e., y-axis). The central transverse section of car body 622 can be seen as a downwardly-opening U-shaped channel, where the back of the U has a slot formed in it through which lading is loaded into the car. Thus far hopper car 20 and hopper car 620 have been taken as being covered hopper cars. They could alternatively be open-topped hopper cars, with or without cross-bracing at the level of the top chords depending on the lading for which they are designed. The large bottom opening associated with frame 130 can be thought of as a weakness in the structural shell. As such the exterior shell of car body 622 may tend to be relatively soft in x-y torsional shear relative to the z-axis, and in end-to-end y-z torsional shear about the x-axis. The longitudinal shear connection to the center sill may also be relatively soft. That is, where a fully-laded car is subject to a longitudinal impact load in buff the center sill may tend to want to move axially relative to the lading containment body. That tendency is resisted by the structural connection load path between the end slope sheets and the center sill. One way to discourage flexing of car body 622, and, in particular to discourage vertical flexing of the left side of the body at mid-span relative to vertical flexing of the right side of the body, is to provide an internal former, or frame, which will retain the largely cylindrical body shape, and in that regard will restrain shear deflection in the y-z plane. The former, or frame, is, or functions as, a shear web, and is planar. A shear web lying in, or limited to, the y-z plane may not necessarily be as effective at discouraging torsional deflection about the x-axis, and may not tend to be as helpful in providing a longitudinal shear connection between the center sill and the remainder of the car structure that forms the lading containment shell. However, if a former, or part of the former, is oriented obliquely relative to the z-y plane, it will tend to enhance resistance to torsional deflection along car body 622. It may also tend to provide additional shear connection between the center sill and the lading containment shell under longitudinal impact loads in buff. In a conventional hopper car, where the shear web extends in an oblique plane having components in the x, y, and z-directions, this function is provided by the end slope sheet and the internal slope sheets. The internal slope sheets lead to the discharge openings of adjacent hopper sections, tending to increase the torsional and longitudinal shear stiffness of the structure. However, use of internal slope sheets in a car with a substantially continuous discharge array would tend to preclude use of a substantially continuous discharge gate structure, as described above.

Car body 622 has shear force transfer members 630, 632 oriented in a transverse plane oblique to the y-z plane, and, additionally, is a shear force transfer member that is perforate, i.e., that admits the passage of lading therethrough. The shear force transfer web or transfer member (i.e., 630, 632) is located above a gate, or gate portion, that opens and closes to govern flow of lading therethrough. The shear force transfer member is between, (i.e., intermediate), discharge gate assembly 170 and main lading containment volume 640 of car body 622. Discharge gate assembly 170 is below; the main lading containment volume 640 is above. That is, the main or first portion of lading containment volume 640 lies above shear force transfer members 630, 632, while a secondary, or second portion of lading containment volume 640 lies below shear force transfer member 630, 632 above frame 130 and also above discharge gate assemblies 170. In a known hopper car, no portion of the lading containment volume would lie below the internal slope sheets, and lading does not pass through the internal slope sheets.

Another point might also be noted. As illustrated, side slope sheets 624, 634 are parts of the lower region of the containment shell defined by body 622, below the angle of transition 124. They run in the longitudinal, or lengthwise, direction of car 620 as it rolls along the railroad tracks. As the name "side slope sheet" suggests, they are downwardly laterally inwardly converging from transition 124, to guide the lading toward the various discharge gate assembles 170. In a multiple gate hopper car, each hopper has a discharge section that is, typically, in the form of an inverted, truncated rectangular pyramid, with both fore-and-aft inlet slope sheet extensions, and side slope sheets extending downwardly and transversely inwardly from the side sills co-operating to form the four sides of the inverted pyramid leading to an outlet gate. However, both in car 20 and in car 620, the use of a long, essentially continuous discharge section means that the side slope sheets 624, 634 extending downwardly from the side sill are longitudinally continuous, i.e., they are not interrupted at each hopper discrete as in conventional discharge structures. Side slope sheets 624, 634 form a lading-containment wall or barrier extending from end slope sheet 50 to end slope sheet 52. This side slope sheet lading containment barrier extends the full distance along frame 130. As such, the internal slope sheets, which would otherwise perform that containment function in a pyramidal discharge structure, are no longer needed as a continuous containment wall or web or membrane.

Figure 13A:
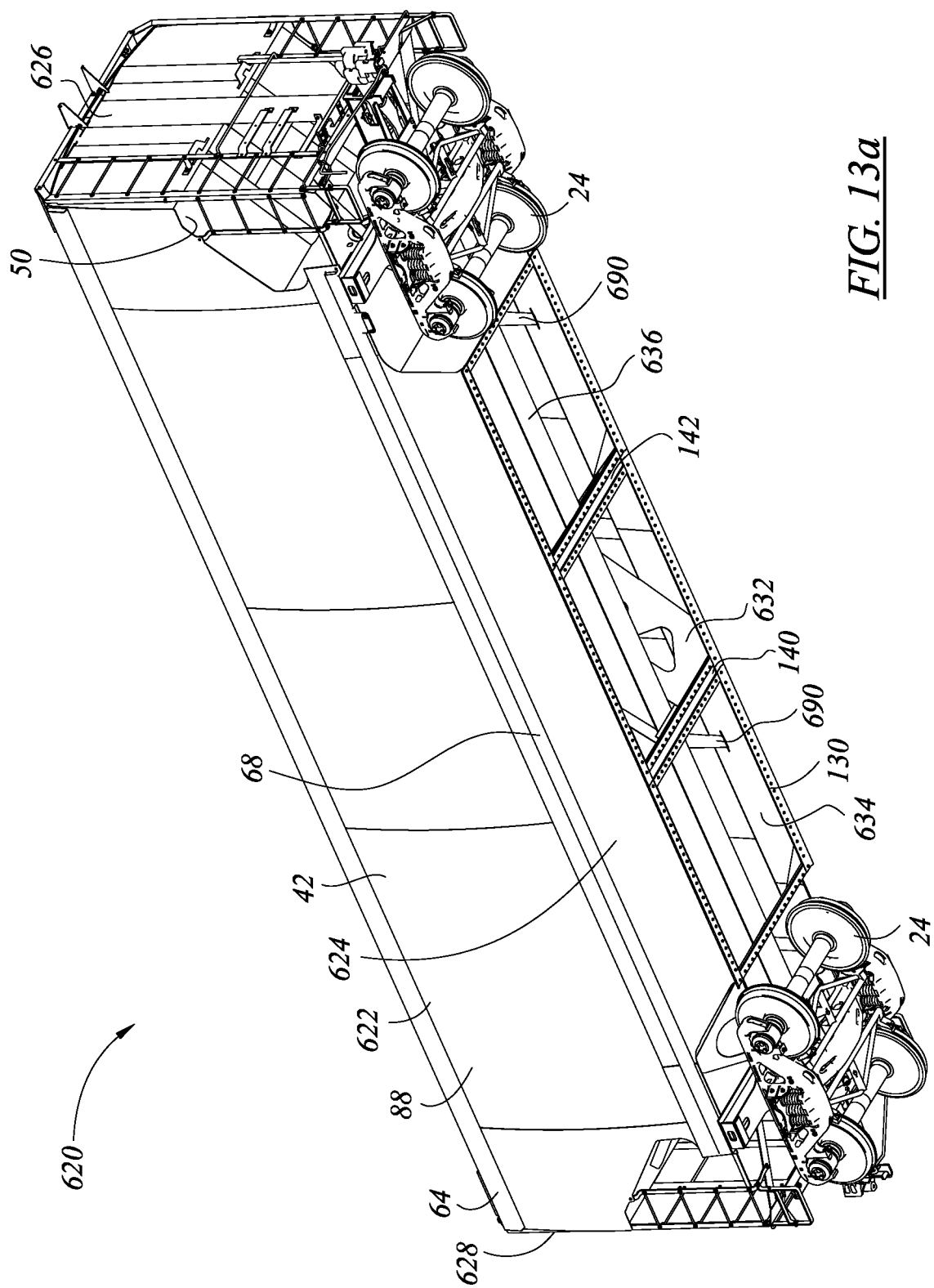
FIG. 13a is an isometric view of an alternate embodiment of a railroad hopper car to that of FIG. 1a seen from below, to one end and to the left.
Figure 13B:
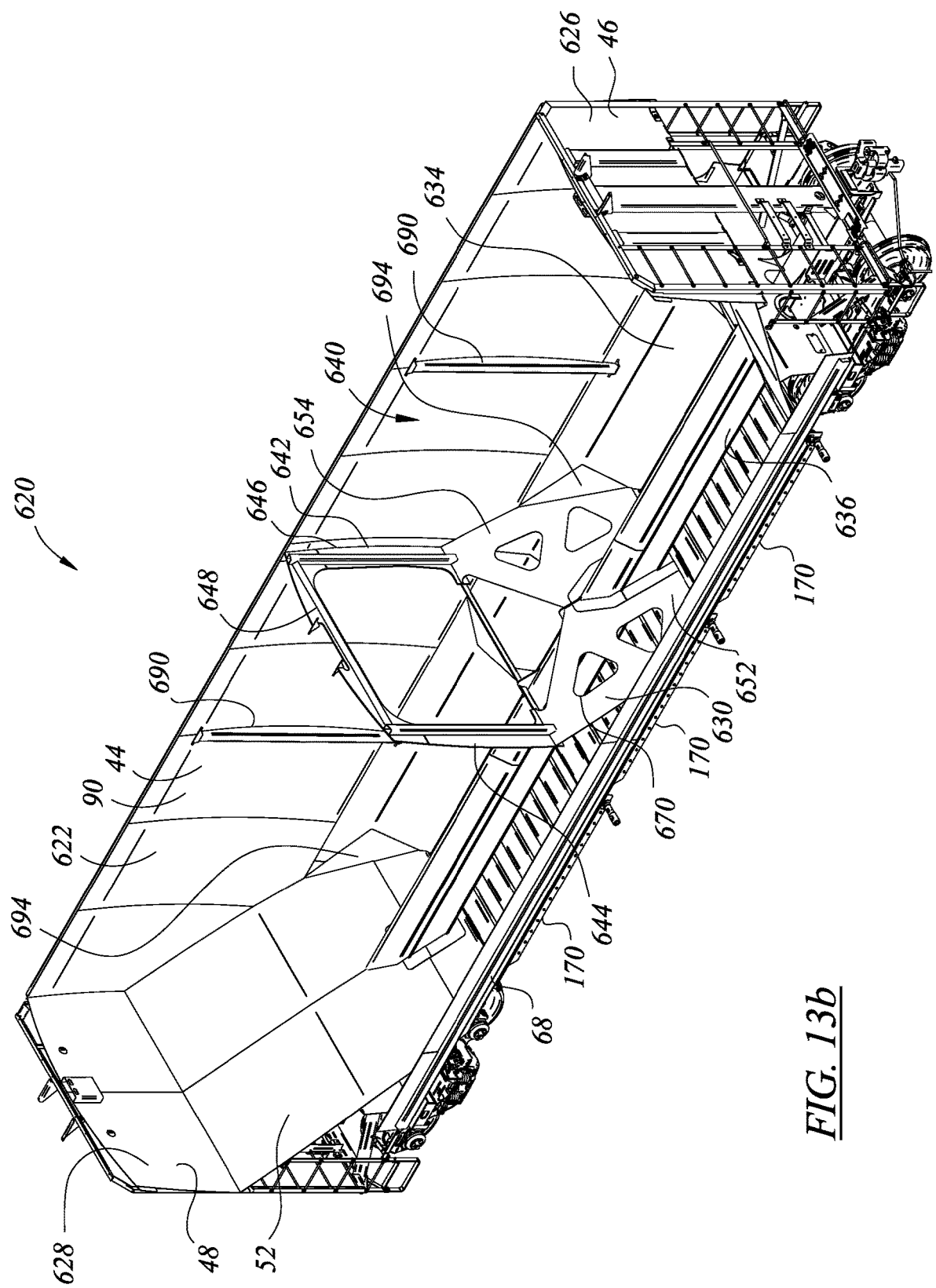
FIG. 13b is an isometric view of the railroad hopper car of FIG. 13a with near-side wall and roof removed to reveal internal structure.
Figure 13C:
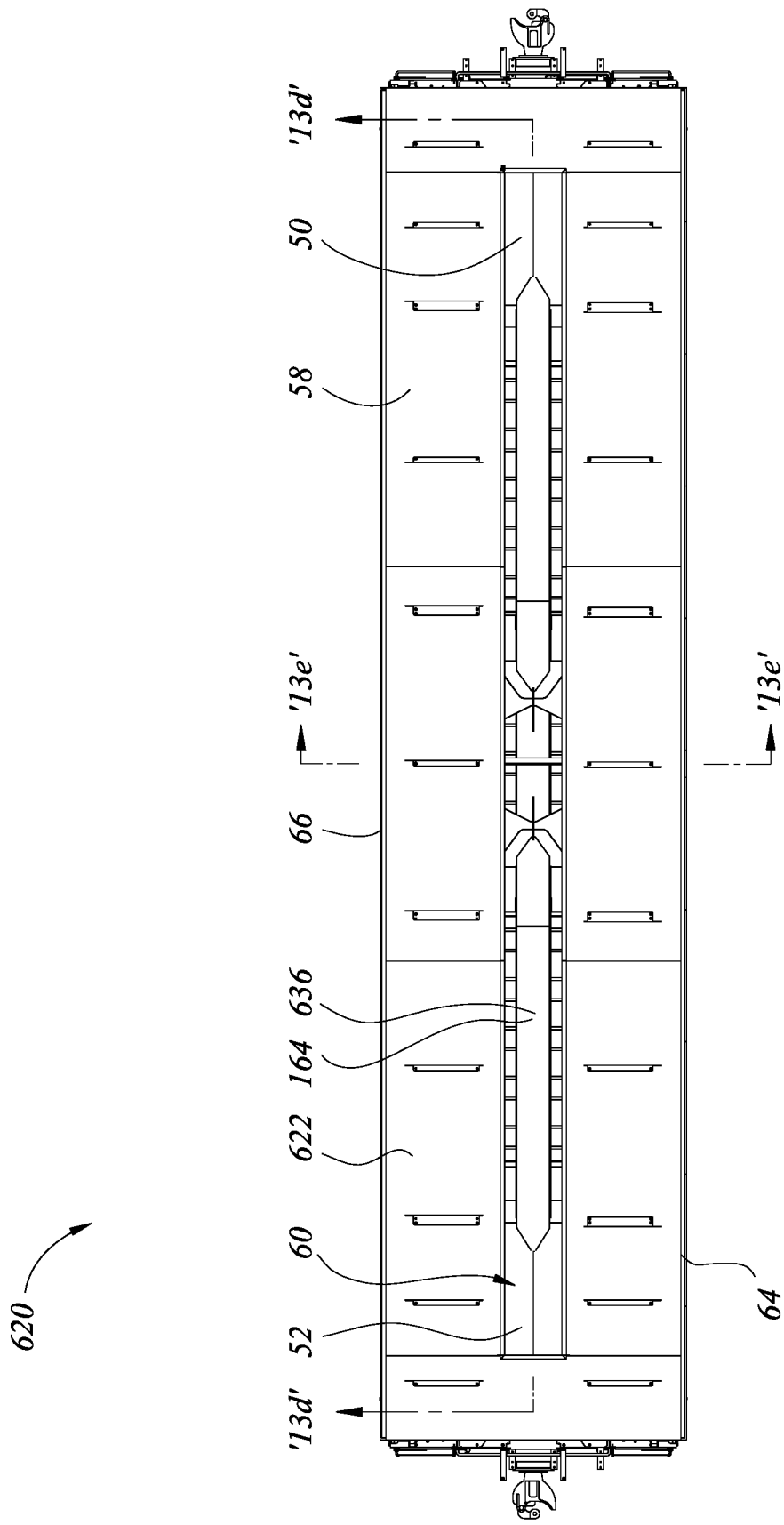
Figure 13D:
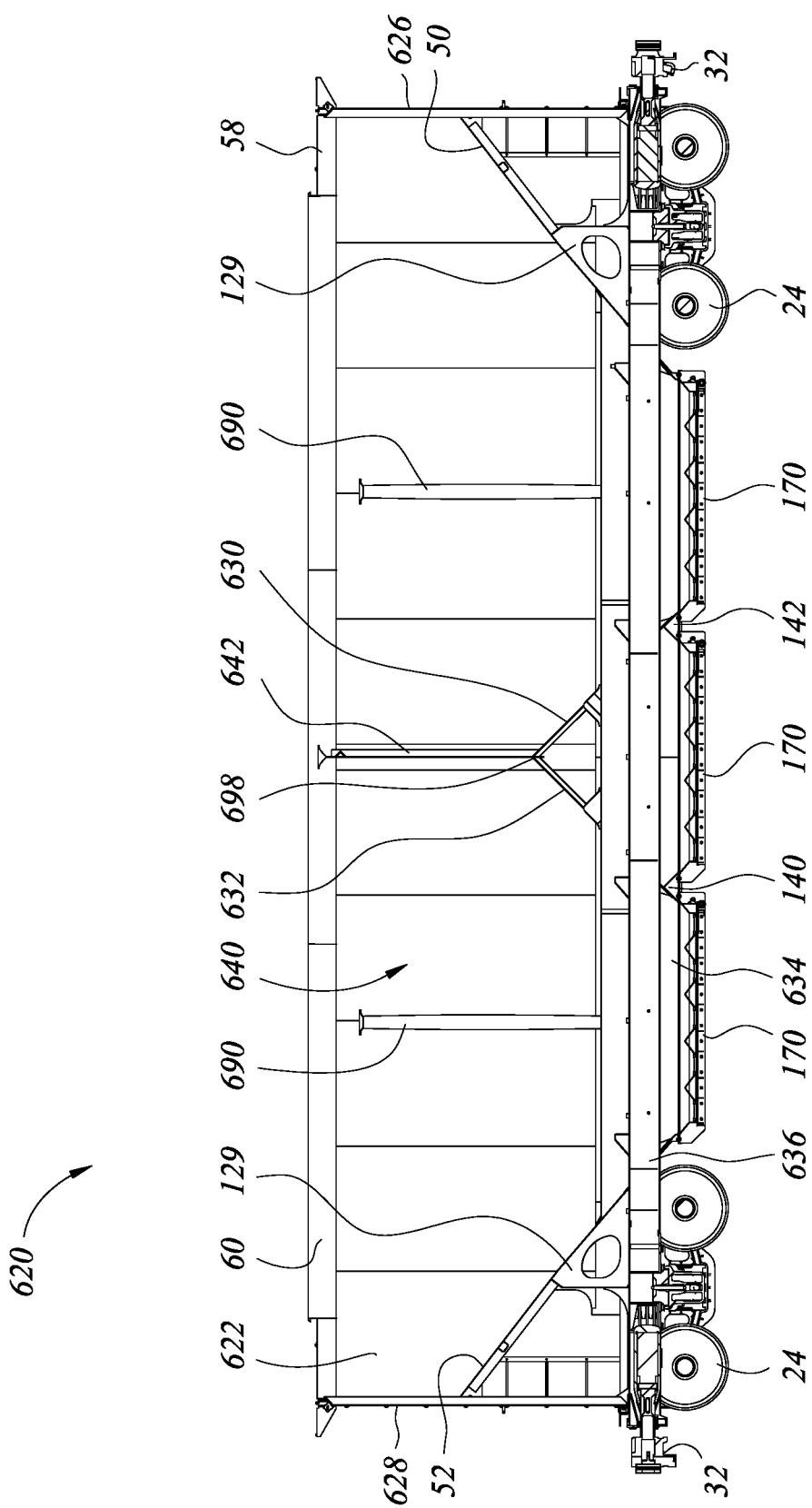
FIG. 13d is a section of the railroad hopper car of FIG. 13c taken on the longitudinal vertical center-line plane of the car at section '13d-13d' of FIG. 13c.
Figure 13E:
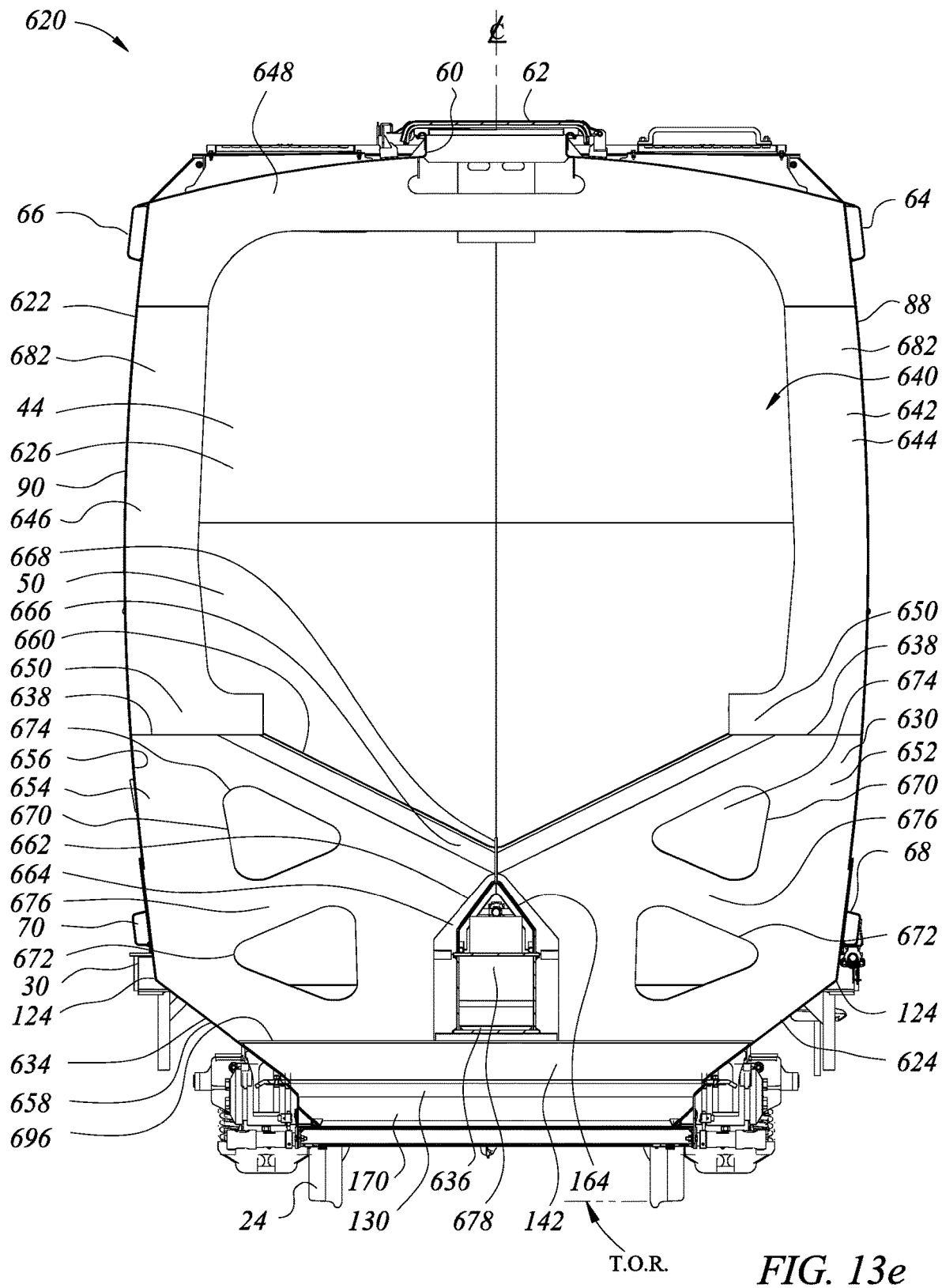
FIG. 13e is a cross-section of the railroad hopper car of FIG. 13a taken on a vertical-transverse section '13e-13e' of FIG. 13c.
Figure 13F:
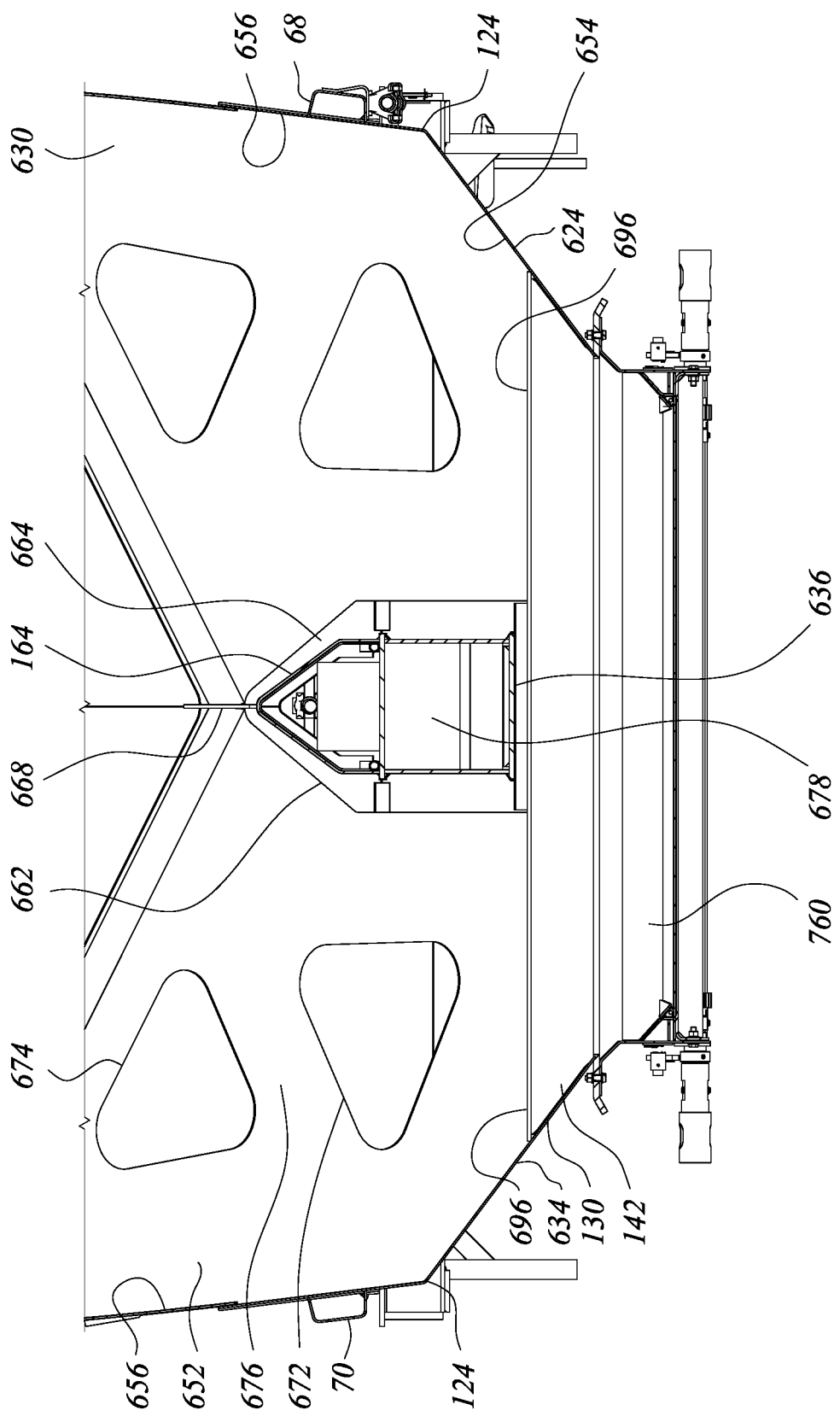
FIG. 13f is an enlarged detail of FIG. 13e, with truck removed.

In the example of FIGS. 13a-13f, this structural function is achieved by use of shear force transfer members 630, 632. As can be seen, there is a frame, or former, 642 located at a given longitudinal station along hopper car 620. The location of the longitudinal station is at some level arbitrary, but inasmuch as railroad car structure is often symmetrical, such a frame may be at an integer fraction of the distance along frame 130, e.g., ½, ⅓, ¼ etc. In the example illustrated, frame 642 is located half way along frame 130, and therefore also half way along center sill 636 and half way along car body 622, half way between the truck centers of trucks 24, and so on. Frame 642 has a first side portion 644, a second side portion 646, and a top portion 648. First side portion 644 runs up the inside of the web or wall sheet of side wall 42; second side portion 646 runs up the inside of the web or wall sheet of side wall 44, and top portion 648 runs underneath roof structure 58. In each case, the external profile of portions 644, 646 and 648 defines a form to which the respective side sheet 88, 90 or roof sheet 59 conforms. As shown, that form is arcuate, and outwardly bulging. In the example, side sheet 88, 90 is formed on a cylindrical arc that may be less prone to longitudinal buckling under buff loads. The general form of frame 642 is a downwardly opening U shape, in which portions 644 and 646 form the legs, and portion 648 forms the back. Although in the example shown frame 642 ends just below apex 698, frame 642 could alternatively extend down to the side sills, and could have a bottom member, as described in the context of frame 78 or 80, above. In this case, however, first and second side portions 644, 646 terminate part way up the side sheet as seen in FIG. 13e.

First and second shear force transfer members 630, 632 commence at the upper margin of cross-member 140 (632) or 142 (630) respectively, and are obliquely inclined upwardly toward each other, and toward the lower terminations of portions 644 and 646 of frame 642. The planes of members 630 and 632 intersect along a nominal line of intersection, or apex, 698. That is, although members 630 and 632 abut, and are welded to, opposite sides of feet or horns 650, for the purposes of this discussion they can be thought of as meeting at, or defining, apex 698 where their planes would meet. Each of force transfer members 630 and 632 may be split into left and right hand halves, or portions 652, 654, which are the same other than being of opposite hand. As installed, each pair 652, 654 is intended to be co-planar, or substantially co-planar. The upper margins 638 of portions 652, 654 of members 630, 632 form respective common junctions with the lower margins of portions 644, 646. That is, those lower margins form feet or horns 650 against which upper margins 638 abut. The upper margin of member 630 abuts foot 650 on one side, and the upper margin of member 632 abuts foot 650 on the other side.

The outside, or transversely outboard, profile of members or portion 652, 654 has an upper segment 656 and a lower segment 658. Upper segment 656 is formed on the curve or slope of the lower portion of the side wall side sheet running obliquely downwardly foot 650. Lower segment 658 is formed on the slope running obliquely downwardly on the inside face of side slope sheet 624 or 634, as may be, from the slope transition point 124 to cross-member 140, 142, as may be. The bottom edge or bottom margin of portions 652, 654 is identified as 696. It overlaps the respective one of cross-members 140, 142, as may be.

Inboard of foot 650, each of portions 652, 654 has a segment 660 that is a free edge, and which runs to center sill 636. There is then a further segment 662 that follows the shape of center sill shroud 164. Segment 662 is has an open tolerance, or gap, relative to shroud 164, to permit fit-up. The gap is covered by a further member, or a surround, or doubler, or collar, essentially a flashing, identified as closure member 664 that laps segment 662 and that is welded along a fillet to shroud 164. At the juncture of segments 660 and 662 there is a finger, or toe, or tab 666. There is also a generally triangular gusset 668. The bottom, or long edge, of gusset 668 welds along the top of center sill shroud 164. The body of gusset 668 then stands in a vertical x-z plane upwardly of shroud 164. Tab 666 of each of portions 652, 654 of each member 630, 632 welds to the side of gusset 668 along the hypotenuse.

As seen, an array of apertures 670 is formed in each of shear transfer members 630, 632. In the example illustrated, each of portions 652, 654 has a lower aperture 672 and an upper aperture 674. Although apertures 672, 674 could be round or oval, or elliptical, in the embodiment illustrated they are of triangular shape with radiused corners. Lower aperture 672 has one edge that runs generally parallel to the side of center sill 636; a second edge that runs roughly parallel to segment 658; and a third edge running diagonally back toward tab 666. Upper aperture 674 has a first edge running generally parallel to segment 656, a second edge running parallel to the free edge of segment 660, and a third edge that is parallel to the diagonal edge of lower aperture 672, such that a strut 676 is formed to run between apertures 672 and 674. It runs diagonally from transition 124 toward tab 666. The resultant member 652 or 654 has the general appearance of a truss member with triangular holes and diagonal struts. Optionally, a stiffening flange may be formed around each of the triangular openings, the flange being formed downwardly out of the plane of the web. An internal plate or gusset 678 is welded within center sill 636, co-planar with, or substantially co-planar with, shear force transfer member 630 or 632, as may be, and provides web continuity of members 630, 632 across center sill 636.

As seen from above, there is a generally diamond-shaped opening 680 surrounded by the respective free edges 660 of portions 652, 654 of members 630, 632. Opening 680 extends above center sill 636. First and second side portions 644, 646 may include, as shown, a web or shear plate 682, welded edge-on to side sheet 88, 90, forming a perpendicular stem thereto. In addition, as shown it has an out-of-plane stiffener, in this case a structural section in the form of a channel section 684, with its toes welded against the planar web, thereby forming a closed hollow section resistant to out-of-plane deformation. The top cross-member may similarly have an out-of plane stiffener in the form of a structural section, which, in the embodiment illustrated, is an angle iron 686 with its toes welded to planar web member 688 to form a closed section, in this case a closed triangular section. As may also be noted, the upper margin, or profile, of top portion 648 has side portions that define, or conform to, the curvature of the roof panels (in this case, outwardly bulging, but also outwardly and downwardly sloped so as to shed rain or other precipitation. It also has a central, cut-out portion that extends across and within coaming 61, this central portion being bounded by coaming gussets, as seen in FIG. 13b.

Frame or former 642 provides a moment connection between and across the sides of car 620, in co-operation with shear force transfer members 630 and 632, such that the combined structure forms a generally U-shaped spring extending across the car, with the long upward toes of the U being tied together by top portion 648. The center of the bottom of the U-shaped spring connects center sill 636 to frame 642, and to the lading containing shell of body 622 generally. Alternatively, this structure can be thought of as a continuous ring that combines shear force transfer members 630, 632 and frame 642 including side portions 644, 646 and top portion 648 as a continuous peripheral frame anchored to center sill 636. Shear force transfer members 630, 632 have non-trivial extent in the x-direction, and so provide a lengthwise or longitudinal shear connection in the x-direction between center sill 636 and side walls 42, 44 and side slope sheets 624, 634. In particular, shear force transfer members 630, 632 provide a shear connection, or load transfer mechanism, between center sill 636 and side sills 68, 70 for the transfer of lengthwise loads, as in a compressive impact in buff. Shear force transfer members 630, 632 are inclined obliquely in the longitudinal direction at an angle that is at least as steep as, and in some embodiments somewhat steeper than, the angle of repose of the particulate material, or materials, for which car 620 (or 20) is designed.

Additionally, car 620 may have, and in the example shown does have, further wall stiffeners 690 located intermediate a frame or former 642 and either another such frame or former, or an end wall of end 626 or 628. Wall stiffeners 690 are mounted inside the lading containing shell, i.e., inside side wall sheet 88, 90, and extend from roughly the height of side sill to the top chord. Stiffeners 690 may have the form of a structural section having an outer edge, or edges, conforming to or defining the curvature of side sheet 88, 90. That is, the side sheet has an outwardly bulging profile, or curvature, and the outer edge of stiffener 690 is formed on that curvature. Stiffener 690 is much deeper in section in the y-direction than is the web through-thickness of side sheet 88 or 90, and so has much greater resistance to bending deflection about the x-axis. In the example, reinforcement 690 has a channel section 692 having toes trimmed conform to, and welded to, the side sheet curvature, thereby forming stems perpendicular to the side sheet of the side wall. In this example the back of channel section 692 is a straight chord, and lies in an almost vertical plane. It could, alternatively, be formed on a curvature to yield a stiffener of constant channel depth. Stiffeners 690 are then self-supported by the wall sheet membrane of side sheets 88, 90. That is, the stiffener is mounted to, and is located in its position by, the membrane that the stiffener is itself stiffening. Stiffeners 690 can be conceptualized as being akin to a cross-tie, a spar, or a batten in a sail (or to which a sail is attached) or to a stretcher in a wing structure. In railroad terminology, a cross-tie is distinct from a cross-bearer in that a cross-bearer transmits bending moments at a built-in connection, whereas a cross-tie is conceptualized as having pin joint connections, and so does not. Accordingly, the end of the cross-tie or spar or batten or stretcher is neither a built in connection, nor is it relied upon to transmit a bending moment to or from adjacent structure. The batten does, however, encourage the membrane to maintain the curvature of the batten profile, whatever the angular orientation of the batten may be relative to the longitudinal axis.

In this context, stiffener 690 is seen in side view in FIG. 15*b*. It has a first end, being an upper end, that terminates just short of top chord 64 (or 66); and a second end, or lower end, that terminates upwardly short of side sill 68 (or 70). For the purpose of discussion, the side sill may be taken as a point of reference as defining a longitudinal axis. Stiffener 690 is conceptually like a cross-tie or spar or batten, or stretcher (i.e., across which the membrane is "stretched" or formed) in that it does not have a built-in moment connection to the side sill (or to the top chord or to the center sill). Rather, although welded to side sheet 88, 90 along its profile, those end connections structurally approximate simply supported pin-joint connections having an axis of rotation in the x-direction, as if hinged, i.e., as if the wall sheet web or membrane were a plastic living hinge, relative to the side sill or top chord, respectively. The side sheet 88, 90 of hopper car 620 is like the membrane of a sail, except that it can be placed in compression in the axial direction when buff loads are applied to the car. By aiding the side sheet in retaining its curvature, stiffener 690 tends to aid the side sheet to resist buckling under longitudinal compressive loads. This occurs notwithstanding that stiffener 690 is self-supported by side sheet 88 (or 90) itself, and notwithstanding that the relationship to the side sill approximates a simply supported pin-joint, i.e., a single degree-of-freedom connection in which the degree of freedom is rotation about the axial direction. In alternate nomenclature, stiffener 690 is a side sheet-mounted, or membrane-mounted, cross-tie extending intermediate the side sill and the top chord.

A corner plate 694 is welded into the lower corner between member 652, 654 and the side slope sheet to maintain the slope angle of the side to discourage lading from hanging up in the corners of both then end sheets and the internal slope sheets, i.e., the internal shear transfer members 630, 632 where they meet the side slope sheets.

Alternatively, car 620 may have, and in the FIGS. 15*c*, 15*d*, 15*e* and 15*f* does have, further wall stiffeners 710 located intermediate a frame or former 642 and either another such frame or former 642, or an end wall of end 626 or 628. Wall stiffeners 710 are mounted inside the lading containing shell, i.e., inside side wall sheet 88, 90, and extend from roughly the height of side sill to the top chord. Stiffener 710 can be taken as being the same as or substantially similar to and having the same description as provided about in respect of stiffener 690, except that stiffener 710 extends to the top of top chord 64, 66, and mates with the roof sheet 59. Stiffeners 710 may have the form of a structural section having an outer edge, or edges, conforming to or defining the curvature of side sheet 88, 90. Stiffener 710 has a channel section 712 having toes trimmed conform to, and welded to, the side sheet curvature, thereby forming stems perpendicular to the side sheet of the side wall. Stiffeners 710 are then self-supported by the wall sheet membrane of side sheets 88, 90. That is, the stiffener is mounted to, and is located in its position by, the membrane that the stiffener is itself stiffening. Stiffeners 710 can be conceptualized as being akin to a cross-tie, a spar, or a batten in a sail (or to which a sail is attached) or to a stretcher in a wing structure. Additionally, in FIGS. 15*c*, 15*d*, 15*e*, and 15*f* car 620 has roof stiffener 714 (FIG. 15*c*) or 716 (FIGS. 15*d*, 15*e* and 15*f*). Stiffeners 714 and 716 extend between the top end of stiffener 710 (and, therefore in structural connection to top chord 64, 66) to coaming 61. Stiffener 714 (or 716) has a channel section with toes facing upward and mated with roof sheet 59. The channel sections of stiffener 710 and 714 or 716 as may be are mitered to mate in their respective common planes. As shown, a backing plate 718 is employed on the angle of the miter, such that the upper end of stiffener 710 is welded to one face, and the outboard end of stiffener 714 or 716 is welded to the other side, there being web continuity through plate 718. The outboard upper margin of plate 718 runs along, and is welded to the join the upper margin of side sheet 88, 90 and roof sheet 59. As can be seen plate 59 has a broadening profile, which protrudes beyond the edges of the channel sections. The resultant structure provides a four-sides tubular structural section forming an elbow with web continuity.

In the case of FIG. 15*c*, roof stiffener 714 terminates at an end plate 730, of the same, or substantially the same plan profile as plate 718, having a longitudinally broadened upper edge that mates in web continuity with the lower margin, or root, at which coaming 61 merges into roof sheet 59. In the alternate case of roof stiffener 716, there is further a cross-member 734 that extends across the inside of coaming 61. As seen in FIG. 15*f*, cross-member 734 has a downward U-shape with a horizontal gusset 736 welded between the downwardly extending legs of the U to form a closed section. The upper end of the U is formed into a V roof such that the lading will flow past. The legs are spaced apart to lie in the same vertical planes as the legs of stiffener 716. An end plate 738 is welded to the lower margin of coaming 61, and forms the inboard end cap of stiffener 716, and the end cap of the opposed mating end of cross-member 734. Inasmuch as cross-member 734 is of deeper section than stiffener 716, gussets 708 provide web continuity between the legs of cross-member 734 and the legs of stiffener 716. The resultant structure has web continuity from top chord 64 to top chord 66 such that the left and right hand stiffeners 710, left and right hand stiffeners 716 and cross-member 734 form a continuous reinforcement, or spring, effectively forming a downwardly opening U-shaped frame tending to hold the profile of the section.

In summary, in the example of FIGS. 15c to 15f there is a railroad hopper car. It has a lading containment body 22 having a roof opening, trough 60, through which to introduce lading. It has a bottom discharge of discharge section 110 mounted to frame 130. The bottom discharge has a gate, such as discharge gate assembly 170 mounted thereto to govern egress of lading from lading containment body 22. The bottom discharge of discharge section 110, or of any gate assembly 170 thereof, has a length along lading containment body 22 and a width across lading containment body 22, the length being greater than the width. Containment body 22 has downwardly open body reinforcement. The reinforcement includes a first portion, such as first stiffener 710 mounted to a side wall 88, 90 and a second portion such as stiffener 714 or 716 mounted to roof sheet 59. In the example of FIGS. 15d and 15f there is a moment connection formed at the junction between the top end of the first portion defined by the upper end of predominantly upstanding stiffener 710 and the laterally outboard end of the second portion defined by stiffener 716 of the reinforcement, working in conjunction with side wall sheet 88, 90 an roof sheet 59. Each of stiffeners 710, 714 and 716 has a channel section 712 mounted toes-in to form a closed section with the lading containment body, be it in cooperation with sidewall sheet 88, 90 or roof sheet 59. In the example of FIGS. 15d and 15f there is a moment connection between the first portion and the second portion as seen at the fabricated elbow having inner and outer flanges and shear web continuity through the joint of the elbow.

In FIGS. 15d and 15f the hopper car includes coaming 61 defining a periphery of the roof opening of trough 60. The second portion then further includes cross-member 734 that extends across, and reinforces, coaming 61. Cross-member 734 is a reinforcement having the form of a downwardly opening U-shaped assembly. That U-shaped assembly defines a spring. Cross-member 734 has a pair of spaced apart vertical legs having web continuity with adjacent members, gussets 708, 709 and left and right hand roof stiffeners 716 of the reinforcement, thereby forming a moment-couple transferring beam fully across the car from left hand top chord 64 to right hand top chord 66. This large, inverted U-shaped form-holding reinforcement is located above one of the discharges, intermediate either two frames 78, 80; or one of frames 78 or 80 and an end of the hopper car, 26 or 28. In each case the car has a flat bottom discharge.

FIGS. 13a-13f show railroad hopper car 620 which has three discharge gates, and which has, in general, the layout of a two-hopper car with first and second hopper portions and internal slope sheet, and, additionally, a discharge gate under the perforated slope sheets. This is not the only possible configuration.

Figure 16A:
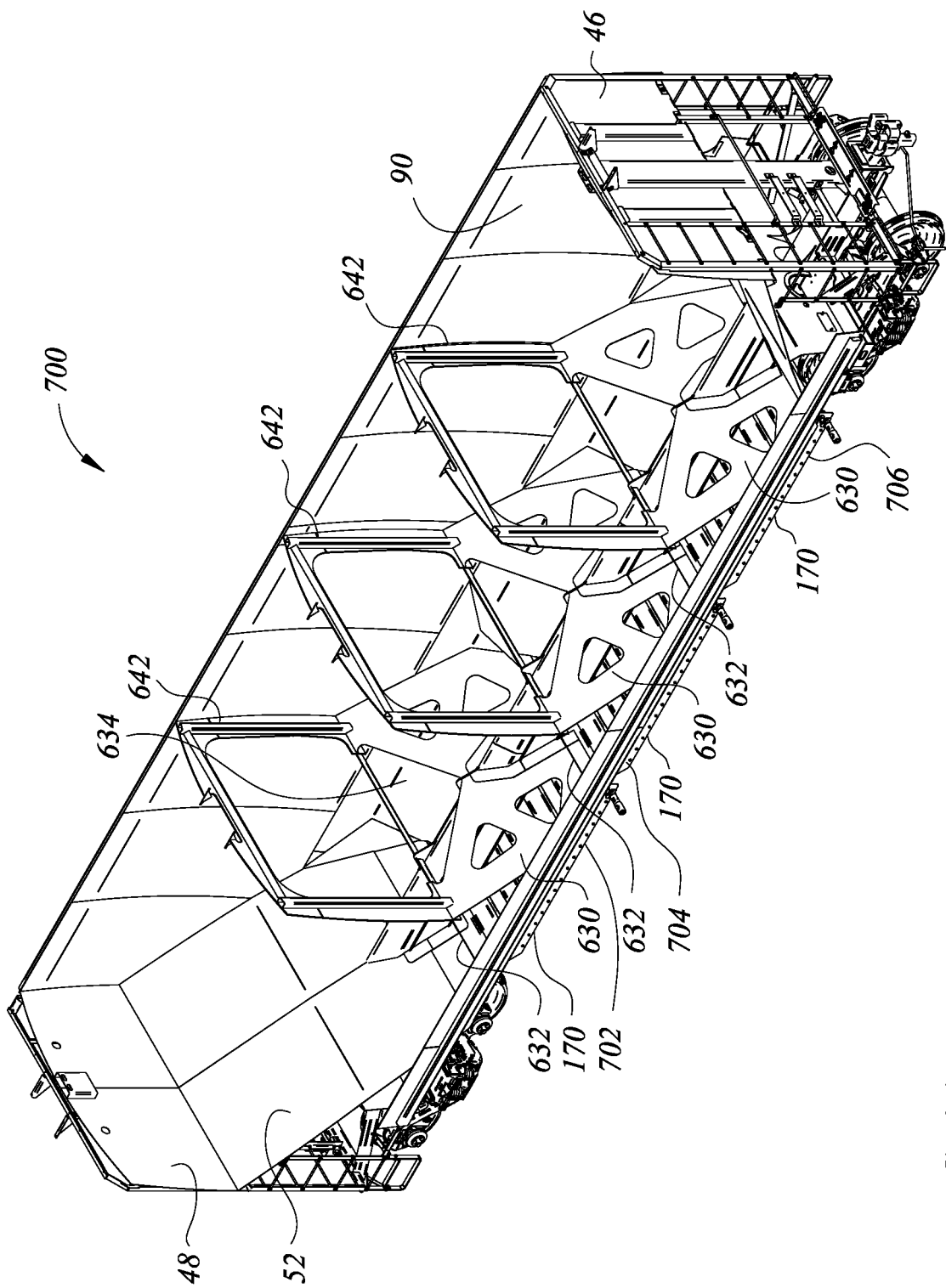
FIG. 16a is an isometric general arrangement view of an alternate railroad hopper car to that of FIG. 13b.

It may be that there is a railroad hopper car 700, as in FIG. 16a in which there are three such discharge regions, 702, 704, 706, each having discharge governed by a movable sliding gate 170, and each sliding gate underlying a perforated shear transfer structure of members 630, 632, with a frame 642, with or without intermediate stiffeners 690. Such an arrangement provides a flow through path for the lading, but also provides greater lateral, longitudinal, and vertical shear transfer reinforcement than seen in railroad hopper car 620. Such greater reinforcement may be desired, for example, where the intended lading for which the car is built may be of greater density than that for which car 620 is intended. It may also be noted that in hopper car 700, there is no empty space or opening between end sheets 50, 52 that is not over-spanned by intermediate shear force transfer members 630, 632. That is, in hopper car 700 there is a continuous zig-zagging of alternating members 630, 632 lengthwise from first end slope sheet 50 to second end slope sheet 52, somewhat like a continuous concertina when seen in side section, in which the "concertina" has been perforated to permit the passage of lading. Thus, effectively, there is a continuous, or substantially continuous longitudinal shear connection between the center sill and the lading containment shell all along the intermediate portion of the car between end slope sheets 50, 52, and, similarly, effectively continuously, or substantially continuously above and along frame 130. This can be extended by including end slope sheets 50, 52, which are also shear-connected to center sill 636.

Although hopper car 700 shows three such cycles of alternating zig-zagging shear force transfer members 630, 632 between end slope sheets 50, 52, it is intended to be representative of concertina structures generally, whether of three cycles; fewer cycles, e.g., 2, or possibly even 1; or more cycles, be it 4, 5, 6 or more, without the need. Where there are more cycles to cover the same length, the vertical amplitude of the cycle (i.e., extent in the z-direction), and the longitudinal wave-length (i.e., extent in the x-direction) would be correspondingly smaller, depending on the total number of cycles in the denominator dividing the length dimension between end slope sheets 50, 52 spanned by the concertina structure.

Figure 16B:
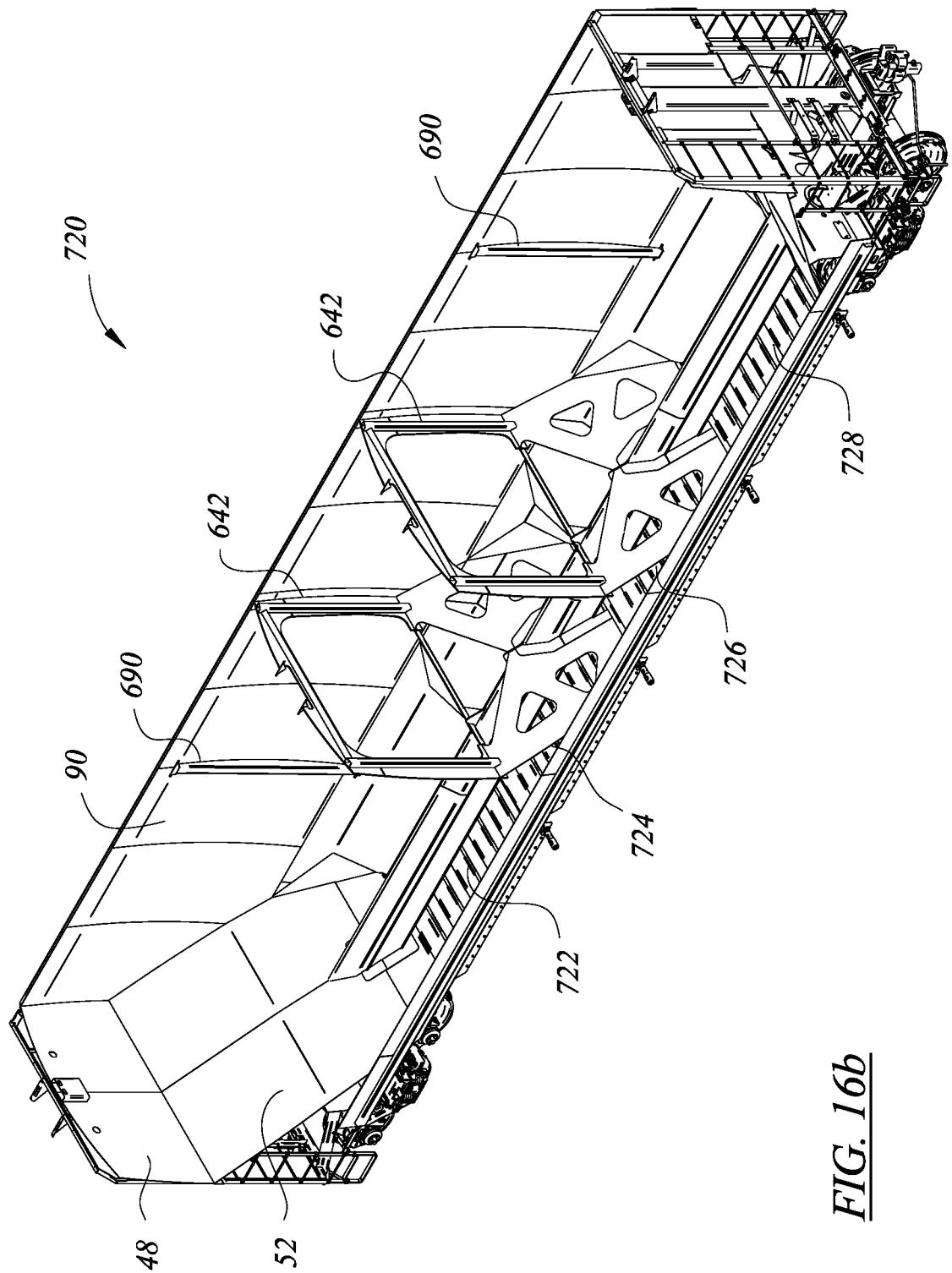
FIG. 16b is an isometric general arrangement view of a further alternate railroad hopper car to that of FIG. 13b.

Similarly, in FIG. 16b, there is a railroad hopper car 720 that has four discharge regions 722, 724, 726, and 728, each having a sliding gate 170. The end regions 722, 728 have unimpeded discharge sections, as in a two-hopper car. By contrast, middle regions 724, 726 each have internal slope sheets that have been perforated to permit flow through of lading, as well as reinforcement frames 642. Railroad hopper car 720 may be thought of as being the same as railroad hopper car 620, but having two adjoining internal sections rather than one. Here, again, the ratio of opening size and reinforcement may reflect the density of the intended lading.

Figure 16C:
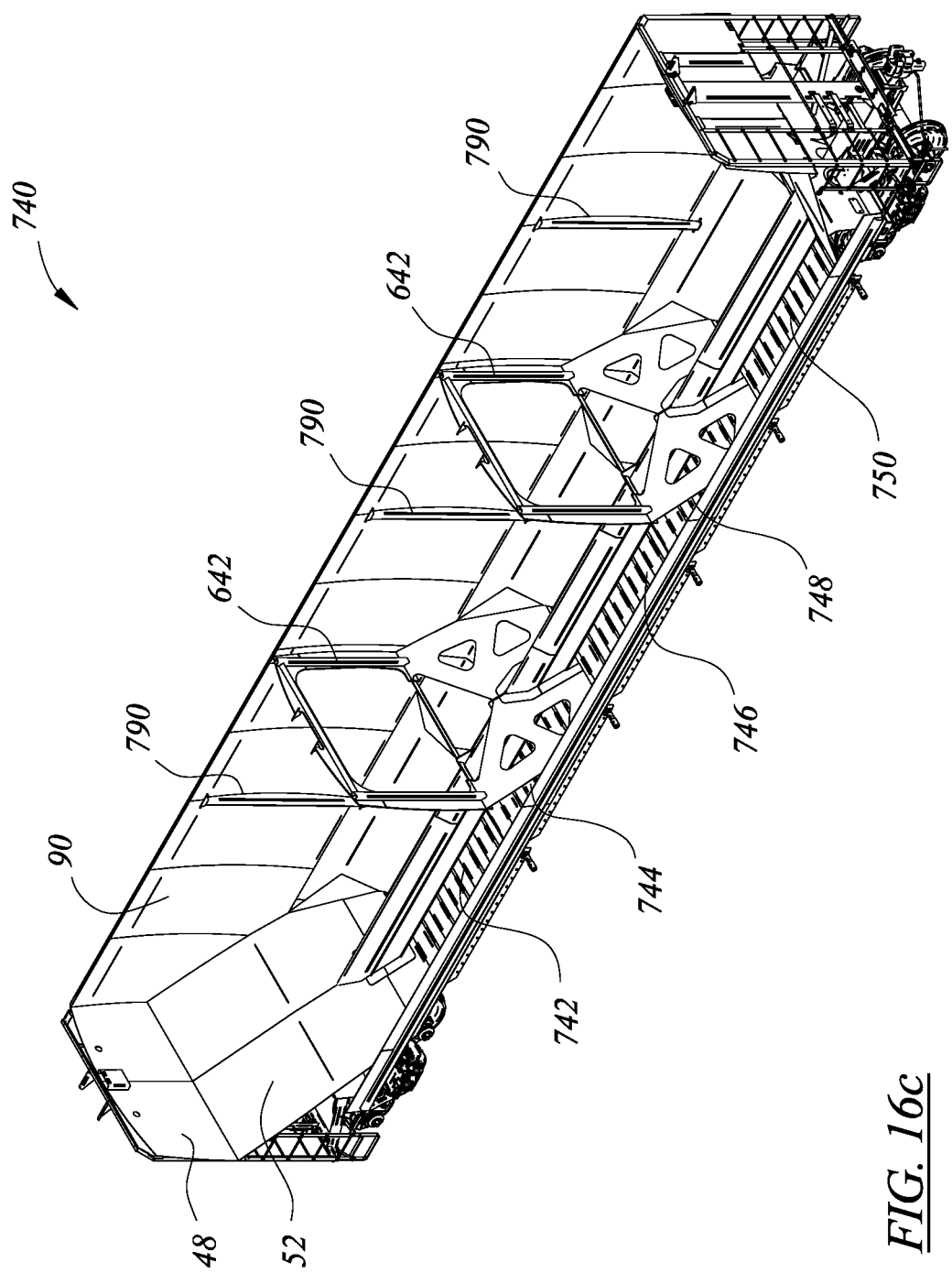
FIG. 16c is an isometric general arrangement view of a still further alternate railroad hopper car to that of FIG. 13b.

In yet a third alternative, as seen in FIG. 16c, there is a railroad hopper car 740 that has a set of five discharge regions 742, 744, 746, 748 and 750, each having a respective discharge gate 170, in which the end, middle and far end regions 742, 746 and 750 are as if for unobstructed hopper portions, and the alternating intermediate regions 744 and 748 have perforated internal slope sheets, i.e., shear transfer members 630, 632, as before. Again, the layout may depend on the length to width ratios of the multiple shutter opening gates, and on the expected density of the lading that the car is designed to transport.

Figure 13G:
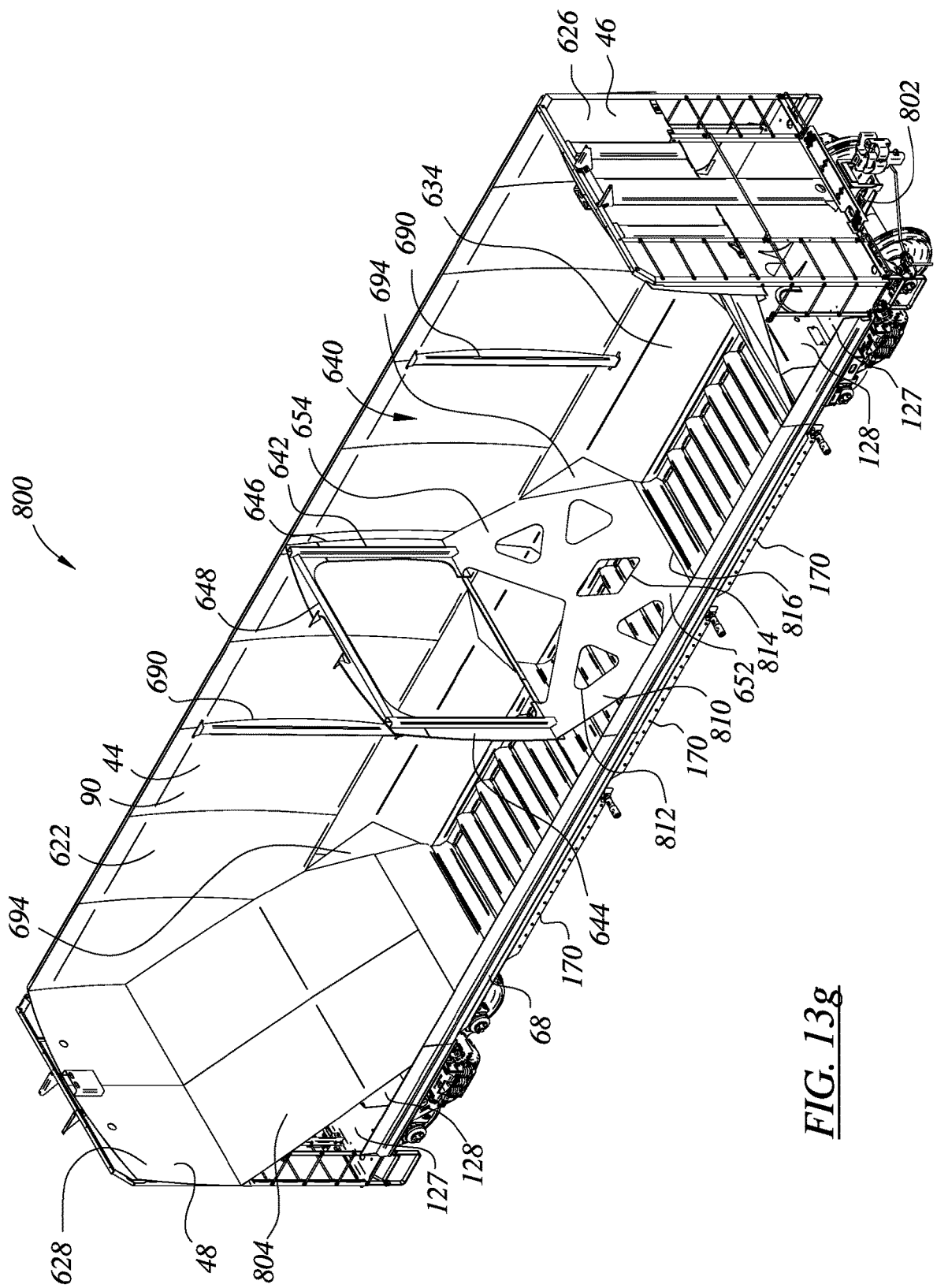
FIG. 13g is a general arrangement perspective view of an alternate embodiment of railroad hopper car to the of FIG. 13b, with stub center sills.
Figure 13H:
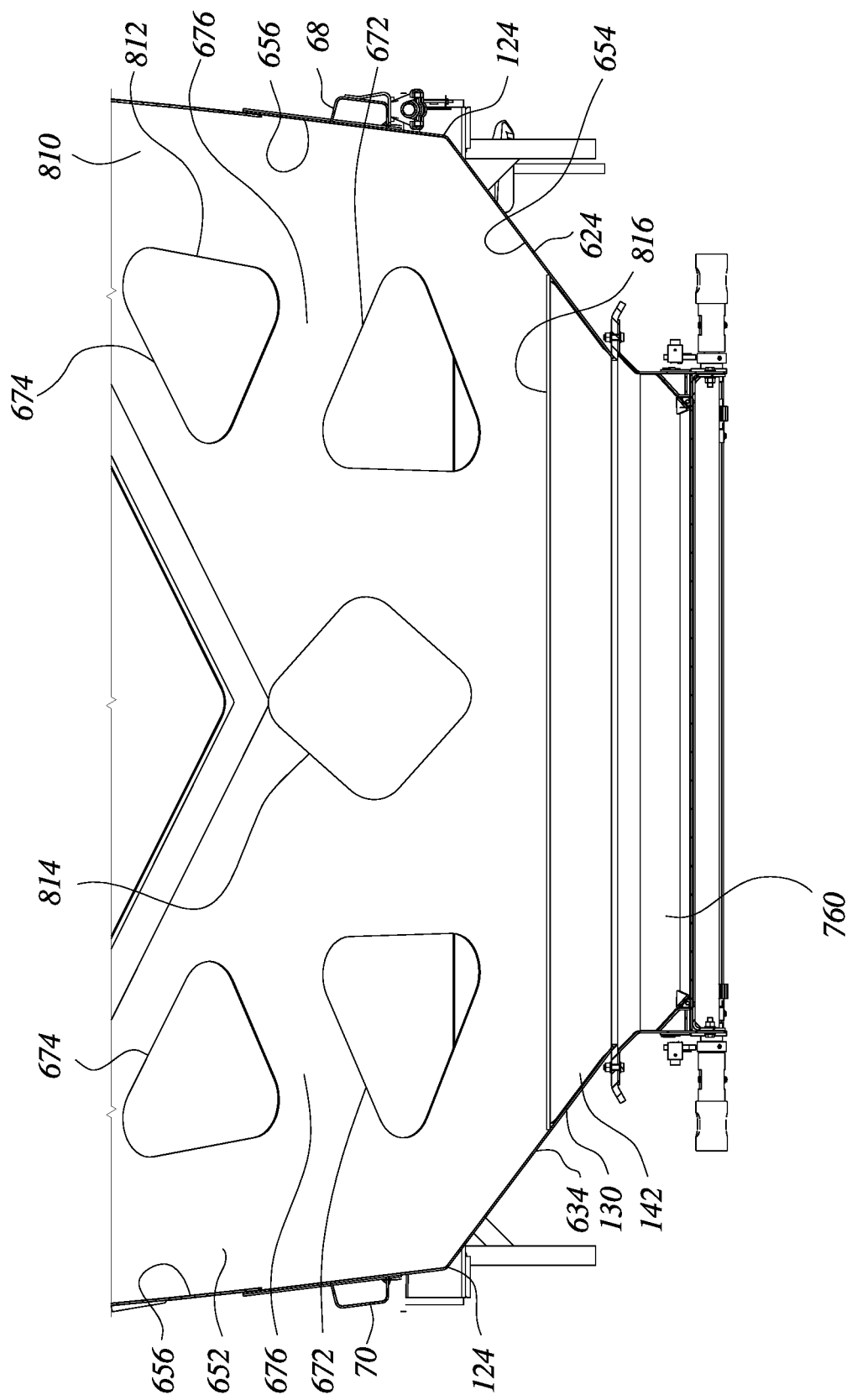
FIG. 13h is an enlarged detail corresponding to FIG. 13f, of the railroad hopper car of FIG. 13g.
Figure 13I:
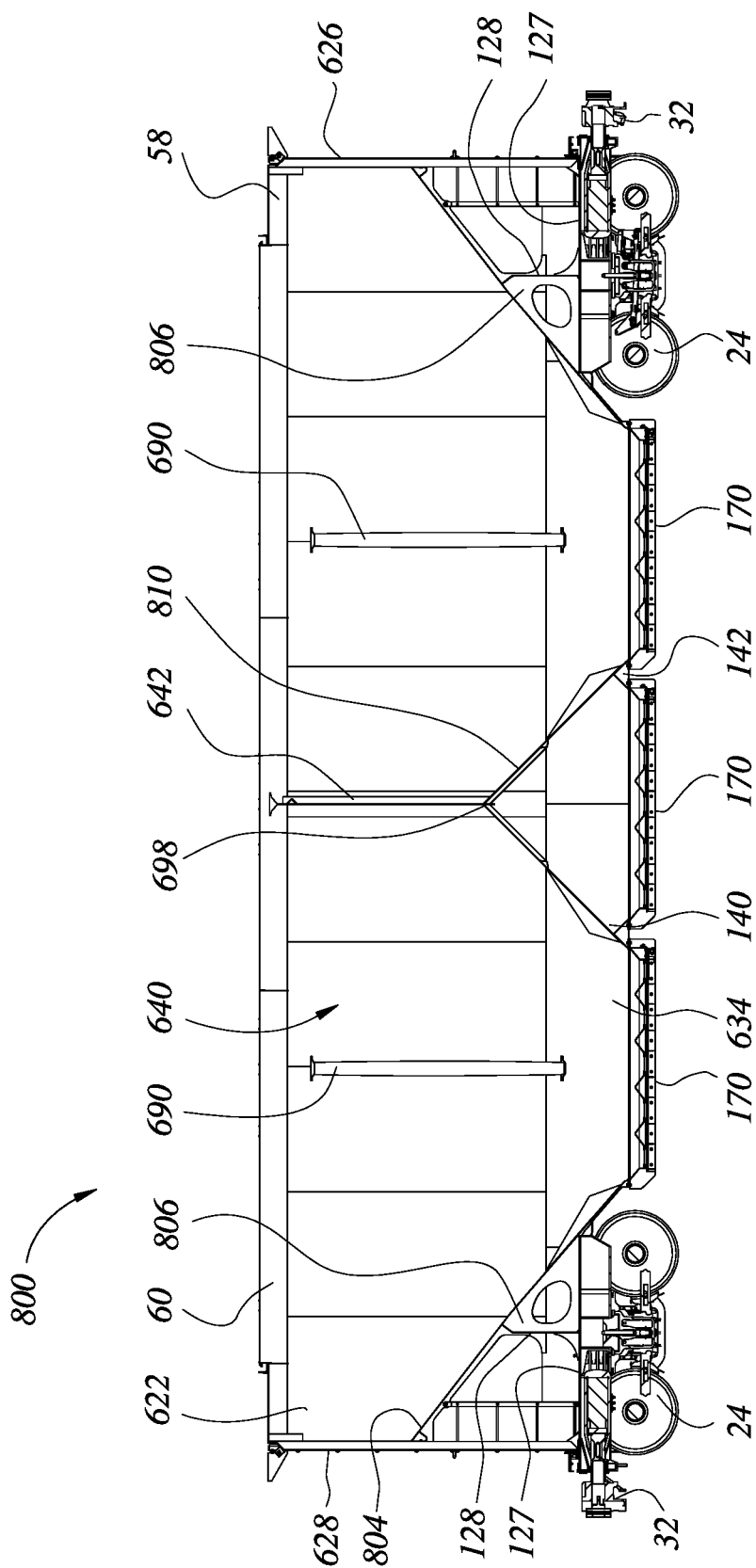
FIG. 13i is a longitudinal section of the railroad hopper car of FIG. 13g.
Figure 14A:
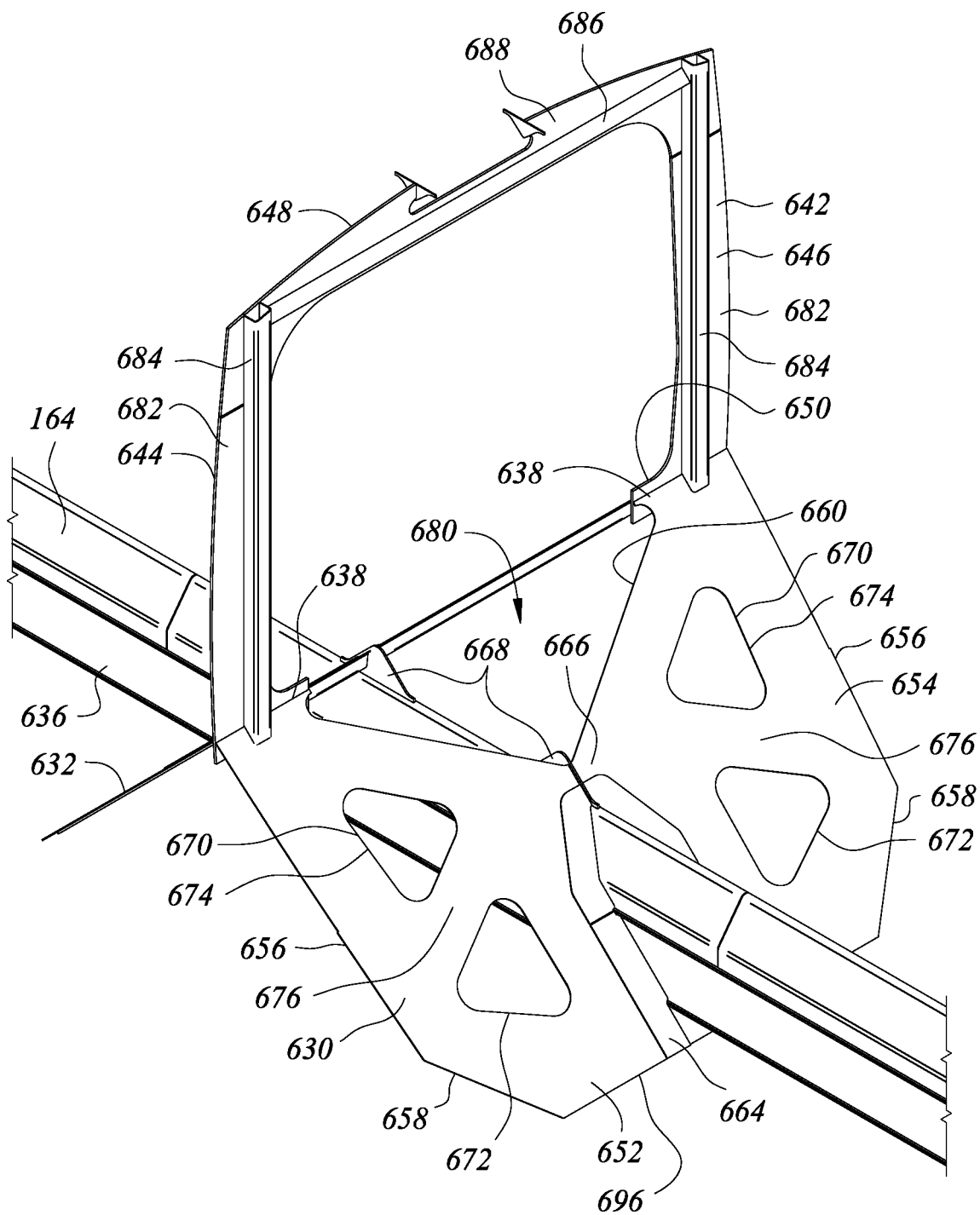
FIG. 14a is an enlarged detail of internal structural reinforcement of the railroad hopper car of FIG. 13a showing a mounting to the center sill.
Figure 14B:
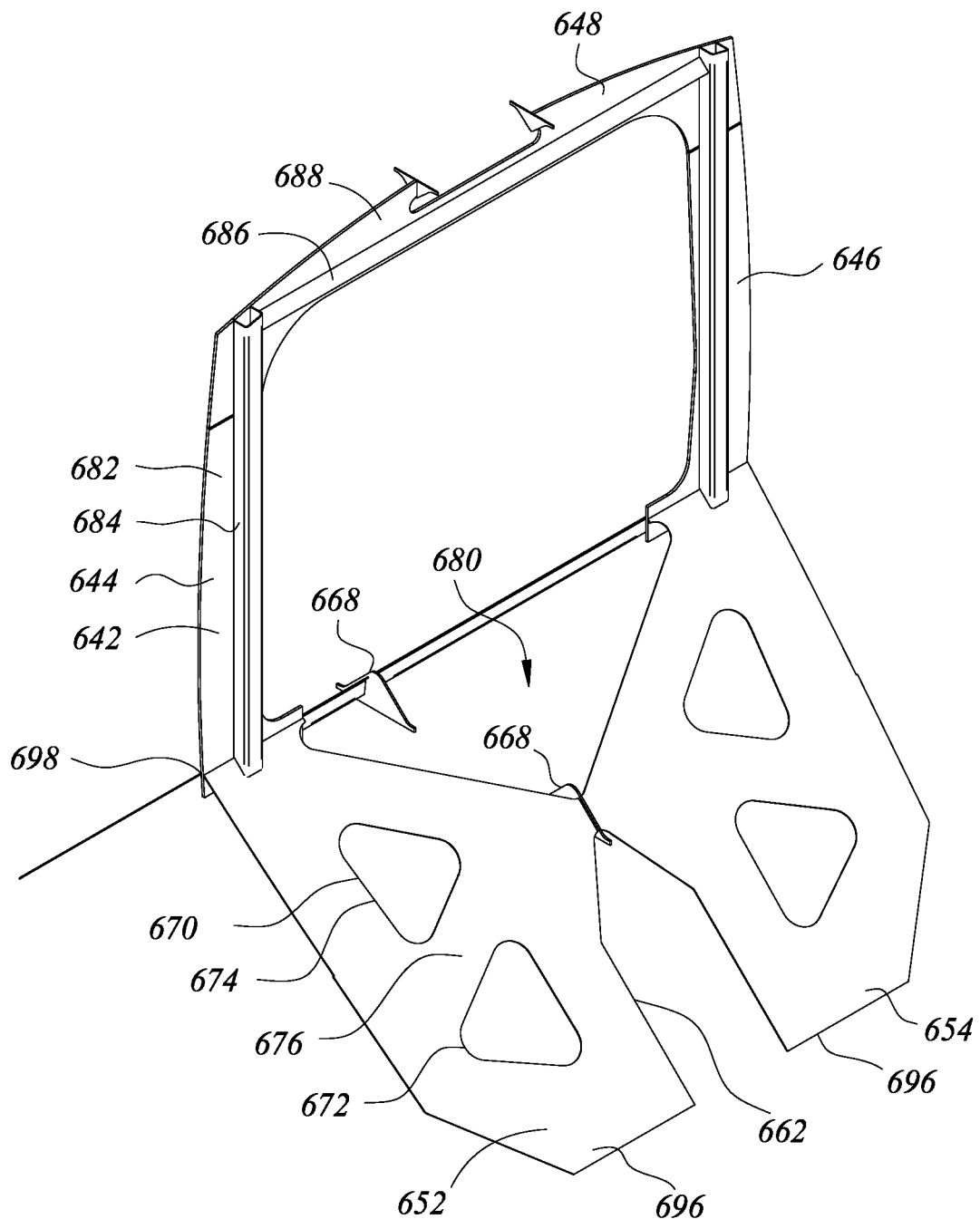
Figure 14C:
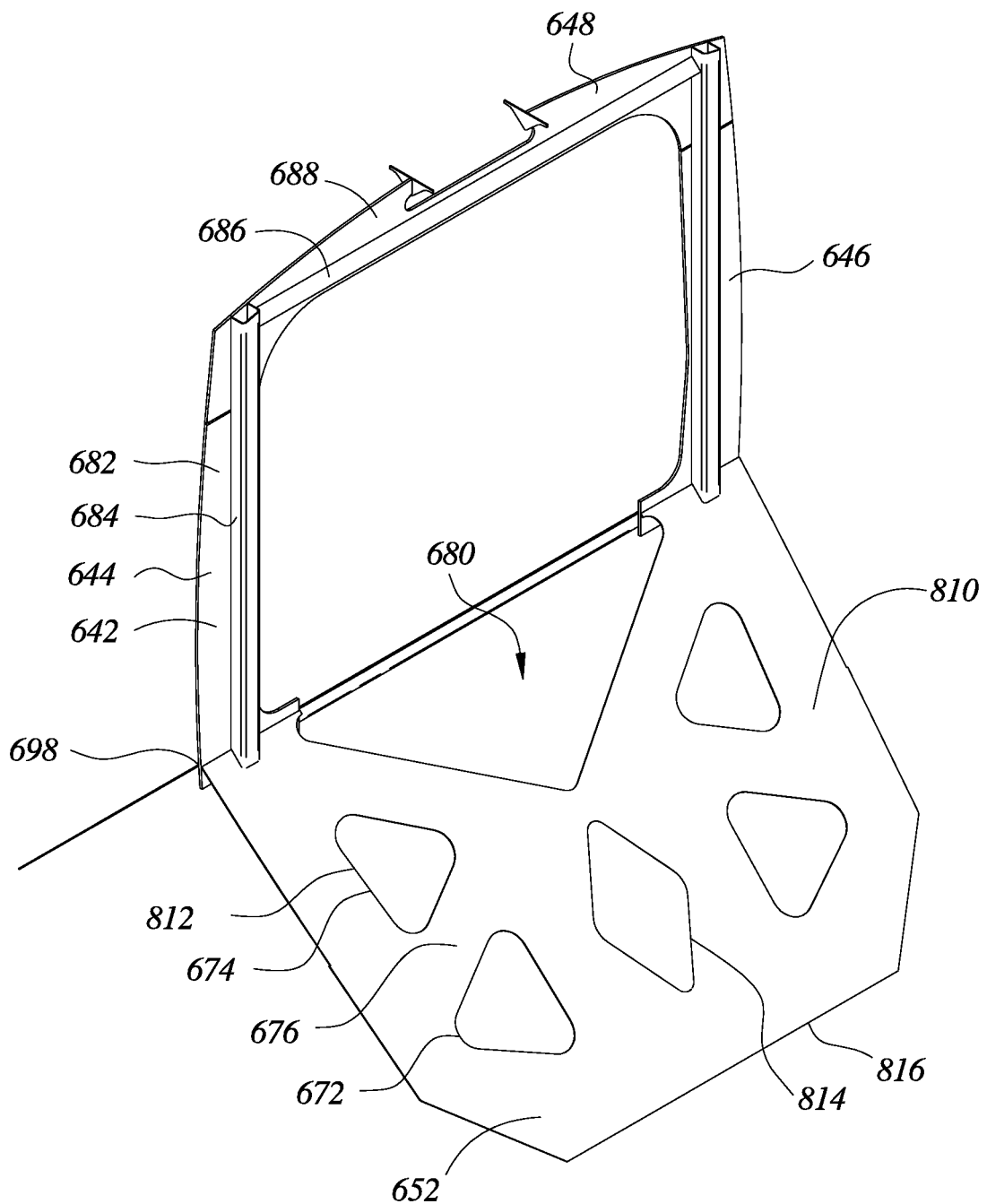
FIG. 14c is an alternate embodiment of the detail of FIG. 14b for the railroad hopper car of FIG. 13g.

Thus far, discussion has pertained to railroad hopper cars having straight-through center sills extending from end to end of the car. FIGS. 13g, 13h and 14c pertain to a railroad hopper car 800 that is not a straight-through center sill car. Rather, railroad hopper car 800 has stub sills 802 at either end of the car that terminate at end slope sheets 804, which are continuous across the car rather than having a center sill penetration and center sill shrouding. In railroad hopper car 800, there is an end section shear plate 127 that overlies, and defines the top cover plate of stub sills 802, and that overlies and forms the top cover plate of main bolster 30. Side sills 68, 70 then lap shear plate 127 along its laterally outboard edges, terminating over the ends of main bolster 30. Stub wall 128 is located over main bolster 30, and runs from shear plate 127 to the underside of end slope sheet 804. As before, there is a torsion transfer panel 129 that has a horizontal vertex mated to shear plate 127 above, and in alignment with the vertical webs of stub sill 802. Torsion transfer panel 129 has a vertical vertex that runs along, and is welded to the forward face of stub wall 128. Torsion panel 129 has an hypotenuse, or inclined edge that runs along and is mated to the underside of end slope sheet 804.

Railroad hopper car 800 also has laterally extending shear force transfer members 810 that extend across the car in the manner of members 630, 632. and provide the shear connection between side sills 68, 70, the side slope sheets 624, 634 and frame 130 along the car. In this instance, members 810 differ from member 630, 632 in that, rather than being made of two main pieces 652, 654, members 810 are a single shear web or plate. It has an array of apertures 812 as before, but in addition to the previously noted openings and struts, array of apertures 812 includes a central, generally diamond shaped opening 814 along the centerline of the car. Aperture 814 may be located symmetrically on the centerline. As with the other apertures, opening 814 may have a downwardly pressed or drawn peripheral flange or lip. Given that car 800 does not have a straight-through center sill, there is no opening formed in member 810 to accommodate a center sill, no flashing or doubler, and no center sill shroud. Bottom margin 816 runs the full distance across the car, from side slope sheet 624 to side slope sheet 634, and overlaps such of cross-members 140, 142 as may be. It may be understood that just as car 800 corresponds to car 20, with stub sills rather than a center sill, likewise stub sill versions of cars 620, 700, 720, and 740 can also be made with the corresponding members 810.

Figure 17B:
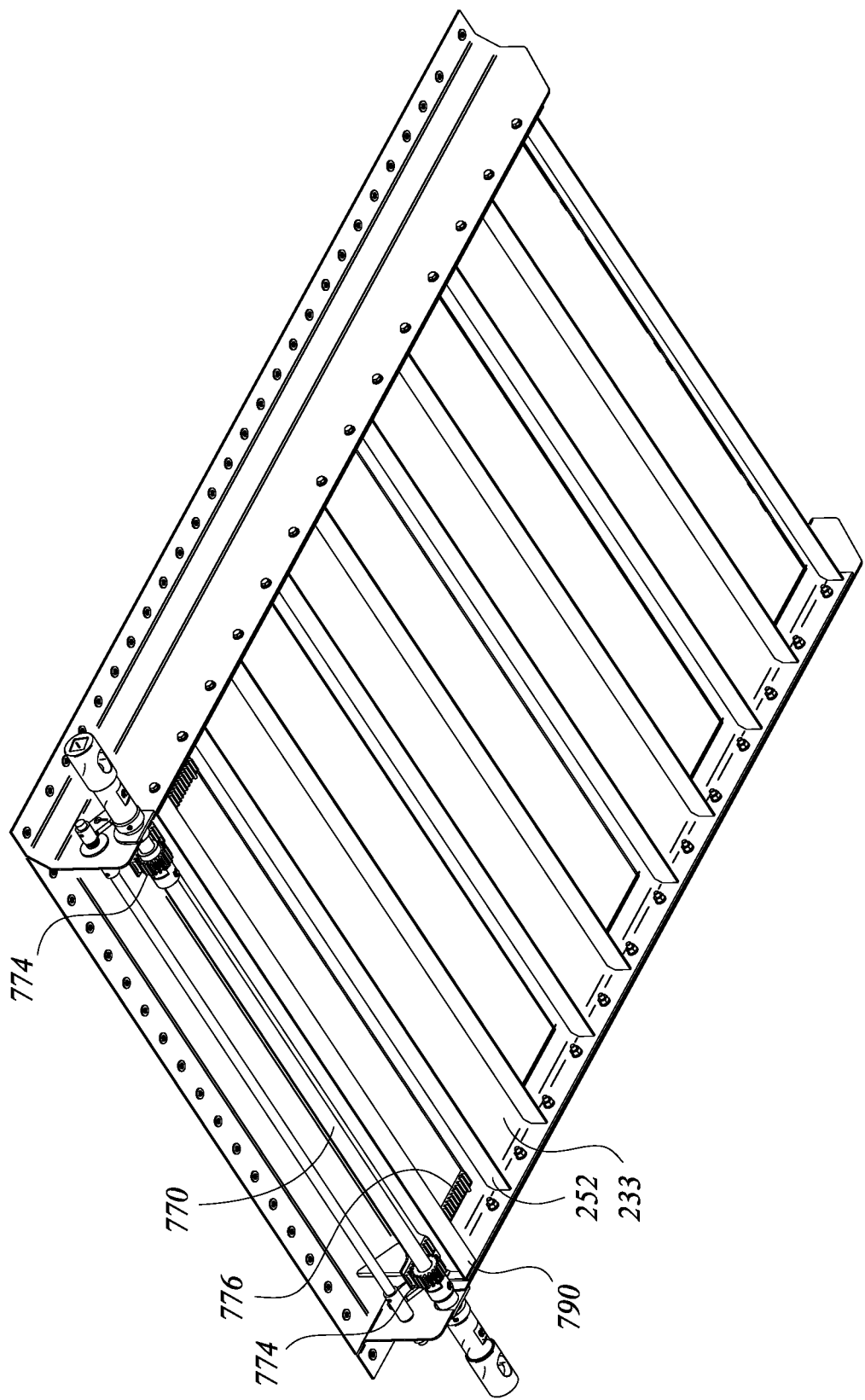
Figure 17C:
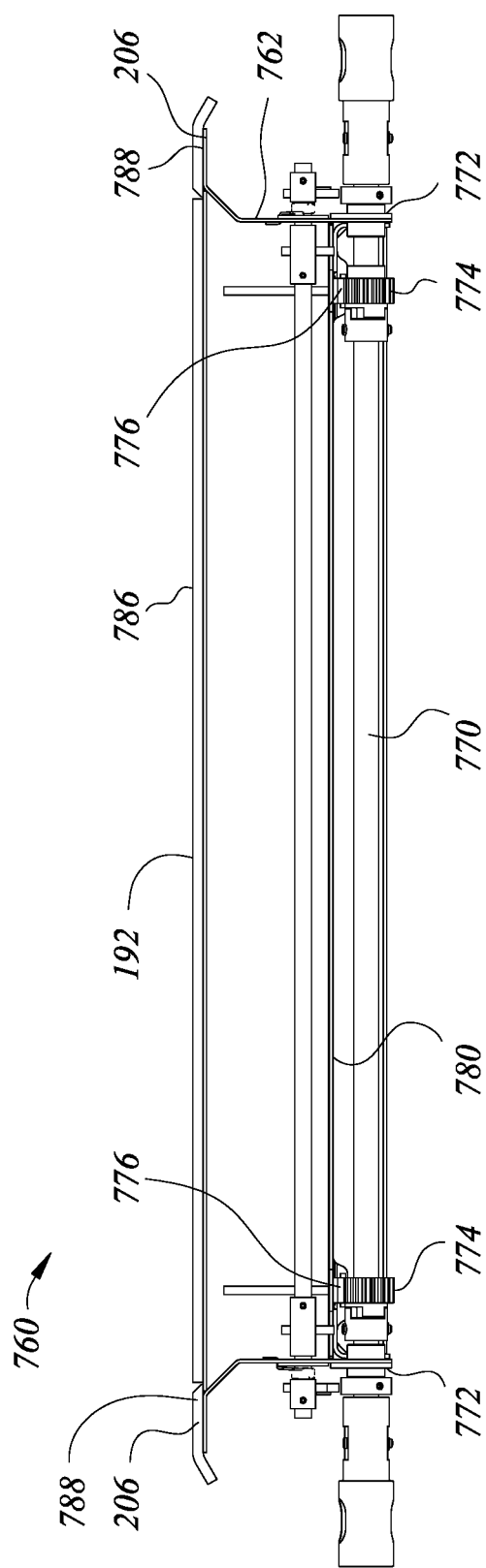
Figure 17D:
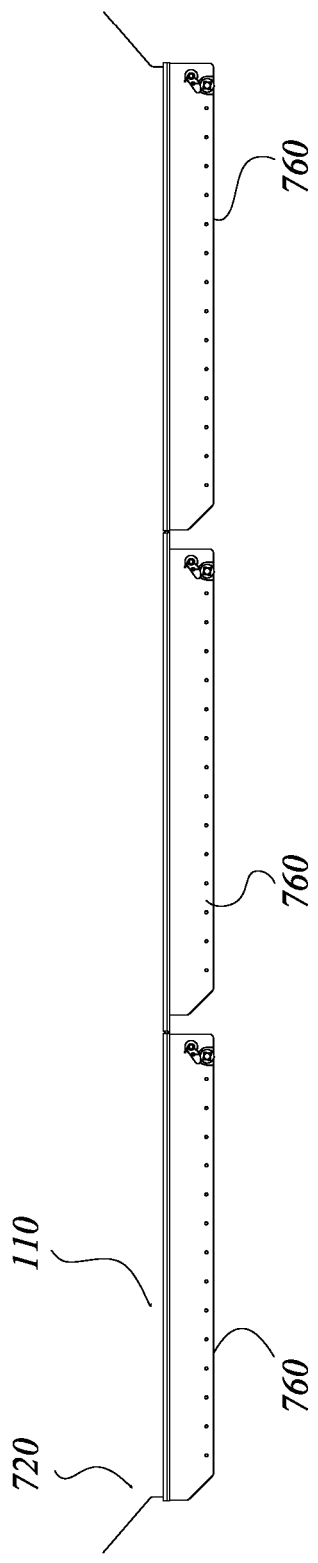
Figure 18:
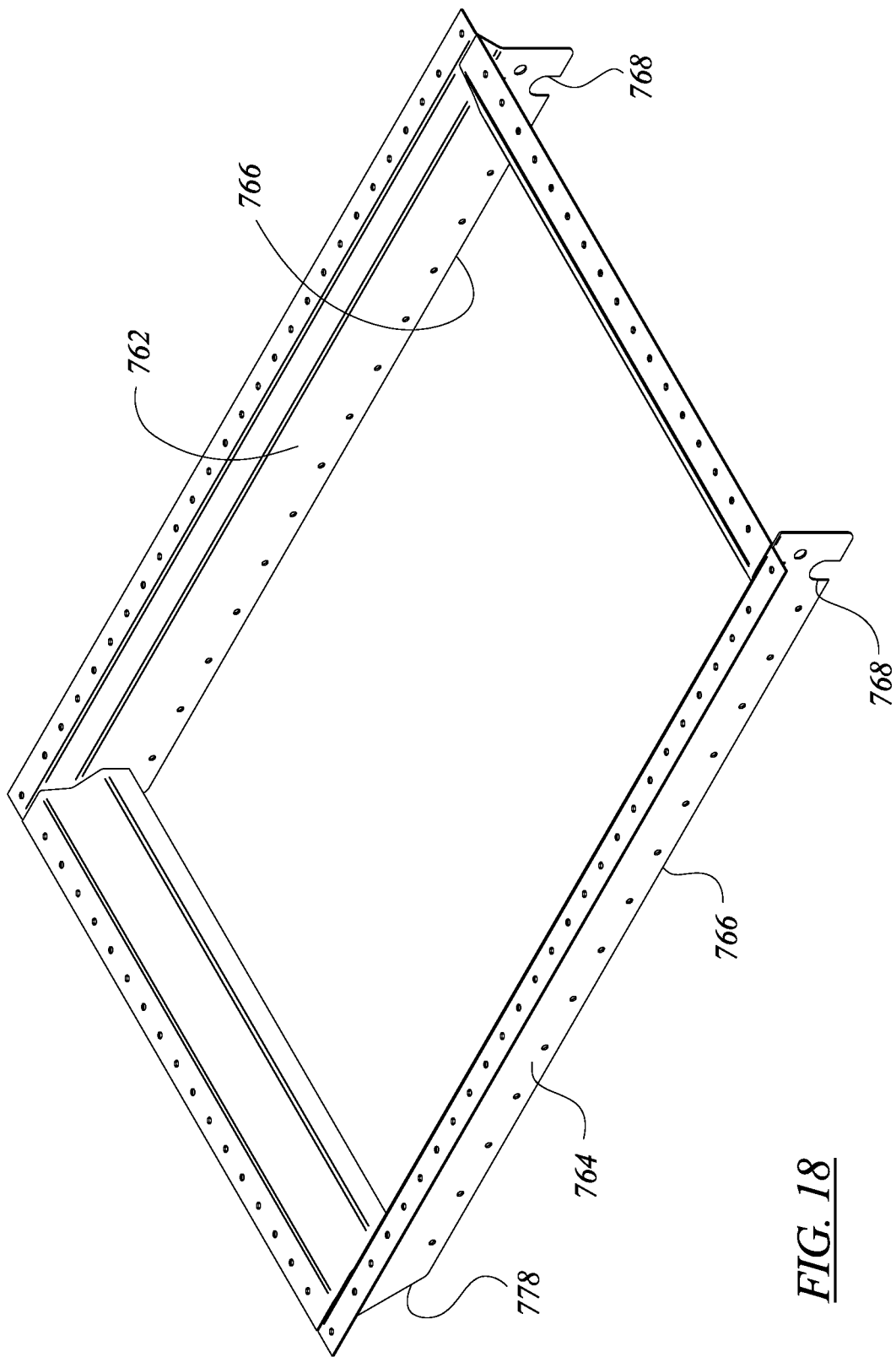

In FIG. 17*a* there is an alternate form of discharge gate assembly 760 that fits the same mounting footprint, and is intended to be interchangeable with, discharge gate assembly 170. It may be taken as having the same parts, and same annotation numbers as discharge gate assembly 170 unless otherwise noted. It differs from discharge gate assembly 170 insofar as side frames 762, 764 have a constant depth bottom edge 766, rather than having the deeper drive-end portion as seen prominently in FIG. 6*b*. The constant depth edge permits the overall door profile to be shallower, thereby permitting the discharge of the hopper to be closer to TOR, thereby permitting the slope transition point 124 to be lower, and the overall lading volume to be greater. Along the top surfaces of side frames 762, 764 there are seals 788, and along the transverse frame members 192, 194 there are seals 786.

In this arrangement, the drive end region of each of side frames 762, 764 has an accommodation, or relief, or aperture, or slot, however it may be called, identified as item 768, that allows the insertion of the drive shaft assembly 770. Drive shaft assembly 770 has mating plates, or doublers, or blanks 772 that mate with the margin of side frames 762, 764 surrounding the respective accommodations 768, and that are secured in place at the time of fit up on assembly when the teeth of gear 774 are mated to rack 776. Furthermore, the far ends of side frames 762, 764 are trimmed, as at chamfer 778.

Figure 19A:
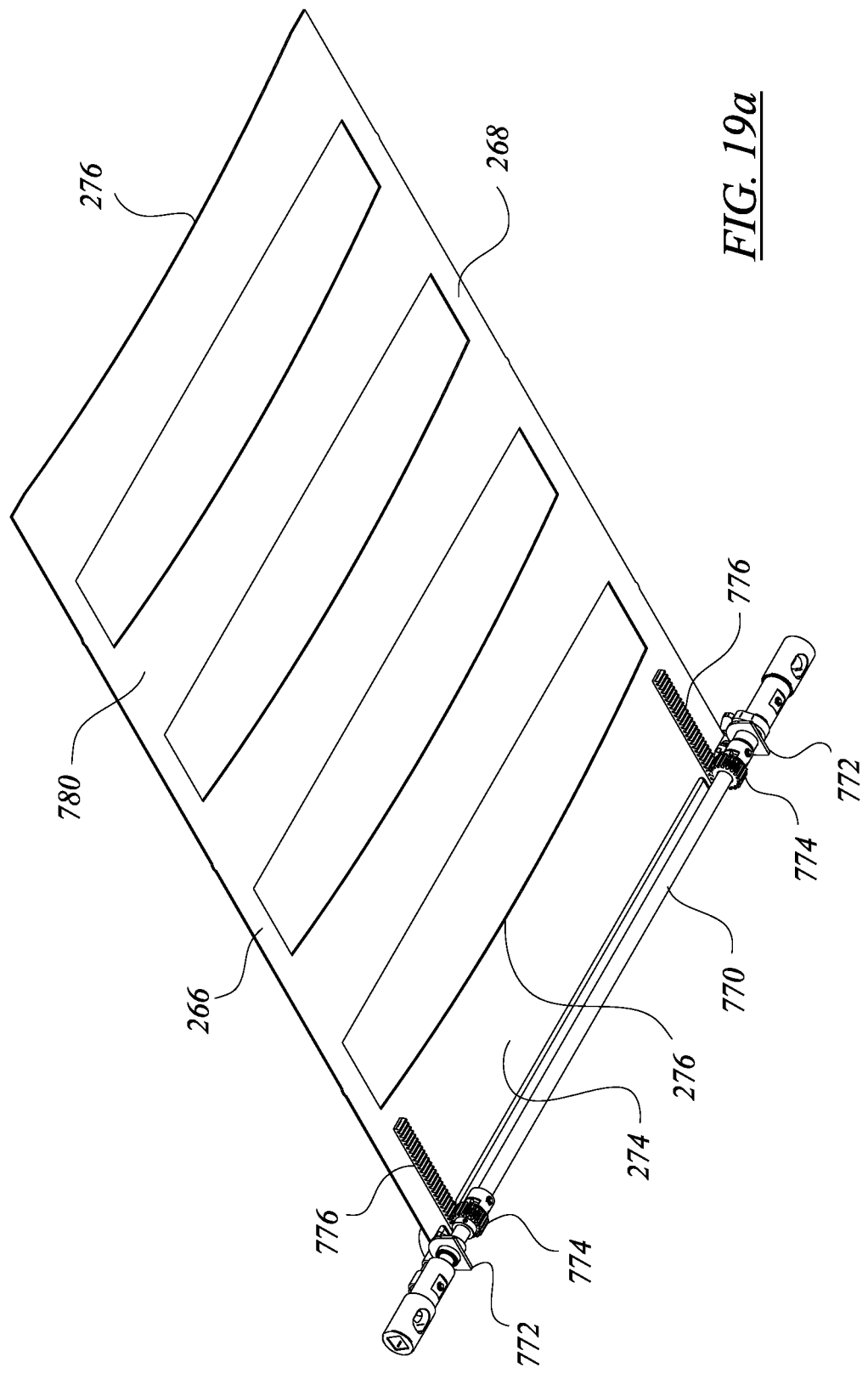
FIG. 19a is an isometric view of a sliding gate panel of the discharge gate of FIG. 17a as mated to its drive shaft.
Figure 19B:
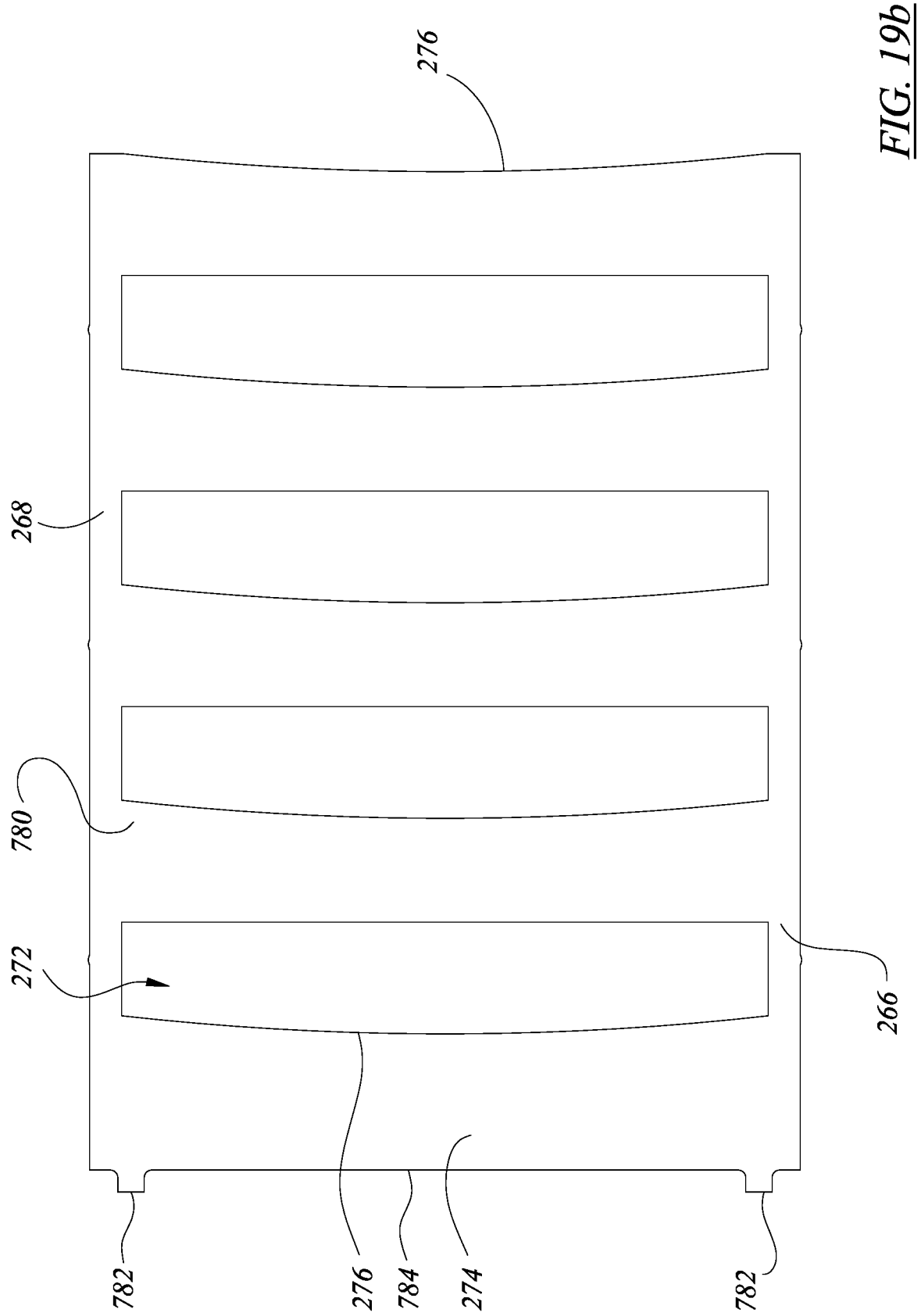
Figure 19C:
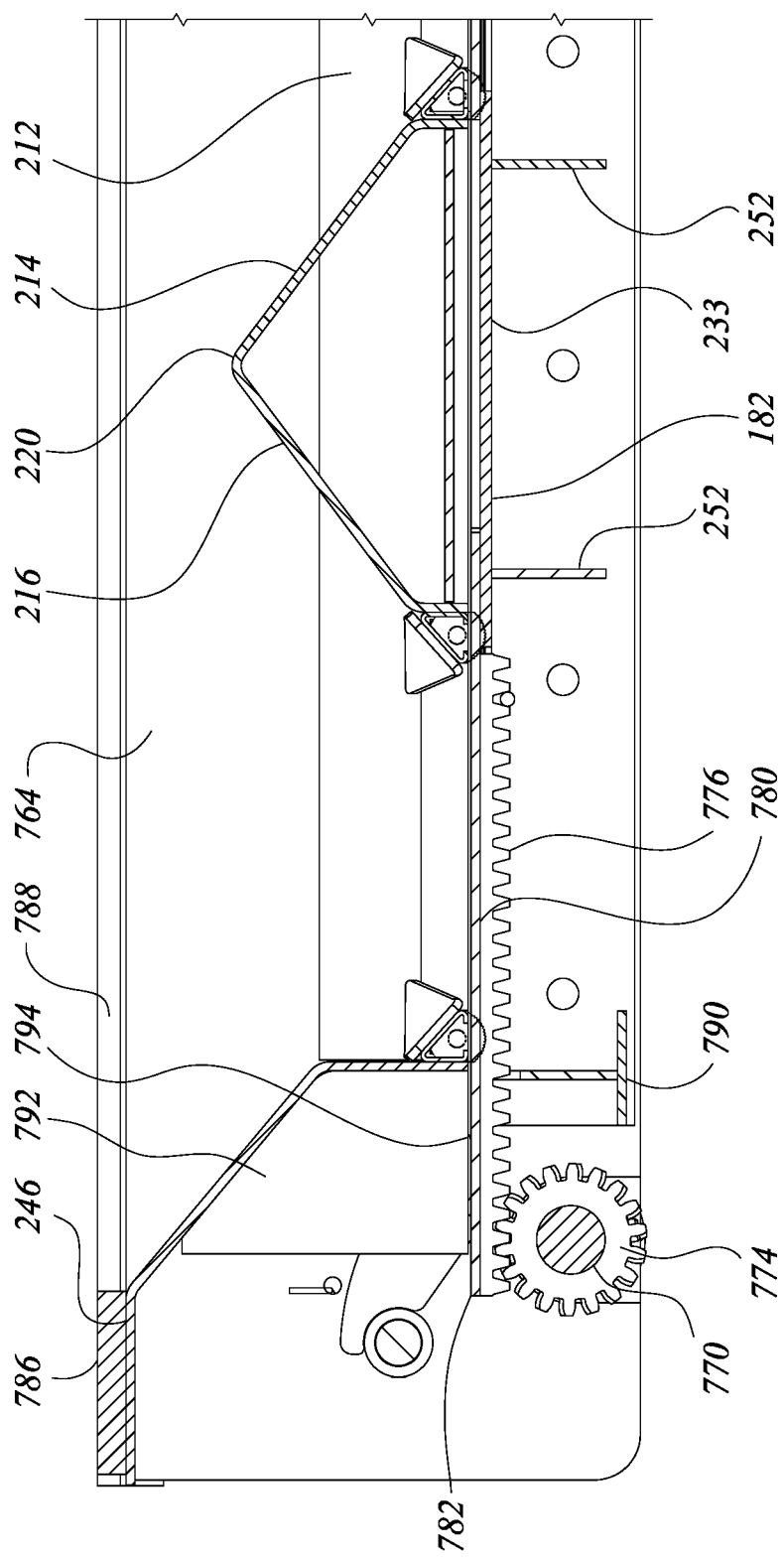
FIG. 19c is an enlarged cross-section of the discharge gate assembly of FIG. 17a showing the relationship of the moving and stationary features thereof.

Looking at FIGS. 19*a* and 19*b*, the near end, or drive end, of shutter plate 780 has local extensions, or protrusions, or horns 782 on each side. Horns 782 protrude longitudinally, and provide a longer backing for racks 776, which are mounted to the underside thereof, and whose leading ends would otherwise protrude unsupported past the end margin 784 of shutter plate 780. At this location, at the front of the stator assembly 182 there is a cross-member or cross-tie 790 between side frames 762, 764. In the example shown, the cross-member 790 has an invert T-cross-section. Further, shutter plate 780 is relatively thin, and has some flexibility in out-of-plane bending in the z-direction. When a torque is applied to gears 774, particularly in the direction of opening when the weight of lading bears against the shutters, there is a tendency for racks 776 to want to climb away from, and therefore to want to disengage from, gears 774. Since the leading edge of plate 780, and also of horns 782, is relatively soft, it wants to deflect upward. To discourage this tendency, discharge gate assembly 760 has backing members, or skids, or slides, in the form of relatively deep webs or gussets 792 welded to the underside of head frame 192 in line with horns 782. The bottom edge 794 of gusset 792 functions as a track or guide, or reinforcement that permits one-degree-of-freedom translation of plate 780 in the longitudinal or x-direction to permit opening and closing, while inhibiting deflection of plate 780, and therefore of racks 776, in the z-direction away from gears 774.

Various embodiments have been described in detail. Since changes in and or additions to the above-described examples may be made without departing from the nature, spirit or scope of the invention, the invention is not to be limited to those details. As may be understood without further multiplication and repetition of description, the various features of the several embodiments may be mixed and matched as appropriate.

We claim:

1. A railroad hopper car having internal slope sheets, said slope sheets including a first slope sheet, said first slope sheet being perforated to define a flow through path permitting passage of lading.

2. The railroad hopper car of claim 1 wherein said first internal slope sheet extends over a movable outlet gate.

3. The railroad hopper car of claim 1 wherein said hopper car includes a second internal slope sheet; and said first internal slope sheet and said second internal slope sheet extend upwardly and longitudinally toward an apex located between them.

4. The railroad hopper car of claim 3 wherein said railroad hopper car has a structural shell reinforcement frame extending upwardly away from said apex.

5. The railroad hopper car of claim 4 wherein said structural shell reinforcement frame is an open frame.

6. The railroad hopper car of claim 1 wherein said railroad hopper car has a straight-through center sill and a lading containment shell, and said perforated first internal slope sheet defines a shear connection between said center sill and said lading containment shell.

7. The railroad hopper car of claim 1 wherein said railroad hopper car includes longitudinally extending, downwardly convergent side slope sheets, said perforated first internal slope sheet extends across said car linking said side slope sheets and forming an obliquely inclined shear force connection therebetween.

8. The railroad hopper car of claim 1 wherein said railroad hopper car includes longitudinally extending, downwardly convergent side slope sheets, and a straight-through center sill; said first perforated internal slope sheet extends across said car linking said side slope sheets and said straight-through center sill; and said perforated first internal slope sheet forming an obliquely inclined shear force connection between said side slope sheets and said center sill.

9. The railroad hopper car of claim 1 wherein said hopper car has multiple discharge gates.

10. The railroad hopper car of claim 1 wherein:
said railroad hopper car has a lading containment shell carried by railroad car trucks, and a straight-through center sill extending between said trucks;
said lading containment shell includes longitudinally extending, downwardly laterally inwardly converging side slope sheets;

an array of gating is mounted lower than said side slope sheets and below said straight-through center sill to govern egress of lading from said lading containment shell;

there is a second internal slope sheet, and said second internal slope sheet is perforated; said perforated first internal slope sheet and said perforated second internal slope sheet extend upwardly and longitudinally toward an apex located between them;

said railroad hopper car has a structural shell reinforcement frame extending upwardly away from said apex;

said perforated internal slope sheets extend over at least one movable outlet gate; and said perforated internal slope sheets extend across said hopper car linking said side slope sheets and said straight-through center sill; and said perforated internal slope sheets forming an obliquely inclined shear force connection between said side slope sheets and said center sill.

11. A railroad hopper car having at least a first fore-and-aft oriented, internal, cross-wise extending, perforated shear force transfer member that provides a lading flow path therethrough.

12. The railroad hopper car of claim 11 wherein said shear force transfer member extends over an associated movable outlet gate.

13. The railroad hopper car of claim 11 wherein said shear force transfer member is a first internal slope sheet and there is a second internal slope sheet, and said first and second internal slope sheets extend upwardly and longitudinally toward a common apex.

14. The railroad hopper car of claim 13 wherein said railroad hopper car has a structural shell reinforcement frame extending upwardly away from said apex.

15. The railroad hopper car of claim 14 wherein said structural shell reinforcement frame is an open frame.

16. The railroad hopper car of claim 11 wherein said railroad hopper car has a straight-through center sill and a lading containment shell, and said first shear force transfer member defines a shear connection between said center sill and said lading containment shell.

17. The railroad hopper car of claim 11 wherein said railroad hopper car includes longitudinally extending, downwardly convergent side slope sheets, said shear force transfer member extends across said car linking said side slope sheets and forming an obliquely inclined shear force connection therebetween.

18. The railroad hopper car of claim 11 wherein said railroad hopper car includes longitudinally extending, downwardly convergent side slope sheets, and a straight-through center sill; said first shear force transfer member extends across said car linking said side slope sheets and said straight-through center sill; and said shear force transfer member forms an obliquely inclined shear force connection between said side slope sheets and said center sill.

19. The railroad hopper car of claim 11 wherein said hopper car has multiple discharge gates.

20. The railroad hopper car of claim 11 wherein:

said railroad hopper car has a lading containment shell carried by railroad car trucks, and a straight-through center sill extending between said trucks;

said lading containment shell includes longitudinally extending, downwardly laterally inwardly converging side slope sheets;

an array of gating is mounted below said side slope sheet and below said straight-through center sill to govern egress of lading from said lading containment shell;

there is a second internal shear force transfer member;

said first and second shear force transfer members are a first internal slope sheet and a second internal slope sheet that extend toward each other upwardly and longitudinally toward an apex;

said railroad hopper car has a structural shell reinforcement frame extending upwardly away from said apex;

said first and second internal slope sheets extend over at least one movable outlet gate;

said shear force transfer members extend across said car linking said side slope sheets and said straight-through center sill; and said shear force transfer members define obliquely inclined shear force connections between said side slope sheets and said center sill.

21. A railroad hopper car comprising:

a body shell in which to contain lading;

said body shell including a discharge section through which lading exits said body shell under the influence of gravity;

said body shell having respective first and second end slope sheets inclined fore-and-aft downwardly toward said discharge section; and said body including at least respective first and second cross-wise extending, fore-and-aft inclined internal slope sheets located intermediate said first and second end slope sheets, said internal slope sheets being perforated to permit lading to flow therethrough.

22. The railroad hopper car of claim 21 wherein:

said discharge section includes a first portion, a second portion and a third portion;

said first portion is bounded by said first end slope sheet and said first internal slope sheet;

said third portion is bounded by said second end slope sheet and said second internal slope sheet; said second portion lies beneath said first and second internal slope sheets; and an egress flow path for lading is defined through perforations of said internal slope sheets through said second portion of said discharge section.

23. The railroad hopper car of claim 21 wherein:

said body shell has a first, a second end distant from said first end, and a former located intermediate said first and second ends, said former defining a cross-sectional profile of said body shell;

said first and second internal slope sheets are inclined upwardly toward each other; and said first and second internal slope sheets mate with said former.

24. The railroad hopper car of claim 21 wherein said internal slope sheets define internal shear webs extending laterally within said body shell.

25. The railroad hopper car of claim 21 wherein said hopper car has a straight-through center sill and said internal slope sheets mate with said straight-through center sill.

26. The railroad hopper car of claim 25 wherein said discharge section includes gating movable between open and closed positions to govern egress of lading; and said straight-through center sill passes over said gating and is upwardly clear thereof.

27. The railroad hopper car of claim 26 wherein said gating mates with framing of said discharge section, and said internal slope sheet extend from said framing of said discharge section to mate with said straight-through center sill.

28. The railroad hopper car of claim 26 wherein said discharge section includes side slope sheets sloped transversely inwardly and downwardly to terminate at said gating.

29. A railroad hopper car having a lading containment shell carried on railroad car trucks in rolling motion in a longitudinal direction along railroad tracks, wherein said lading containment shell includes side walls having first and second side sheets, and at least a first upwardly extending tie is mounted to said first side sheet within said lading containment shell, said upwardly extending tie having a laterally outwardly bulging profile to which said first side sheet conforms.

30. The railroad hopper car of claim 29 wherein said railroad hopper car has a side sill and a top chord, said first side sheet extends between said side sill and said top chord, said tie is located inside of said lading containment shell, and said tie is free of moment connections to said side sill and said top chord.

31. A railroad hopper car having a lading containment shell carried by railroad car trucks for rolling motion in a longitudinal direction along railroad tracks, wherein:
    said lading containment shell includes a side wall and a stiffener;
    said stiffener has an outwardly bulging profile;
    said stiffener is mounted to said side wall within said lading containment shell;
    said side wall has a side sheet that conforms to said outwardly bulging profile; and
    said side sheet supports said stiffener, to which said side sheet conforms.

32. The railroad hopper car of claim 31 wherein said lading containment shell includes a top chord and a side sill and said stiffener extends upwardly intermediate said top chord and said side sill.

33. The railroad hopper car of claim 32 wherein said stiffener has a first end and a second end, said first end having a structural pin joint relationship to said top chord and said second end having a structural pin joint relationship to said side sill.

34. The railroad hopper car of claim 31 wherein said stiffener includes a web having said bulging profile, said web extending inwardly away from said side sheet, and a flange connected by said web to said side sheet, said flange being spaced inwardly away from said side sheet.

35. The railroad hopper car of claim 31 wherein said stiffener includes a channel section mounted toes-in to said side sheet.

36. The railroad hopper car of claim 31 wherein said hopper car has a bending-moment transmitting transverse frame, and said stiffener is located along said lading containing shell distant from said bending-moment transmitting transverse frame, and distant from an end wall of said lading containing shell.

37. The railroad hopper car of claim 31 wherein said hopper car has a discharge gate, and said stiffener is an upwardly extending stiffener located at a longitudinal station of said hopper car midway along said discharge gate.

38. The railroad hopper car of claim 31 wherein said side sheet of said hopper car is formed on a cylindrical arc in the longitudinal direction.

39. The railroad hopper car of claim 31 wherein said hopper car has a center sill and internal shear force transfer members that provide a shear connection between said center sill and said side sheet of said side wall, and said internal shear force transfer members are perforated to permit passage of lading therethrough.

40. The railroad hopper car of claim 39 wherein said railroad hopper car includes a frame extending upwardly from said shear force transfer members; said frame and said shear force transfer members being connected to transmit a bending moment transversely across said railroad hopper car; and said stiffener is spaced longitudinally along said lading containment shell from said frame.

41. A railroad hopper car having a lading containment body having a roof opening through which to introduce lading and a bottom discharge; said bottom discharge having a gate mounted thereto to govern egress of lading from said lading containment body; said bottom discharge having a length along said lading containment body and a width across said lading containment body, said length being greater than said width, and said lading containment body having downwardly opening body reinforcement; and said reinforcement includes a first portion mounted to a side wall of said lading containment body and a second portion mounted to a roof sheet of said lading containment body.

42. The railroad hopper car of claim 41 wherein there is a moment connection between said first portion and said second portion of said reinforcement.

43. The railroad hopper car of claim 41 wherein any portion of said reinforcement has a channel section mounted toes-in to form a closed section with said lading containment body.

44. The railroad hopper car of claim 41 wherein there is a moment connection between said first portion and said second portion.

45. The railroad hopper car of claim 41 wherein said hopper car includes a coaming defining a periphery of said roof opening, and said second portion includes a cross-member that extends across said coaming.

46. The railroad hopper car claim 41 wherein said reinforcement has the form of a downwardly opening U-shaped assembly.

47. The railroad hopper car of claim 46 wherein said U-shaped assembly defines a spring.

48. The railroad hopper car of claim 47 wherein said cross-member has a pair of spaced apart vertical legs having web continuity with adjacent members of said reinforcement fully across said car from top chord to top chord.

49. The railroad hopper car of claim 41 wherein said reinforcement is between spaced apart frames of said lading containment body of said hopper car.

50. The railroad hopper car of claim 41 wherein said hopper car has a flat bottom discharge.

* * * * *